(12) United States Patent
Jessen et al.

(10) Patent No.: US 11,606,222 B2
(45) Date of Patent: Mar. 14, 2023

(54) CAMERA-BASED COMMISSIONING AND CONTROL OF DEVICES IN A LOAD CONTROL SYSTEM

(71) Applicant: Lutron Technology Company LLC, Coopersburg, PA (US)

(72) Inventors: Johnathan Jessen, Hellertown, PA (US); Duheng Liang, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 293 days.

(21) Appl. No.: 16/530,768

(22) Filed: Aug. 2, 2019

(65) Prior Publication Data
US 2020/0042006 A1 Feb. 6, 2020

Related U.S. Application Data

(60) Provisional application No. 62/713,913, filed on Aug. 2, 2018.

(51) Int. Cl.
*H04L 12/28* (2006.01)
*G06T 7/70* (2017.01)
(Continued)

(52) U.S. Cl.
CPC ....... *H04L 12/2809* (2013.01); *G05D 1/0088* (2013.01); *G05D 1/027* (2013.01);
(Continued)

(58) Field of Classification Search
None
See application file for complete search history.

(56) References Cited

U.S. PATENT DOCUMENTS 9,386,669 B2   7/2016   Karc et al.
9,430,044 B2   8/2016   Jain et al.
(Continued)

FOREIGN PATENT DOCUMENTS

WO   WO 2015/077767 A1   5/2015
WO   WO 2017/024268 A2   2/2017
WO   WO 2017/036747 A1   3/2017

*Primary Examiner* — Jeff A Burke
*Assistant Examiner* — Arslan Azhar
(74) *Attorney, Agent, or Firm* — Flaster Greenberg, P.C.

(57) ABSTRACT

Lighting control systems may be commissioned for programming and/or control with the aid of an autonomous mobile device. Design software may be used to create a floor plan of how the lighting control system may be designed. The design software may generate floor plan identifiers for each lighting fixture, or group of lighting fixtures. During commissioning of the lighting control system, the autonomous mobile device may be used to help identify the lighting devices that have been installed in the physical space. The autonomous mobile device may receive a communication from each lighting control device that indicates a unique identifier of the lighting control device. The unique identifier may be communicated by visible light communication (VLC) or RF communication. The unique identifier may be associated with the floor plan identifier for communication of digital messages to lighting fixtures installed in the locations indicated in the floor plan identifier.

35 Claims, 34 Drawing Sheets

(51) Int. Cl.
    *H05B 47/19*     (2020.01)
    *G06T 11/00*     (2006.01)
    *G05D 1/00*     (2006.01)
    *G05D 1/02*     (2020.01)

(52) U.S. Cl.
    CPC ......... *G05D 1/0219* (2013.01); *G05D 1/0253* (2013.01); *G05D 1/0274* (2013.01); *G06T 7/70* (2017.01); *G06T 11/00* (2013.01); *H05B 47/19* (2020.01); *G05D 2201/0211* (2013.01); *H04L 2012/2841* (2013.01)

(56) References Cited

U.S. PATENT DOCUMENTS

| | | | |
|---|---|---|---|
| 9,544,977 B2 | 1/2017 | Economy et al. | |
| 9,585,226 B2 | 2/2017 | Krietzman et al. | |
| 10,423,133 B2 | 9/2019 | Baluja et al. | |
| 10,599,174 B2 | 3/2020 | Baker | |
| 11,036,377 B1 * | 6/2021 | Ryan | H05B 47/19 |
| 2013/0183042 A1 | 7/2013 | Knapp et al. | |
| 2014/0265863 A1 * | 9/2014 | Gajurel | H05B 47/19 315/131 |
| 2015/0179058 A1 | 6/2015 | Crafts et al. | |
| 2015/0282282 A1 | 10/2015 | Breuer et al. | |
| 2016/0227634 A1 | 8/2016 | Engelen et al. | |
| 2016/0322817 A1 | 11/2016 | Baker et al. | |
| 2017/0013697 A1 | 1/2017 | Engelen et al. | |
| 2017/0041886 A1 | 2/2017 | Baker et al. | |
| 2017/0123390 A1 | 5/2017 | Barco et al. | |
| 2017/0171941 A1 | 6/2017 | Steiner | |
| 2017/0219684 A1 | 8/2017 | Jovicic et al. | |
| 2017/0228110 A1 | 8/2017 | Arora et al. | |
| 2018/0054876 A1 | 2/2018 | White et al. | |
| 2018/0167547 A1 | 6/2018 | Casey et al. | |
| 2018/0168019 A1 | 6/2018 | Baker et al. | |
| 2018/0168020 A1 | 6/2018 | Casey et al. | |
| 2018/0203591 A1 | 7/2018 | Callen et al. | |
| 2018/0212793 A1 | 7/2018 | Burger et al. | |
| 2018/0252035 A1 | 9/2018 | Casey et al. | |
| 2018/0254916 A1 * | 9/2018 | Kaag | H04L 12/281 |
| 2018/0344114 A1 * | 12/2018 | Scholten | A47L 11/4011 |
| 2019/0208979 A1 * | 7/2019 | Bassa | G06K 9/00664 |
| 2019/0278275 A1 * | 9/2019 | Song | G05D 1/0214 |
| 2019/0384232 A1 | 12/2019 | Casey et al. | |
| 2020/0018854 A1 * | 1/2020 | Hicks | G01S 7/4802 |
| 2020/0066032 A1 * | 2/2020 | Li | H05B 47/19 |

* cited by examiner

CAMERA-BASED COMMISSIONING AND CONTROL OF DEVICES IN A LOAD CONTROL SYSTEM

CROSS-REFERENCE TO RELATED APPLICATIONS

This application claims the benefit of U.S. Provisional Application Ser. No. 62/713,913, filed Aug. 2, 2018, the entirety of which is incorporated by reference herein.

BACKGROUND

Lighting control systems may include lighting fixtures that include lighting loads, such as electrical lighting control devices or light emitting diodes, for lighting a space. These lighting fixtures may include a lighting control device, such as a light-emitting diode (LED) driver or electrical ballast, for controlling electrical power to the lighting load. The lighting control system may also include a system controller, or hub, that is capable of sending instructions to the lighting control devices for controlling the electrical power provided to the lighting load. Typically, after the lighting control system is installed in a location, such as a residence, an office, or the like, the system controller may assign an address, such as a wireless address or a wired link address, to each lighting control device that it controls. The address may be used for sending instructions to the lighting control device.

However, at the time of commissioning of the lighting control system to enable proper control of the devices in the system, it is difficult to determine the lighting control devices at a specific location, such that the appropriate lighting control device can be programmed for lighting control. For example, a floor plan of the lighting control system may be designed and programmed on a computing device using design software. The floor plan may indicate each lighting fixture and its corresponding location in a room or building. The design software may create a database of programming and/or control information for controlling the lighting control devices at identified locations in the floor plan. The programming and/or control information may be uploaded to a system controller for controlling the lighting fixtures. However, the installer, at the location of a particular lighting fixture, cannot readily identify that particular lighting fixture or the lighting fixtures address to enable the programming and/or control information to be used to communicate the proper commands to the lighting fixtures at the defined locations on the floor plan. In some example systems, the lighting control devices may be installed in a location and a database may be created at the time of commissioning the system, but the identity and/or address of the devices at a given location may be unknown after installation for enabling proper programming for lighting control. Examples of design software for lighting control systems are described in greater detail in commonly-assigned U.S. Patent Application No. 2017/0228110, published Aug. 10, 2017; U.S. Patent Application No. 2017/0235470, published Aug. 17, 2017; and U.S. Patent Application Publication No. 2018/0203591, all entitled CONFIGURING A LOAD CONTROL SYSTEM, the entire disclosures of which are hereby incorporated by reference.

Determining the identity and/or address that is assigned to a specific lighting control device or fixture may be time-consuming and/or expensive. For example, an installer may turn on individual lighting control devices (e.g., while others remain off) to associate the physical location of the lighting control devices (e.g., as determined by floor plan stored in the database created by the design software) with a given identifier or address of the lighting control device. In another example, radio frequency (RF) signal strength detection may be used to approximate which specific lighting control device or lighting fixture is closest to an installer. The installer may compare the lighting control device with the strongest signal strength to a floor plan and assign the serial number for a device closest to the installer's current location with a known identity in the floor plan.

SUMMARY

Lighting control systems may be commissioned for programming and/or control with the aid of a mobile device. As described herein, a lighting control system may include lighting control devices for providing an amount of power to a lighting load. A control device may send instructions to the lighting control device (e.g., via wired or wireless communication) for providing the amount of power to the lighting load. The lighting control device may be assigned a unique identifier (e.g., serial number, an address, such as a wireless address or a wired link address, etc.) for receiving instructions to provide the amount of power to the lighting load.

Design software may be implemented to identify the location of the lighting control devices within the lighting control system. The location may be, for example, a particular room in a building. For example, the design software may be used to create a floor plan of how the lighting control system may be designed, such as the location of lighting control devices within a space, the devices with which the lighting control devices interface, etc. The design software may also be used to program how the lighting control devices are to be programmed for performing lighting control. The floor plan may identify each lighting fixture and its corresponding location in a room or building. The design software may generate floor plan identifiers for each lighting fixture, or group of lighting fixtures. The design software may create a database that includes the programming and/or control information for controlling the lighting control devices that correspond to each lighting control device, or group of lighting control devices, identified by a floor plan identifier in the database.

During commissioning of the lighting control system, a mobile device may be used to help identify the lighting devices that have been installed in the physical space. For example, the mobile device may receive a communication from each lighting control device that indicates a unique identifier (e.g., serial number, address, etc.) of the lighting control device. The unique identifier may be communicated by visible light communication (VLC) (e.g., LiFi) or radio-frequency (RF) communication (e.g., a Bluetooth signal or another RF communication signal).

The lighting control device in the lighting fixture may cause the lighting load to blink the unique identifier of the lighting control device such that it may be identified by images taken by an image-capturing circuit, such as a camera, of the mobile device. For example, a mobile device may be oriented in relation to one or more of the lighting loads. The mobile device may generate a video recording or live video stream that captures a binary representation of the unique identifier of the lighting control device. The unique identifier may be blinked at a high frequency, such as a low bandwidth LiFi, for example.

The lighting control device in the lighting fixture may broadcast the unique identifier of the lighting control device via RF. The unique identifier may be broadcasted using a wireless technology and/or protocol, such as, for example, WI-FI®, BLUETOOTH®, near field communication (NFC), ZIGBEE®, THREAD, CLEAR CONNECT™, or the like. Multiple unique identifiers may be transmitted at the same time, e.g. by multiple lighting control devices. A mobile device may determine which unique identifier corresponds to which lighting control device by measuring the signal strength of the transmissions. For example, the mobile device may determine that the strongest received signal corresponds to the closest transmitting lighting control device, and/or that the weakest received signal corresponds to the farthest transmitting lighting control device.

A mobile device with a camera may aid in commissioning a lighting control system. A mobile device may be, for example, a cell phone, a laptop or tablet computer, or a wearable device (e.g., wearable computer glasses). The mobile device may be an autonomous mobile device, or may be attached to an autonomous mobile device (e.g., a drone, Roomba®, and/or the like).

The lighting control system may include one or more lighting fixtures and one or more lighting control devices. A lighting fixture may be, for example, a ceiling light. A lighting fixture (e.g., each lighting fixture) may be connected to a lighting control device. In an example, the camera of the mobile device may be pointed at one or more lighting fixtures, e.g. on the ceiling of a room. The mobile device may display an image of the lighting fixture on its screen. The lighting fixture may transmit a unique identifier, and the mobile device may receive the unique identifier from the lighting fixture. The unique identifier may be, for example, the serial number of the lighting control device that is controlling the fixture. For example, if a lighting control device with serial number "ABC123" is connected to a given fixture, that fixture may transmit the unique identifier "ABC123". A unique identifier may be transmitted by, for example, VLC (e.g., LiFi) signals. If the unique identifier is transmitted by VLC signals, it may be at a frequency that is high enough so as to be invisible to the human eye, e.g. 60 Hz. In addition, the unique identifier may be transmitted by, for example, RF signals.

In an example, once the mobile device has received the unique identifier transmitted by a lighting fixture, the mobile device may determine an identity of a floor plan lighting fixture that corresponds to the physical location of the transmitting lighting fixture. The mobile device may receive a unique identifier, and may select an alphanumeric string as the identity of the floor plan lighting fixture. For example, the mobile device may display the unique identifier "ABC123," and may identify the fixture as "Downlight 3". The mobile device may alternatively determine the identity of the floor plan lighting fixture without using a display. The mobile device may use information from a floor plan and may select a floor plan lighting fixture from the floor plan. For example, the mobile device may receive the unique identifier "ABC123", and may select the floor plan lighting fixture that corresponds with the transmitting lighting fixture based on a floor plan. The mobile device may associate the determined identity (e.g., "Downlight 3") with the received unique identifier (e.g., "ABC123"). The association may be stored in a table or otherwise retained. Associating a unique identifier with an identity may include storing information regarding the physical location of the load control device corresponding to the unique identifier. For example, an association may identify a load control device (e.g., a lighting control device) to which a user may send instructions using the associated unique identifier for controlling an amount of power provided to a lighting fixture.

Commissioning of a lighting control system may be performed, e.g. automatically or semi-automatically. A mobile device may determine its location, e.g. in a room within a building. The mobile device may be an autonomous mobile device or may be attached to an autonomous mobile device (e.g., a drone, Roomba®, and/or the like). The mobile device may perform commissioning autonomously. For example, the mobile device may transport itself (e.g., autonomously) to the room in order to perform commissioning. The user may be in a different location (e.g., a remote location) than the mobile device and may control or direct the mobile device over a network (e.g., the Internet). The mobile device may transmit images and/or other information to the user and may receive commands from the user.

The mobile device may determine a floor plan of the location and may use the floor plan in commissioning the lighting control system. For example, the mobile device may create a floor plan of the location by traveling (e.g., autonomously) around the location and mapping the location of one or more objects. For example, the mobile device may be attached to a Roomba®, which may travel around the floor of the location and map the location of objects (e.g., chairs, tables, walls, etc.) in the location relative to a predetermined point. In another example, the location may be automatically determined, e.g. by a real-time locating system executed on the mobile device. The mobile device may compare information from the real-time locating system to a floor plan or a list of locations in order to determine its location. The location may be determined using, for example, global positioning system (GPS) data. If the location of the mobile device is located automatically, the location may be confirmed by the user.

Once the location of the mobile device is known, the mobile device may orient itself relative to one or more lighting fixtures within the location. For example, one or more of an internal compass, gyroscope, accelerometer, and/or any other sensor for detecting orientation on a mobile device may be used to orient the mobile device. A mobile device may be oriented by receiving an image from a camera in the mobile device, and using one or more known objects and/or points within the location. The mobile device may determine its orientation automatically. For example, the device may use the position of one or more lighting fixtures and/or windows to determine its orientation. The device may determine its orientation by detecting the location of two or more corners of the room. The mobile device may receive input from the user regarding its orientation and may factor this input into its determination. The mobile device may alter its orientation autonomously. For example, the mobile device may tilt and/or rotate itself.

Once the location and orientation of the mobile device are known, the mobile device may capture an image of the location using a camera. The image may include one or more lighting fixtures (e.g., one or more ceiling lights). A lighting fixture (e.g., each lighting fixture) may be connected to a lighting control device. The mobile device may access floor plan data corresponding to the location. The floor plan data may graphically represent one or more floor plan lighting fixtures. A floor plan lighting fixture (e.g., each floor plan lighting fixture) may correlate to a lighting fixture, e.g. within the location of the mobile device. The floor plan data may include one or more icons representing the physical location of the lighting fixtures, representations of connections to other devices (e.g., other lighting fixtures, switches, sensors, or other devices), group identifiers indicating groups of lighting control devices that may be controlled together, and/or a combination thereof. The floor plan data may include one or more floor plan identifiers, e.g. one for each floor plan lighting fixture. The floor plan data may include programming and/or control information for controlling the lighting control devices at identified locations in the floor plan. The programming and/or control information may be uploaded to a system controller for controlling the lighting fixtures.

The lighting fixture may transmit a unique identifier, and the mobile device may receive the unique identifier from the lighting fixture. The unique identifier may be, for example, the serial number of the lighting control device that is controlling the fixture. For example, if a lighting control device with serial number "ABC123" is connected to a given fixture, that fixture may transmit the unique identifier "ABC123". Unique identifiers may be transmitted by, for example, VLC (e.g., LiFi) or RF. If the unique identifier is transmitted by VLC, it may be at a frequency that is high enough so as to be invisible to the human eye, e.g. greater than 100 Hz.

Once the mobile device has received the unique identifier, the mobile device may associate the received unique identifier with the floor plan lighting fixture that correlates with the lighting fixture from which the unique identifier was received. The association may be stored in a table or otherwise retained. The association may be performed automatically, e.g. without the input of a user. The association may be performed semi-automatically, e.g. the user may confirm that the associations made are correct as a whole and/or individually. Associating a unique identifier with a floor plan lighting fixture may include storing information regarding the physical location of the load control device corresponding to the unique identifier. For example, an association may identify a load control device to which a user may send instructions using the associated unique identifier for controlling an amount of power provided to a lighting fixture.

A control device (e.g., a lighting control device, lighting fixture, or any other type of control device) that is functioning improperly may be fixed by troubleshooting problems with the control device. For example, a control device that fails to respond to one or more commands from a system controller may be fixed by troubleshooting a reason for the lack of response. The mobile device may receive a unique identifier from the improperly-functioning control device (e.g., as described herein). The mobile device may compare the unique identifier to an expected unique identifier for the control device (e.g., based on floor plan data). If there is a discrepancy between the unique identifiers, the mobile device may determine that the control device was incorrectly installed and may alert a user. The mobile device may modify the expected unique identifier and/or the unique identifier of the control device when troubleshooting the control device.

Two or more control devices may be connected (e.g., associated), for example via a wired connection and/or an association. For example, a wall switch may be connected to one or more lighting control devices. An improperly-functioning control device may fail to respond to commands sent from a second control device (e.g., via the system controller) to which the improperly-functioning control device is expected to be connected (e.g., the improperly-functioning control device is missing a connection). The improperly-functioning control device may respond to commands sent from a third control device (e.g., via the system controller) to which the improperly-functioning control device is not expected to be connected (e.g., the improperly-functioning control device has an extra connection). The mobile device may compare the connections for the improperly-functioning control device to expected connections for the device. If there is a discrepancy, the mobile device may determine that the improperly-functioning control device is missing a connection and/or has an extra connection. The mobile device may alert the user to the discrepancy.

The mobile device and/or the user may control a control device via a mobile device (e.g., a mobile application executed on the mobile device). For example, the user may select the control device on the display, and may enter a command in the display. The mobile device may send the command to the control device (e.g., via the system controller). The command may be sent as one or more digital messages.

DETAILED DESCRIPTION

Figure 1:
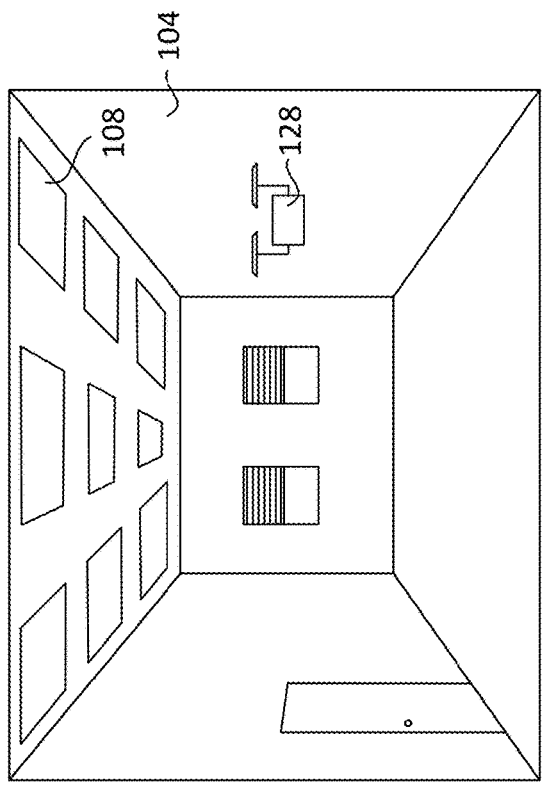
FIG. 1 is a perspective view of a representative environment for commissioning and/or controlling a lighting fixture.
Figure 1:
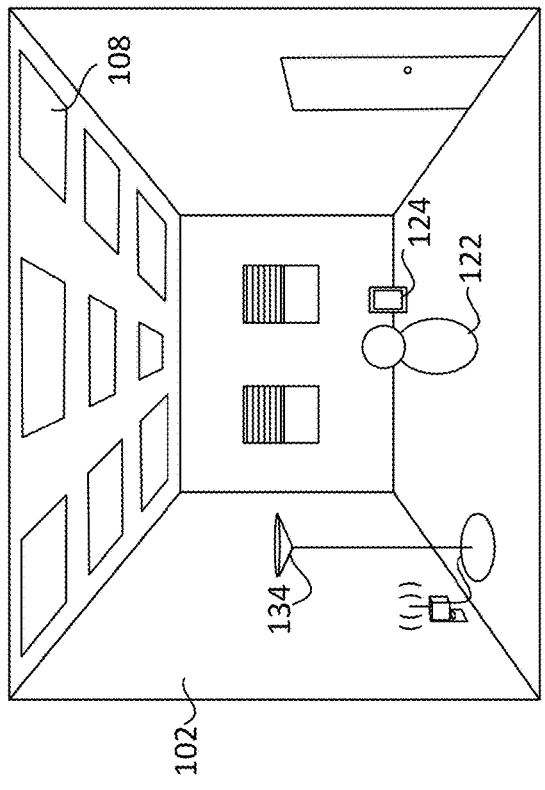
Figure 1:
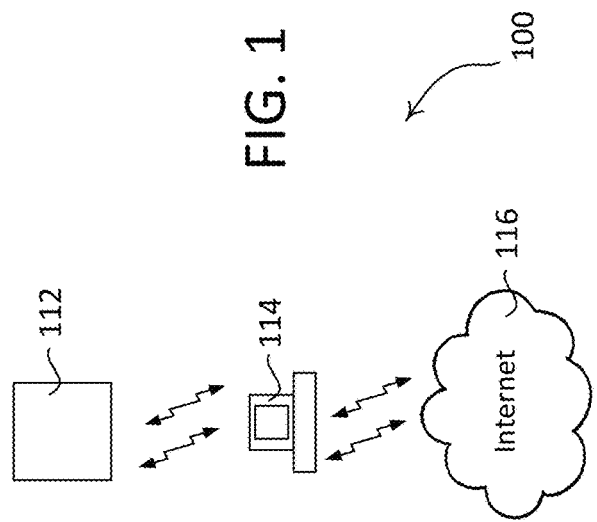
Figure 1:
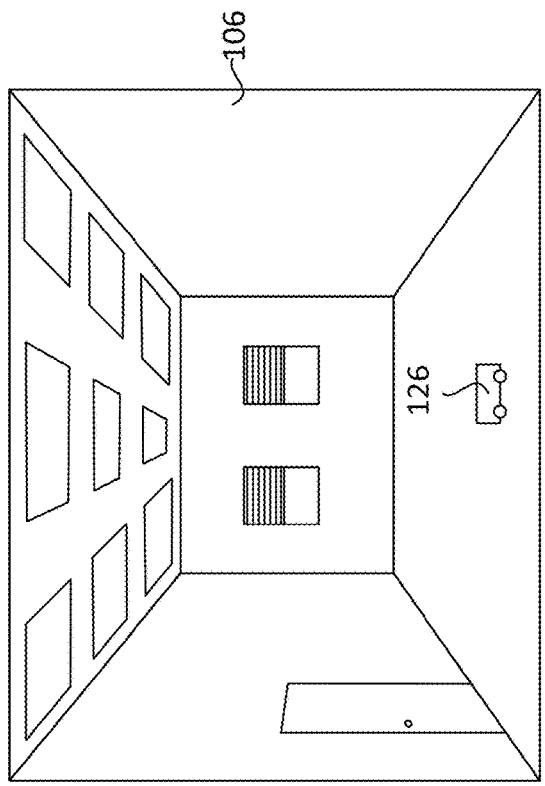

FIG. 1 is a perspective view of a representative environment for commissioning a load control system 100 having one or more lighting fixtures 108. As shown in FIG. 1, each of rooms 102, 104, and 106 may be in the same building and may be installed with one or more lighting fixtures. Rooms 102 and 104 may be on the same floor. Room 106 may be on a different floor than rooms 102 and 104. Each lighting fixture 108 may include one or more lighting loads (e.g., light-emitting diodes (LEDs), fluorescent lamps, etc.) and one or more lighting control devices (e.g., LED drivers, electronic ballasts, etc.) that are in communication with a control device (e.g., a system controller 112). Each lighting control device may be configured to adjust an intensity (e.g., a brightness) and/or a color (e.g., a color temperature) of the respective lighting fixture.

The communications between the system controller 112 and the lighting control devices of the lighting fixtures 108 may be wired or wireless communications. The Digital Addressable Lighting Interface (DALI) may be an example protocol used for wired communications between load control devices. Wireless communication protocols may include WI-FI®, BLUETOOTH®, near field communication (NFC), ZIGBEE®, THREAD, CLEAR CONNECT™, and/or other wireless communication protocols.

The system controller 112 may assign a unique identifier to each of the lighting control devices, or group of lighting control devices, with which it may be in communication for controlling the amount of power provided to the lighting loads of the corresponding lighting fixture. For example, a lighting control device may be assigned a unique identifier by the system controller 112 for communicating load control instructions for controlling the lighting load controlled by the lighting control device. The unique identifier may be stored at the lighting control device and may be used by the lighting control device to identify the instructions received from the system controller 112 to which to respond. Though description may be provided for commissioning lighting fixtures having a lighting control device or an LED driver, other lighting control devices may similarly be commissioned as described herein. For example, the lighting fixtures may each comprise a dimming circuit for controlling a dimmable lighting load, such as an incandescent lamp, or another lighting control device for controlling a different type of lighting load.

The unique identifiers may be randomly assigned to each lighting control device (e.g., after installation). The unique identifiers may not indicate the physical locations of the lighting control devices, and thus a user 122 may have difficulty controlling the lighting control devices based on their corresponding unique identifiers. Each lighting control device may also be assigned a floor plan identifier (e.g., during a design process of the load control system prior to installation of the lighting control devices) that may identify the physical location of each lighting control device to the user 122. For example, the floor plan identifier may be included on a floor plan of the physical space (e.g., building, room, etc.) or other means that may enable the user 122 to recognize the physical location of a lighting control device or group of lighting control devices. As the user 122 may know the floor plan identifier associated with each lighting control device, but may be unaware of the unique identifier for communicating instructions to the lighting control device, the user 122 may operate to associate each floor plan identifier with the unique identifier assigned to the lighting control device during commissioning of the lighting control system.

As shown in FIG. 1, the user 122 may know the floor plan identifier of a lighting control device and may want to associate the lighting control device with the unique identifier assigned to lighting control device by the system controller 112. To determine the unique identifier assigned to the lighting control device, the system controller 112 may instruct the lighting control devices in rooms 102, 104, and 106, or a subset thereof, to identify the unique identifier assigned thereto. For example, the system controller 112 may instruct the lighting control devices to reveal themselves by blinking a corresponding lighting load of a lighting fixture by modulating the magnitude of the light emitted by the lighting fixture (e.g., flashing at a very fast rate) in a manner that indicates the unique identifier. The blinking may be performed at a rate unidentifiable by the human eye, but identifiable by a camera (e.g., greater than approximately 100 Hz). The lighting control device may use the associated lighting load of the lighting fixture 108 to identify the unique identifier assigned to the lighting control device by blinking the lighting load of the lighting fixture 108 in a manner that identifies the unique identifier. The lighting control device may blink the lighting load of the lighting fixture 108 by increasing and decreasing an amount of power provided to the lighting fixture 108, such that the unique identifier is exposed by blinking the lighting load of the lighting fixture 108. For example, the lighting control device may turn the lighting load of the lighting fixture 108 on and off, increasing and decreasing the dimming level of the lighting load, or some combination thereof.

The lighting control devices may also, or alternatively, reveal themselves by communicating a digital message that includes the unique identifier assigned to the lighting control device. For example, the unique identifier may be communicated via a radio frequency (RF) communication, such as WI-FI®, BLUETOOTH®, near field communication (NFC), ZIGBEE®, CLEAR CONNECT™, etc., from the lighting control device of the lighting fixtures.

A mobile device 124 may identify the unique identifier provided by the lighting control devices. For example, the mobile device may be implemented to visually identify the unique identifier in images captured by an image-capturing circuit, such as a camera, of the mobile device 124. The mobile device 124 may be positioned by the user 122 to identify the unique identifier provided by the lighting control devices. The mobile device 124 may be a cellular phone, a smartphone, a tablet, a wireless load control device, a photosensor, or another computing device capable of being implemented by the user 122 in the load control environment as described herein.

An autonomous mobile device, such as a ground-based autonomous mobile device 126 or an airborne autonomous mobile device 128, may be implemented to identify the unique identifier provided by the lighting control devices. The autonomous mobile devices 126, 128 may autonomously move throughout the rooms 102, 104, and/or 106 to capture images of the lighting patterns being provided by the lighting control devices. The autonomous mobile devices 126, 128 may each include an image-capturing circuit, such as a camera, that may be implemented to autonomously capture images for visually identifying the unique identifier. In another example, the autonomous mobile devices 126, 128 may be implemented to autonomously transport the mobile device 124, which may capture the images for identifying the unique identifier provided by the lighting control devices. References to mobile device 124 herein may refer to autonomous mobile device 126, 128, and vice versa.

The ground-based autonomous mobile device 126 may autonomously move around the ground of the rooms 102, 104, and/or 106 using wheels, tracks, and/or another form of ground transportation. The ground-based autonomous mobile device 126 may comprise a control circuit and an electronic motor that controls the wheels or tracks in response to control signals from the control circuit. The wheels or tracks of the ground-based autonomous mobile device 126 may move in the same direction and may be rotated in opposite directions to allow the ground-based autonomous mobile device 126 to rotate 360 degrees.

The airborne autonomous mobile device 126 may be an unmanned aircraft capable of autonomously moving through the rooms 102, 104, and/or 106 in the air (e.g., similar to a drone or other automated unmanned aircraft capable of transportation in the air). The airborne autonomous mobile device 126 may move through the air using propellers, wings, and/or another form of air transportation. The airborne autonomous mobile device 126 may comprise a control circuit and an electronic motor that controls the propellers in response to control signals from the control circuit. The airborne autonomous mobile device 126 may take off, fly, hover, and/or land vertically.

The autonomous mobile devices 126, 128 may each be equipped with sensors for enabling autonomous control. The sensors may include cameras, infrared (IR) sensors, photocell sensors, geolocation sensors (e.g., GPS), ultrasonic sensors, lidar sensors, time-of-flight sensors, touch sensors, a gyroscope, an accelerometer, and/or other sensors for enabling autonomous control throughout the rooms 102, 104, and/or 106. The sensors may allow for detection of walls (e.g., including ceiling and floors) and/or other obstacles for avoidance while navigating the rooms 102, 104, and/or 106. Monocular vision may be implemented to enable multiple sensors (e.g., cameras) to be separately controlled for a broader range of vision in the space. The touch sensors may be implemented to detect when a bumper with a built-in touch sensor touches a wall or other obstacle in the space. Each autonomous mobile device 126, 128 may slow down or stop when it detects it is within a predefined range of a wall or other obstacle, or when it comes in contact with the obstacle. The sensors may be mounted on the top, sides, and/or underneath side of the autonomous mobile devices 126, 128. Sensors, such as cameras or IR sensors, that are mounted on the underneath side of the airborne autonomous mobile device 128 may detect the distance to the ground, which may help detect stairs or other drops in space for autonomous navigation (e.g., avoidance, slowing down, landing, etc.).

The autonomous mobile devices 126, 128 may each navigate a space, such as rooms 102, 104, and 106, based on a two-dimensional or three-dimensional map stored locally thereon. The maps may be prestored or generated as the autonomous mobile devices 126, 128 move throughout the space. The maps may be updated over time as objects move within the space. To create the map of the space, the autonomous mobile devices 126, 128 may follow the walls of the rooms 102, 104, 106 and sense obstacles within the rooms 102, 104, 106. The autonomous mobile devices 126, 128 may record images of the rooms 102, 104, 106 with the cameras and/or IR sensors to generate the maps of the space.

The autonomous mobile devices 126, 128 may be remotely controlled based on instructions from a user, such as the user 122. The user 122 may control the movement and the camera of the autonomous mobile devices 126, 128 using the network device 124 or a remote computing device.

The camera of each of the mobile devices 124, 126, 128 may take images of the lighting fixtures 108 and may identify the unique identifier provided by the lighting control device in the lighting fixtures. The unique identifier may be associated with the floor plan identifier assigned to the lighting control device. The association may be performed via the mobile devices 124, 126, 128, the system controller 112, and/or a server 114 (e.g., a remote computer). If the association is performed at the mobile devices 124, 126, 128, the association may be sent to the server 114 and/or the system controller 112 for storage.

The system controller 112 may send the identification instructions to the lighting control device upon receiving a trigger from the user 122. For example, the user 122 may select a button on one of the mobile devices 124, 126, 128 that causes the mobile device to send a message to system controller 112 to trigger transmission of the identification instructions. The mobile devices 124, 126, 128 may each communicate with the system controller 112 directly via a short range wireless channel (e.g., WI-FI®, BLUETOOTH®, etc.) and/or indirectly via the server 114 and the internet 116 (e.g., using a WI-FI® network, a cellular network, a WI-MAX® network, etc.). The server 114 may forward communications received from the mobile devices 124, 126, 128 to the system controller 112 using a wired or wireless communication.

In another example, the identification instructions may be sent to each lighting control device directly from the mobile devices 124, 126, 128. For example, the mobile devices 124, 126, 128 may send the identification instructions via a broadcast message that may cause any lighting control device that receives the instructions to identify its unique identifier. The broadcast message may be sent via any short range wireless channel (e.g., WI-FI®, BLUETOOTH®, etc.), for example.

As the lighting control device in the lighting fixture 108 may be included in a group of lighting control devices blinking their respective unique identifier, the mobile devices 124, 126, 128 may each be configured to capture images (e.g., multiple sequential images, such moving images or videos) that include the unique identifier of multiple lighting control devices without having to change locations. For example, the camera on each mobile device 124, 126, 128 may be able to capture images of each of the lighting fixtures being blinked by the respective lighting control devices in the group to visually identify the unique identifier of each lighting control device in the group. The camera on each mobile device 124, 126, 128 may be able to capture images of each of the blinking lighting fixtures from one location or may move from the physical location of one lighting control device to the next to capture images of the unique identifier of each lighting control device. While FIG. 1 illustrates identification of a unique identifier for a lighting control device (e.g., an LED driver), the unique identifier may be similarly identified for other lighting control devices capable of controlling a lighting load, such as an LED driver, a ballast, or other lighting control device, for example.

Figure 2:
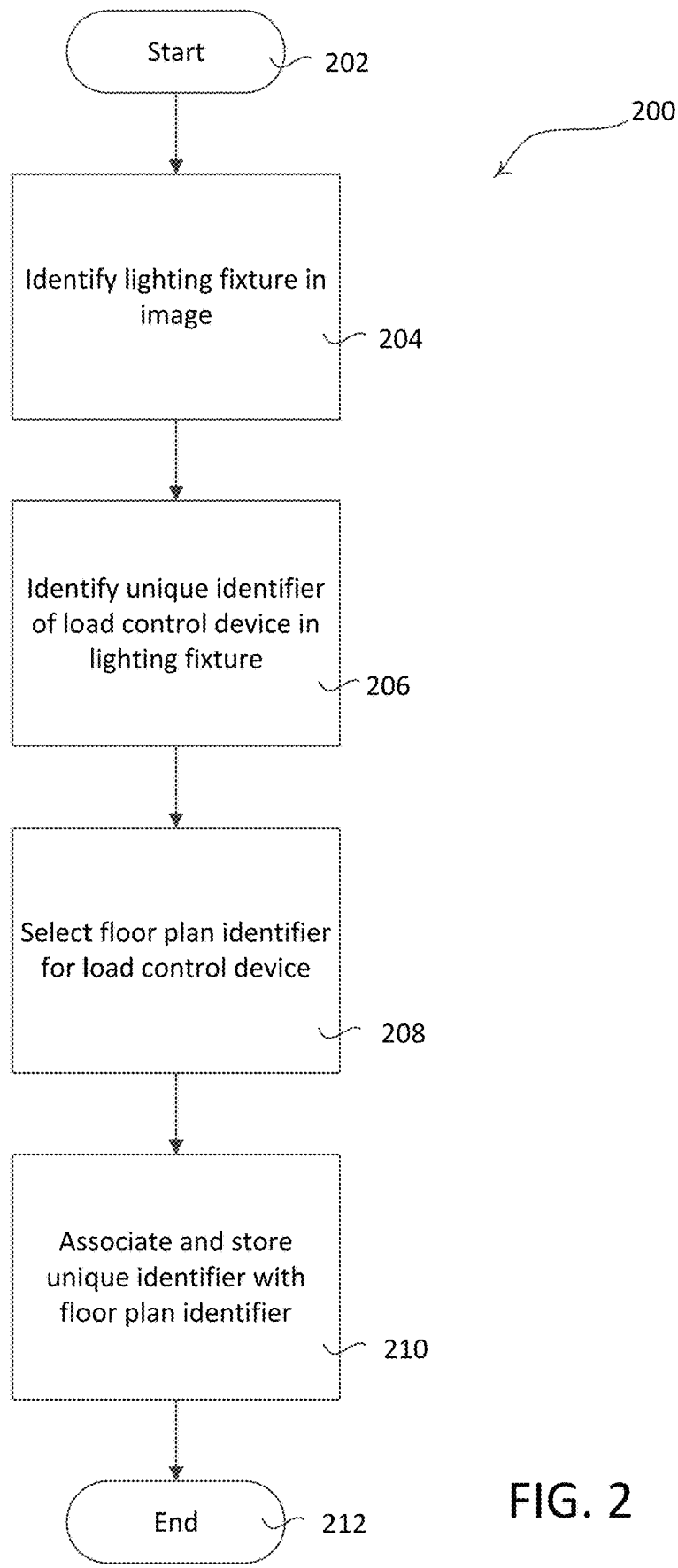
FIG. 2 is a flow diagram depicting an example method for identifying a lighting fixture and associating the lighting fixture with a load control device.

FIG. 2 is a flow diagram depicting an example method 200 for identifying a lighting fixture (e.g., a lighting control device that controls a lighting load of the lighting fixture) and associating a unique identifier with a floor plan identifier of the lighting fixture, e.g., using a mobile device (e.g., the mobile device 124 and/or the autonomous mobile devices 126, 128). The method 200 may start at 202. At 204, the lighting fixture may be identified in an image. The lighting fixture may be automatically identified by the identifying a region of relatively higher brightness in the image. The lighting fixture may be identified based on user input. For example, the mobile device may capture an image that includes a lighting fixture and display the image on a display of the mobile device for user identification of the fixture within the image. The mobile device may be located in a given location. For example, the location may be a hallway, an area, a space, or a room of a building. The mobile device may be at a position within the location. The image of the lighting fixture may be a single image or a video of the location. The image may include one or more lighting fixtures. The mobile device may highlight or otherwise indicate the lighting fixtures in the image so that they are identifiable by the user. The mobile device may prompt the user to select a lighting fixture to commission. Alternatively, the mobile device may select a lighting fixture automatically (e.g., based on a predetermined order). When more than one lighting fixture is in the image, multiple lighting fixtures may be selected.

At 206, a unique identifier of the load control device in the lighting fixture may be identified. The unique identifier may be identified by the mobile device, the system controller, or another device. The unique identifier may be automatically identified by the mobile device. The unique identifier may identify a lighting control device that controls the lighting fixture. The unique identifier may be an alphanumeric string. The lighting control device may transmit the unique identifier by, for example, causing a lighting load of the lighting fixture to blink in a predetermined pattern (e.g., to modulate the light emitted by the lighting fixture to transmit the unique identifier via VLC signals) or otherwise blink to communicate data. The unique identifier may be communicated at a frequency that is imperceivable to the human eye (e.g., greater than approximately 100 Hz). The camera on the mobile device may capture the images that include the signaling of the unique identifier, which may be interpreted by the mobile device, the system controller, or another device.

The unique identifier may also, or alternatively, be communicated via RF. For example, the unique identifier may be signaled using WI-FI®, BLUETOOTH®, near field communication (NFC), ZIGBEE®, CLEAR CONNECT™, and/or another RF protocol. If there is more than one lighting fixture, the mobile device may determine which lighting fixture communicated the unique identifier by comparing signal strengths. For example, the mobile device may determine that the unique identifier associated with the strongest RF signal was received from the lighting control device that is physically closest to the mobile device. The mobile device may use input from the user to determine which lighting fixture communicated the unique identifier and/or to confirm that the mobile device has selected the correct lighting fixture. For example, the mobile device may prompt the user to indicate which lighting fixture communicated the unique identifier. The user may select a button on the mobile device to cause the mobile device to send a digital message to a lighting control device to blink its respective lighting load, so that the user can view the blinking lighting load of the lighting control device in the physical space that corresponds with a given RF signal strength or unique identifier.

At 208, a floor plan identifier for the lighting fixture from which the unique identifier was received may be selected. For example, the floor plan identifier may be selected based on user input. The mobile device may display the received unique identifier on the display of the mobile device. The user may select the floor plan identifier and may provide the selected floor plan identifier to the mobile device by, for example, entering the floor plan identifier into a text box displayed on the display of the mobile device. The floor plan identifier may be an alphanumeric string. For example, a floor plan identifier for a given lighting fixture may be "Downlight 1". The mobile device may present a suggested floor plan identifier or a list of suggested floor plan identifiers to the user based on the floor plan data. The user may choose whether to use the suggested floor plan identifier or may choose one from the list of suggested floor plan identifiers. The floor plan data may be generated during a design process of the load control system prior to installation of the load control system. Each lighting fixture within a given location may have a unique floor plan identifier in the floor plan data. The mobile device may prompt the user to confirm that the selected floor plan identifier is correct.

At 210, the selected floor plan identifier may be associated with the received unique identifier. The association may be performed by the mobile device, the system controller, or another device. The association between the floor plan identifier and the unique identifier may be stored in a memory of the mobile device and may be transmitted by the mobile device to an external device having a memory (e.g., the system controller, a server, and/or another external device) and stored on the external device. For example, the system controller and/or the server may be configured to identify commands for the lighting control devices using the floor plan identifiers, and transmit the commands to the lighting control devices using the unique addresses of the lighting control devices. In addition, the association may be transmitted to the lighting control devices and stored on a memory of the lighting control devices, such that the lighting control devices can identify messages that include their floor plan identifier. The method 200 may end at 212 and the associations may be used to configure and/or control the lighting loads in the lighting control system.

The example method 200 may be performed with the user in a different location (e.g., a remote location) than the mobile device. For example, the user may communicate with an autonomous mobile device using a remote computing device. The remote computing device may be connected to the autonomous mobile device via a network. For example, the remote computing device may be connected to the autonomous mobile device via a wireless communication signal (e.g., WI-FI®, BLUETOOTH®, near field communication (NFC), ZIGBEE®, THREAD, and/or CLEAR CONNECT™). The autonomous mobile device may send images from an internal camera to the remote computing device, and the user may interact with the remote computing device to provide commands to the autonomous mobile device. The autonomous mobile device may receive one or more inputs from the user via the remote computing device and may perform commissioning based on the inputs.

The example method 200 may be performed autonomously by an autonomous mobile device (e.g., without input from a user). At 204, the autonomous mobile device may identify the lighting fixture in the location. The autonomous mobile device may move to the location using an electric motor that is connected to one or more modes of transportation. For example, the autonomous mobile device may be a drone, and the electric motor may be connected to one or more propellers. The autonomous mobile device may orient and/or locate itself such that one or more lighting fixtures are in view of the internal camera. Alternatively, the autonomous mobile device may determine its location relative to a lighting fixture using, for example, a real-time locating system executed on the autonomous mobile device or an RF signal received from the lighting fixture.

The autonomous mobile device may select a lighting fixture to commission automatically. For example, the autonomous mobile device may select lighting fixtures to commission in a predetermined order (e.g., closest to furthest). The lighting fixture may be automatically identified by the autonomous mobile device identifying a region of relatively higher brightness in the image (e.g., above a predefined threshold). If there are multiple lighting fixtures in the image, the autonomous mobile device may select one of the lighting fixture to commission or may commission the lighting fixtures in parallel. For example, the autonomous mobile device may choose the closest lighting fixture (e.g., based on the largest region of higher brightness in the image) to commission. At 206, the unique identifier of the load control device in the lighting fixture may be identified as disclosed herein.

At 208, the autonomous mobile device may automatically select a floor plan identifier for the lighting fixture. For example, the autonomous mobile device may use floor plan data that is accessible to the autonomous mobile device to select a floor plan identifier. The floor plan data may be stored on a memory of the autonomous mobile device and/or may be stored elsewhere and accessed by the autonomous mobile device.

The floor plan data may associate a lighting fixture in a given location with a corresponding floor plan identifier for the lighting fixture. For example, the floor plan data may have a floor plan identifier for each lighting fixture in the location. The floor plan identifier may be an alphanumeric string. The autonomous mobile device may access the floor plan data and may correlate the lighting fixture from which the unique identifier was received with the corresponding floor plan identifier. For example, the autonomous mobile device may use information regarding its location, position (e.g., within the location), and/or orientation to determine which floor plan identifier corresponds to the lighting fixture. The floor plan data may identify the location of one or more known objects (e.g., windows, doors, lighting fixtures, corners of the room, etc.) in the location. The autonomous mobile device may determine its location relative to the known objects to determine which floor plan identifier corresponds to the lighting fixture. At 210, the selected floor plan identifier may be associated with the received unique identifier as described herein. The autonomous mobile device may associate the selected floor plan identifier with the received unique identifier automatically. The method 200 may end at 212 and the associations may be used to configure and/or control the lighting loads in the lighting control system.

Figure 3:
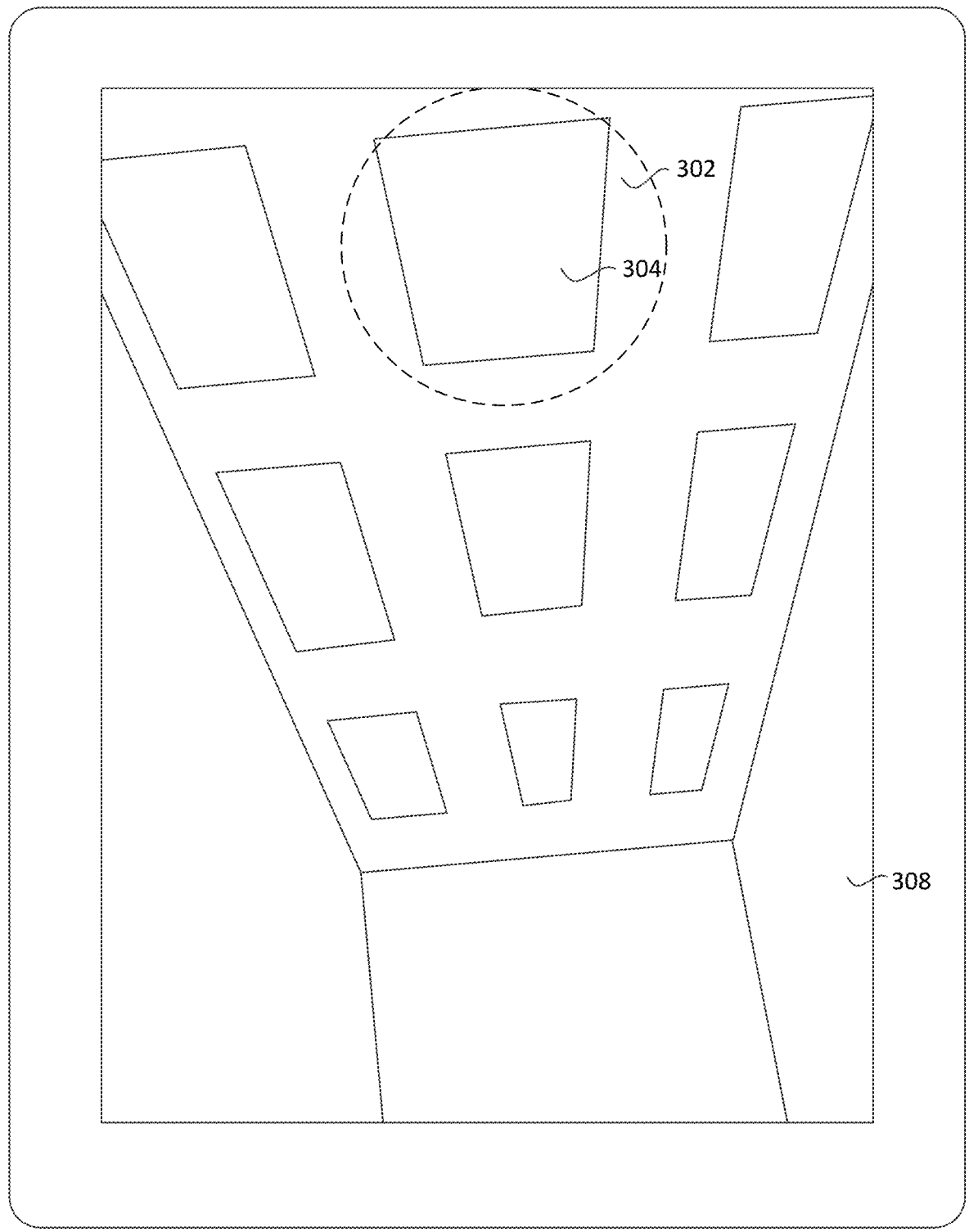
FIG. 3 depicts a representative image that may be displayed on a mobile device to identify a lighting fixture.

FIG. 3 depicts an example image 308 that may be obtained by a mobile device for displaying one or more lighting fixtures (e.g., at 204 of the method 200 of FIG. 2). The image 308 may represent a frame of a video generated by the mobile device, for example. The mobile device may be, for example, one of the mobile device 124 and/or the autonomous mobile devices 126, 128. The image 308 may be recorded by the camera on the mobile device and/or displayed on the mobile device for receiving user input. The image 308 may be recorded on an autonomous mobile device and transmitted to another mobile device for displaying the image on the other mobile device. The image 308 may be stored at an autonomous mobile device and processed by the autonomous mobile device to autonomously perform commissioning of the lighting fixtures. The image 308 may include the lighting fixtures within a room, or a subset thereof.

The mobile device may detect a lighting fixture 304 automatically or based on user indication. The mobile device may use an internal camera to capture an image or video of the lighting fixture 304. The user may orient the mobile device such that the internal camera is pointed towards one or more lighting fixtures. The image 308 may be displayed on a display of the mobile device for the user.

The autonomous mobile device may rotate and/or tilt itself and/or the internal camera such that the internal camera is pointed towards the lighting fixtures to capture images, such as the image 308. In another example, the user may be in a different location than the autonomous mobile device (e.g., a remote location), and may control the mobile device via a network connection to rotate and/or tilt itself and/or the internal camera. The user may send commands to the mobile device via the network connection and may receive images and/or other information from the mobile device. The image 308 may be displayed at the remote location such that the user can see the image 308.

The mobile device may detect the lighting fixture 304 automatically by comparing portions of the image 308 to determine whether one or more portions of the image 308 exceed an intensity threshold. For example, the mobile device may determine that the portion of the image 308 within the area 302 exceeds the intensity threshold and may determine that the area 302 includes the lighting fixture 304. The intensity threshold may be relative to the intensity level of the other portions of the image 308 to compensate for the lighting level of different videos, images, mobile device displays, or the like. The mobile device may detect lighting fixtures within the area 302 by detecting the shapes of one or more lighting fixtures within the image 308. The mobile device may be preconfigured to identify the size and/or shape of standard lighting fixtures in a building. The lighting fixtures may be compared to other portions of the room to determine the relative size of the lighting fixtures. For example, the lighting fixtures may be compared to ceiling tiles, windows, or other objects within the image to determine the relative size of the lighting fixtures. The largest lighting fixture, or group of lighting fixtures, may be automatically detected by the mobile device for association.

In another example, a user may indicate that the lighting load area 302 includes the lighting fixture 304. The user may provide such an indication by selecting within the area 302, circling the area 302, or otherwise indicating the area 302. The mobile device may assume there is a fixture within a predefined area indicated by a user, or may automatically detect one or more lighting fixtures within the identified portion of the image, as described herein.

After the lighting load area 302 is identified, the mobile device may analyze incoming video or frames of the video to detect the unique identifier indicated by the lighting load of the lighting fixture 304. The unique identifier may be automatically detected and stored at the mobile device.

Figure 4:
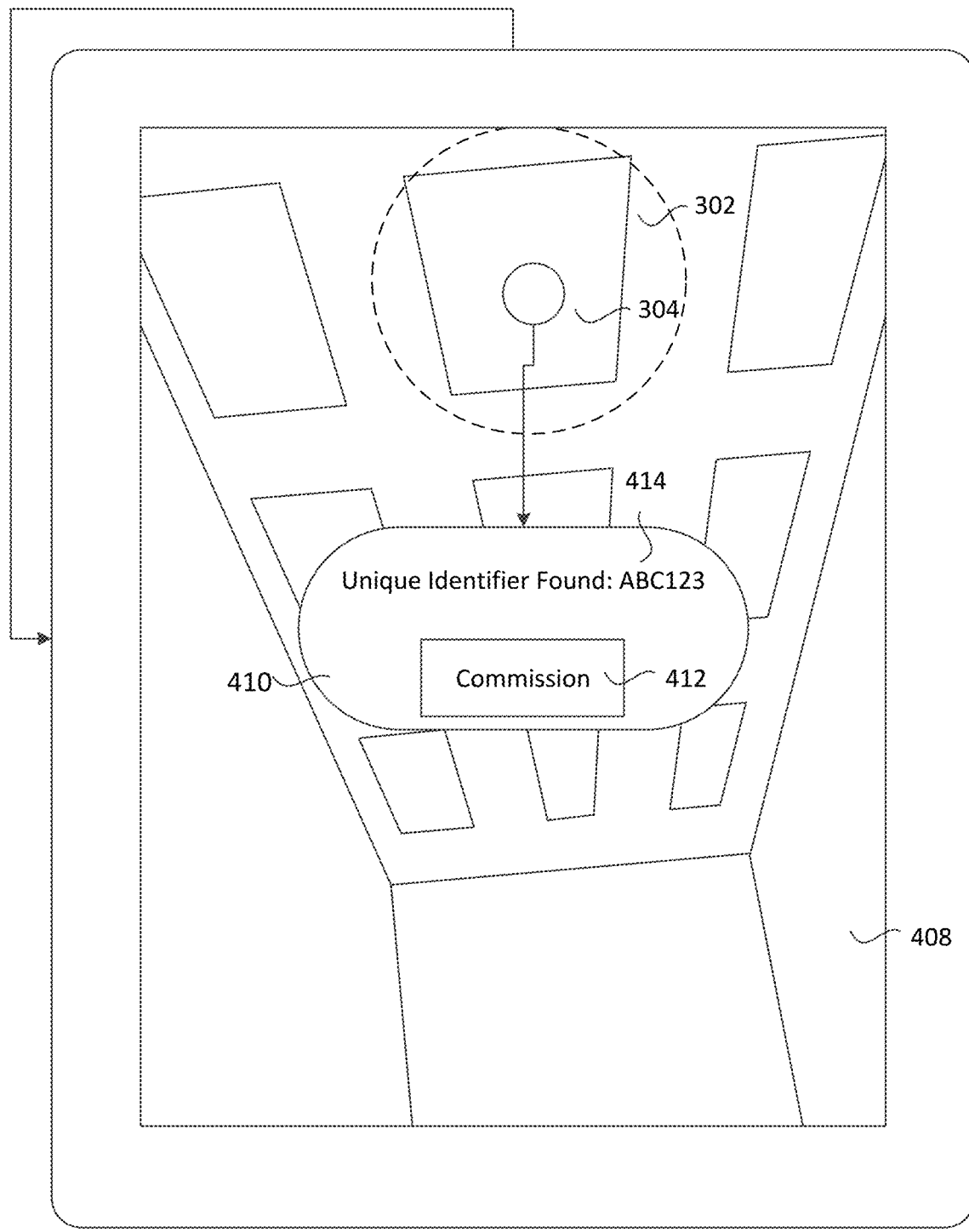
FIG. 4 depicts another representative image that may be displayed on a mobile device to identify a lighting fixture.

FIG. 4 depicts an example image 408 that may be generated by a mobile device for commissioning a lighting control device to display and/or identify a unique identifier 414 for the lighting control device (e.g., at 206 of the method 200 of FIG. 2). The image 408 may represent a frame of a video generated by the mobile device, for example. The image 408 may include the lighting fixtures within a location (e.g., a room of a building), or a subset thereof. The mobile device may overlay floor plan data, such as a unique identifier 414 that the mobile device has received from a lighting control device (not shown), onto the image 408. The unique identifier 414 may be signaled by the lighting load of the lighting fixture 304. The unique identifier 414 may be displayed in a popup window 410. The mobile device may indicate the lighting fixture 304 associated with the unique identifier 414 via overlay. If there is more than one lighting control device in the location, the mobile device may determine which lighting control device sent the unique identifier 414. For example, the mobile device may determine that the unique identifier 414 was received from a lighting control device controlling the lighting load of lighting fixture 304. The mobile device may indicate to the user which lighting control device sent the unique identifier 414. The popup window 410 may include a commission button 412 that, when pressed, may allow the user to enter floor plan data, such as a floor plan identifier, for the lighting fixture 304. The mobile device may prompt the user to confirm that the entered floor plan data is correct. The mobile device may automatically select a lighting fixture to commission. For example, the mobile device may commission multiple lighting fixtures in a predetermined order (e.g., closest in the image to furthest).

Referring again to FIG. 4, a lighting control device (not shown) may control the lighting load of the lighting fixture 304 and may use the lighting load of the lighting fixture 304 to signal the unique identifier of the lighting control device. For example, the mobile device may receive the signal from the lighting load of the lighting fixture 304 and may identify the unique identifier being signaled. The unique identifier may be transmitted and received via VLC signals. For example, the unique identifier of the lighting control device may be signaled by blinking the lighting load of the lighting fixture 304 in a pattern, sequence, rate, or the like that corresponds to the unique identifier.

The lighting control device may signal its unique identifier via, for example, RF signals. The mobile device may receive an RF signal from the lighting control device and determine the unique identifier based on the received signal (e.g., included in the RF signal). The RF signal may be a short-range signal (e.g., a WI-FI® signal, a BLUETOOTH® signal, a near field communication (NFC) signal, a ZIG-BEE® signal, a CLEAR CONNECT™ signal, or the like), or another RF signal. The mobile device may receive unique identifiers from more than one lighting control device at the same time. The mobile device may use the received signal strength to determine which unique identifier was sent by which lighting control device. For example, the mobile device may determine that the unique identifier associated with the strongest RF signal was received from the lighting control device that is physically closest to the mobile device. The mobile device may use information from the image 308 to determine which lighting control device is physically closest to the mobile device. For example, the mobile device may identify the lighting control device in the lighting fixture 304 as being physically closest to the mobile device based on its relative size to other lighting fixtures. The mobile device may use a real-time locating system executed on the mobile device (e.g., GPS, triangulation, NFC, geo-location, etc.) to determine which lighting control device is physically closest to the mobile device. The physically closest lighting control device may be located in a single lighting fixture that is included in the image, when one lighting fixture is identified. The mobile device may use input from the user to determine which lighting control device is closest to the mobile device. For example, the mobile device may prompt the user to select the lighting control device that is closest to the mobile device. The user may select the lighting fixture 304 as being the lighting device that is physically closest. The lighting device that is identified as being physically the closest may be assumed by the mobile device as having the unique identifier that is received with the strongest RF signal.

Figure 5:
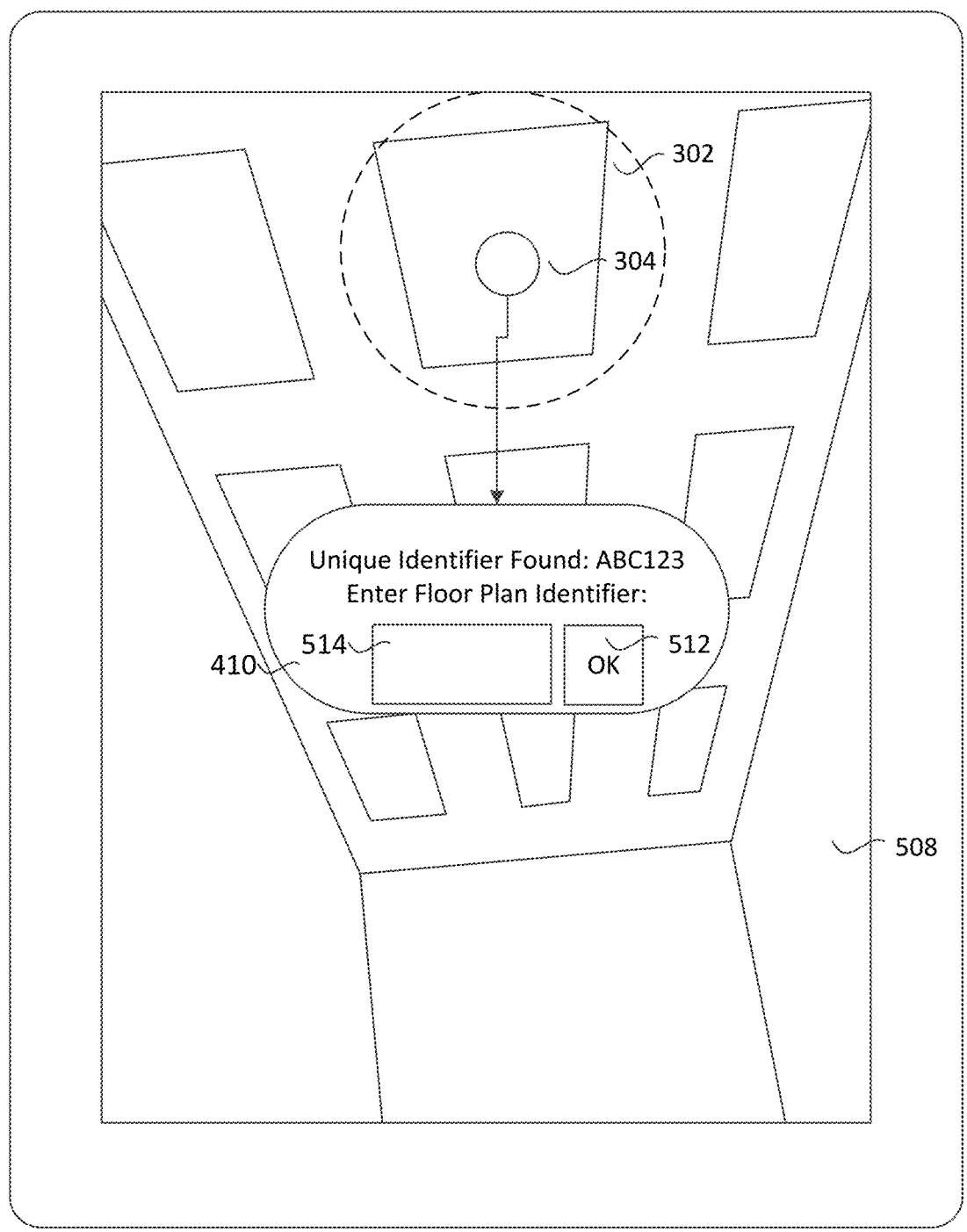
FIG. 5 depicts a representative image that may be displayed on a mobile device to associate the lighting fixture with a load control device.

FIG. 5 depicts an example image 508 that may be displayed on a mobile device to associate the unique identifier of a lighting control device with a floor plan identifier (e.g., at 208 of the method 200 of FIG. 2). The image 508 may represent a frame of a video recorded by and/or stored on the mobile device, for example. The image 508 may include the lighting fixtures within a room, or a subset thereof. The popup window 410 may display a text box 514 and/or a confirmation button 512. The text box 514 and/or the confirmation button 512 may be displayed, e.g. instead of the commission button 412 shown in FIG. 4. The image 508 may be displayed on the mobile device after the user has pressed the commission button 412 shown in FIG. 4. The user may select a floor plan identifier by entering a floor plan identifier into the text box 514. The floor plan identifier may be, for example, an alphanumeric sequence or other character sequence. The floor plan identifier may be determined from a blueprint or other drawing showing the floor plan of the building. After the user has entered a floor plan identifier into text box 514, the user may press the confirmation button 512.

The mobile device may automatically select a floor plan identifier for the lighting control device. For example, the mobile device may use floor plan data that is accessible to the mobile device to select a floor plan identifier. The floor plan data may be stored on a memory of the mobile device or may be stored elsewhere and accessed by the mobile device. The mobile device may display the selected floor plan identifier in the text box 514. The mobile device may associate a floor plan identifier with the unique identifier without displaying popup window 410.

The mobile device may associate the unique identifier of the lighting control device (not shown) connected to the lighting fixture 304 with the selected floor plan identifier. For example, a lighting control device may use the lighting load of the lighting fixture 304 to signal a unique identifier. The unique identifier may be, for example, "ABC123". The mobile device may receive the signaled unique identifier. The mobile device may indicate to the user that the unique identifier has been received. The mobile device may determine to commission the lighting control device. The user may indicate that they wish to commission the lighting control device by pressing the commission button 412 shown in FIG. 4. The mobile device may prompt the user to select a floor plan identifier and enter it in text box 514. The mobile device may select a floor plan identifier automatically. For example, "Downlight 1" may be selected. The floor plan identifier may be presented to the user automatically by the mobile device. The user may press the confirmation button 512 to confirm the correct entry of the floor plan identifier. The mobile device may automatically confirm the correct selection of the floor plan identifier. The mobile device may prompt a user to confirm the correct selection by pressing confirmation button 512. Other floor plan data may be presented to, or entered by, the user. The mobile device may associate the received unique identifier and the selected floor plan identifier (e.g., at 210 of the method 200 of FIG. 2). The association between the unique identifier and the floor plan identifier may be stored on the mobile device and/or on an external device (e.g., a server, a system controller, etc.).

When the mobile device is an autonomous mobile device (e.g., such as the autonomous mobile devices 126, 128), the autonomous mobile device may be configured to process the images automatically without transmitting the images to another device. For example, the autonomous mobile device may be configured to record and store an image (e.g., the image 308 as shown in FIG. 3) and process the image to detect the lighting fixture 304. The autonomous mobile device may be configured to process the image to identify the unique identifier 414 signaled by the lighting load of the lighting fixture 304. In addition, the autonomous mobile device may automatically determine a floor plan identifier for the lighting fixture 304 and associate the unique identifier of the lighting fixture 304 with the determined floor plan identifier. The images shown in FIGS. 3-5 may represent images recorded, but not displayed, by the autonomous mobile device.

Figure 6A:
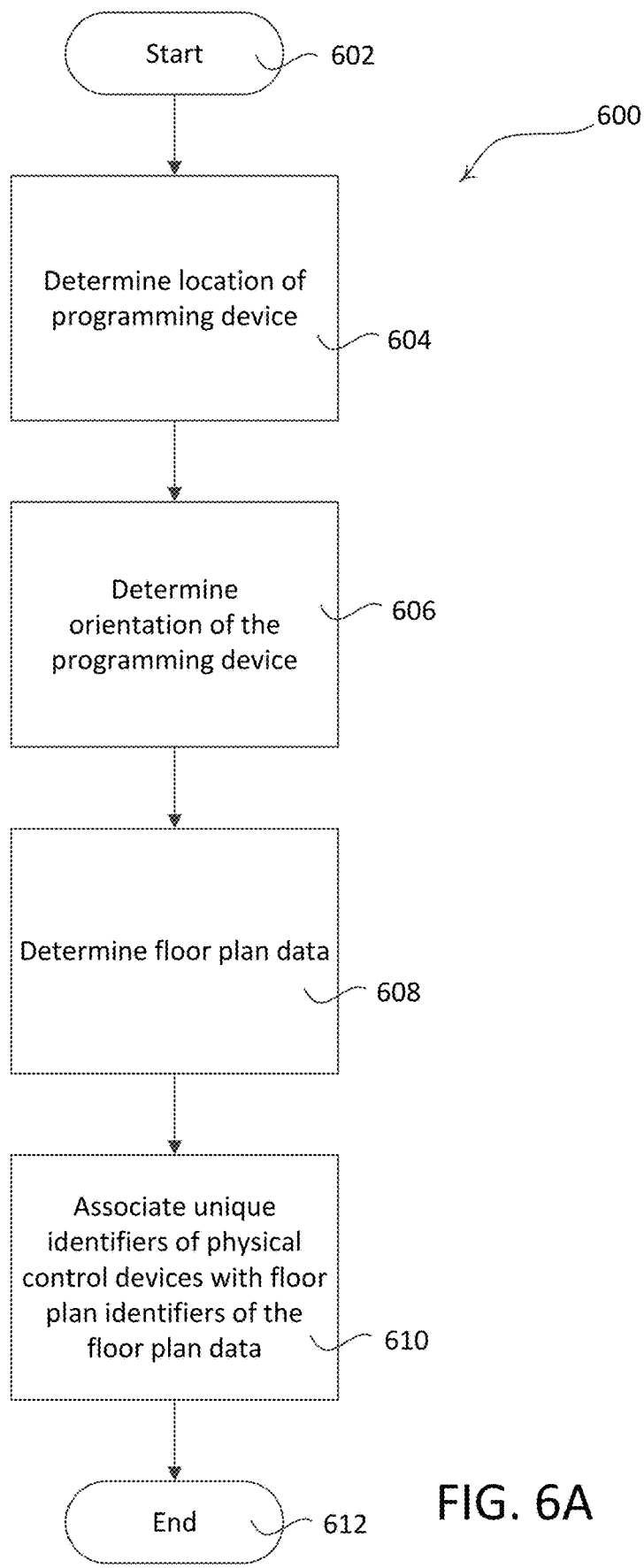
FIG. 6A is a flow diagram depicting an example method for identifying one or more lighting fixtures and associating the lighting fixtures with load control devices using floor plan data.

FIG. 6A is a flow diagram depicting an example method 600 for identifying one or more lighting fixtures (e.g., lighting control devices control respective lighting loads of the lighting fixtures) and associating a unique identifier with a floor plan identifier of each of the lighting fixtures. The method 600 may start at 602. The method 600 may be performed on a programming device, such as a mobile device (e.g., the mobile device 124 and/or the autonomous mobile devices 126, 128), or distributed across multiple programming devices, such as a mobile device, a system controller, or another device. At 604, a location of the mobile device may be determined. For example, the location may be a room in a building such as an office, a conference room, a hallway, or any other space or area within a building. A position of the mobile device within the location may be determined. The location of the mobile device may be determined by user input (e.g., the user may select the correct location from a list of predefined locations). The location may be determined automatically, for example, using a location tracking technique and/or floor plan data. The location of the autonomous mobile device may be determined by a real-time locating system (RTLS) (e.g., triangulation, trilateration, NFC, indoor geolocation, etc.). The location may be confirmed by the user.

Figure 9:
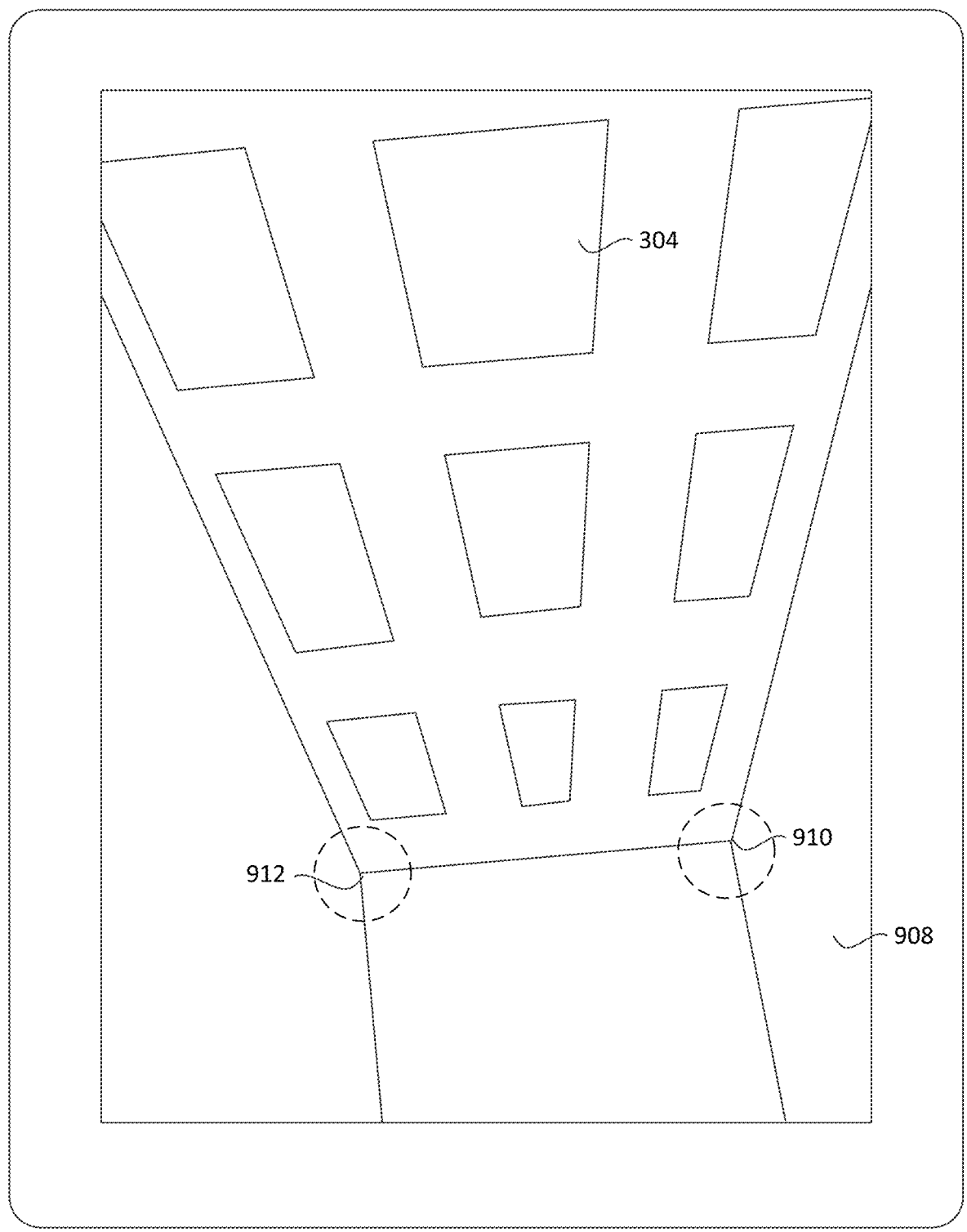
FIG. 9 depicts an example user interface for using two or more objects within a given location to determine the orientation of a mobile device within the given location.

At 606, an orientation of the mobile device (e.g., relative to other objects within the location) may be determined. The orientation may be determined by using real-time orientation sensors (e.g., a sensor such as an accelerometer, gyroscope, and/or any other sensor for detecting orientation on a mobile device). The orientation may be determined by user input. For example, the user may select the orientation. The mobile device may prompt the user to make selections on a display of the mobile device that indicate the orientation of the mobile device. For example, the mobile device may prompt the user to indicate the location of two or more known objects within the location. The known objects may be, for example, corners of the room, windows, lighting fixtures, or other objects in the location. The mobile device may determine its orientation based on the relative location of the known objects. For example, as shown in FIG. 9, the user may indicate two corners of a room in which the mobile device is located, and the mobile device may determine its orientation based on the relative location of the two corners of the room. The mobile device may use a combination of techniques (e.g., real-time orientation sensors and user input) to determine its orientation.

Referring again to FIG. 6A, at 608, the mobile device may determine floor plan data for the location. The mobile device may access a database containing the floor plan data. The mobile device may overlay floor plan data onto an image 308 of the location. The mobile device may use a map of the location (e.g., that the mobile device has created) to aid in determining the floor plan data. The floor plan data may correlate the physical lighting fixtures at the location with corresponding floor plan identifiers. For example, each of the one or more lighting fixtures 304 may have a corresponding floor plan identifier in the floor plan data. The floor plan data may include one or more icons representing the physical location of the lighting fixtures, representations of connections to other devices (e.g., other lighting fixtures, switches, sensors, or other devices), group identifiers indicating groups of lighting control devices that may be controlled together, and/or a combination thereof. The floor plan data may include a floor plan identifier. The floor plan data may include programming and/or control information for controlling the lighting control devices at identified locations in the floor plan. The programming and/or control information may be uploaded to a system controller for controlling the lighting fixtures.

At 610, the mobile device may receive one or more unique identifiers from the one or more lighting fixtures 304. For example, the mobile device may receive a separate unique identifier from each lighting fixture 304 within the location. A unique identifier may be generated by a lighting control device activating a lighting load of a corresponding lighting fixture 304. The mobile device may associate the received unique identifiers with the corresponding floor plan identifiers. The association may be stored in a memory of the mobile device. The association may be transmitted by the mobile device to an external device having a memory (e.g., a server, a system controller, or another external device) and stored on the external device. The association may be transmitted to the lighting control device and stored on a memory of the lighting control device. The method 600 may end at 612 and the associations may be used to configure and/or control the lighting loads in the lighting control system. For example, the user may select a lighting fixture on an image of the mobile device (e.g., or another device) that is identified by the floor plan identifier and may communicate configuration information and/or control instructions to the lighting control device of the lighting fixture using the unique identifier associated therewith. The communication may be performed directly, or via another device, such as a system controller.

The example method 600 may be performed with the user in a different location (e.g., a remote location) than the mobile device. For example, the user may communicate with an autonomous mobile device using a remote computing device. The remote computing device may be connected to the autonomous mobile device via a network. For example, the remote computing device may be connected to the autonomous mobile device via a wireless communication signal (e.g., WI-FI®, BLUETOOTH®, near field communication (NFC), ZIGBEE®, THREAD, and/or CLEAR CONNECT™). The autonomous mobile device may send images from an internal camera to the remote computing device, and the user may interact with the remote computing device to provide commands to the autonomous mobile device. The autonomous mobile device may receive one or more inputs from the user via the remote computing device and may perform commissioning based on the inputs.

The example method 600 may be performed autonomously by an autonomous mobile device (e.g., without input from a user). At 604, a location of the autonomous mobile device may be determined. For example, the location may be a room in a building such as an office, a conference room, a hallway, or any other space or area within a building. A position of the mobile device within the location may be determined. For example, the location may be a room in a building, and the position may be a point within the room. The location of the autonomous mobile device may be determined automatically. For example, the location and/or the position of the autonomous mobile device may be determined by a real-time locating system (RTLS) (e.g., triangulation, trilateration, NFC, indoor geolocation, etc.). Examples of real-time location systems are described in greater detail in commonly-assigned U.S. Patent Application Publication No. 2017/0038787, published Feb. 9, 2017, entitled LOAD CONTROL SYSTEM RESPONSIVE TO THE LOCATION OF AN OCCUPANT AND/OR MOBILE DEVICE, the entire disclosure of which is hereby incorporated by reference.

At 606, an orientation of the autonomous mobile device may be determined. The orientation may be determined automatically. For example, the autonomous mobile device may use data from the real-time orientation sensors and/or an internal camera to determine the orientation. The autonomous mobile device may create a map of the location based on the position of one or more objects in the location relative to a predetermined point. The orientation may be determined by automatically detecting the relative location of two or more known objects within the location. The known objects may be, for example, corners of the room, windows, lighting fixtures, or other objects in the location. For example, as shown in FIG. 9, the autonomous mobile device may determine its orientation by automatically detecting two corners of a room in which the autonomous mobile device is located.

Referring again to FIG. 6A, at 608, the autonomous mobile device may determine floor plan data for the location. The floor plan data may be stored on a memory of the autonomous mobile device and/or may be stored elsewhere and accessed by the autonomous mobile device. The floor plan data may associate a lighting fixture in a given location with a corresponding floor plan identifier for the lighting fixture. For example, the floor plan data may have a floor plan identifier for each lighting fixture in the location. The floor plan identifier may be an alphanumeric string. The autonomous mobile device may access the floor plan data and may correlate the lighting fixture from which the unique identifier was received with the corresponding floor plan identifier. For example, the autonomous mobile device may use information regarding its location, position (e.g., within the location), and/or orientation to determine which floor plan identifier corresponds to the lighting fixture. The floor plan data may identify the location of the known objects. The autonomous mobile device may determine its location relative to the known objects to determine which floor plan identifier corresponds to the lighting fixture.

At 610, the autonomous mobile device may receive one or more unique identifiers from the one or more lighting fixtures as described herein. The autonomous mobile device may automatically associate a received unique identifier with the floor plan identifier for the lighting fixture from which the unique identifier was received. The method 600 may end at 612 and the associations may be used to configure and/or control the lighting loads in the lighting control system. For example, a system controller (e.g., or other device) may send a command to the lighting control device of the lighting fixture using the unique identifier associated therewith. The command may communicate configuration information and/or control instructions for the lighting control device. For example, the command may instruct the lighting control device to increase or decrease an intensity of the lighting fixture, turn the lighting fixture on or off, and/or the like. The command may be sent by the system controller automatically (e.g., without input from the user). The command may be sent based on, for example, a time of day, an ambient light level of the location, a detection of motion in the location, and/or the like.

Figure 6B:
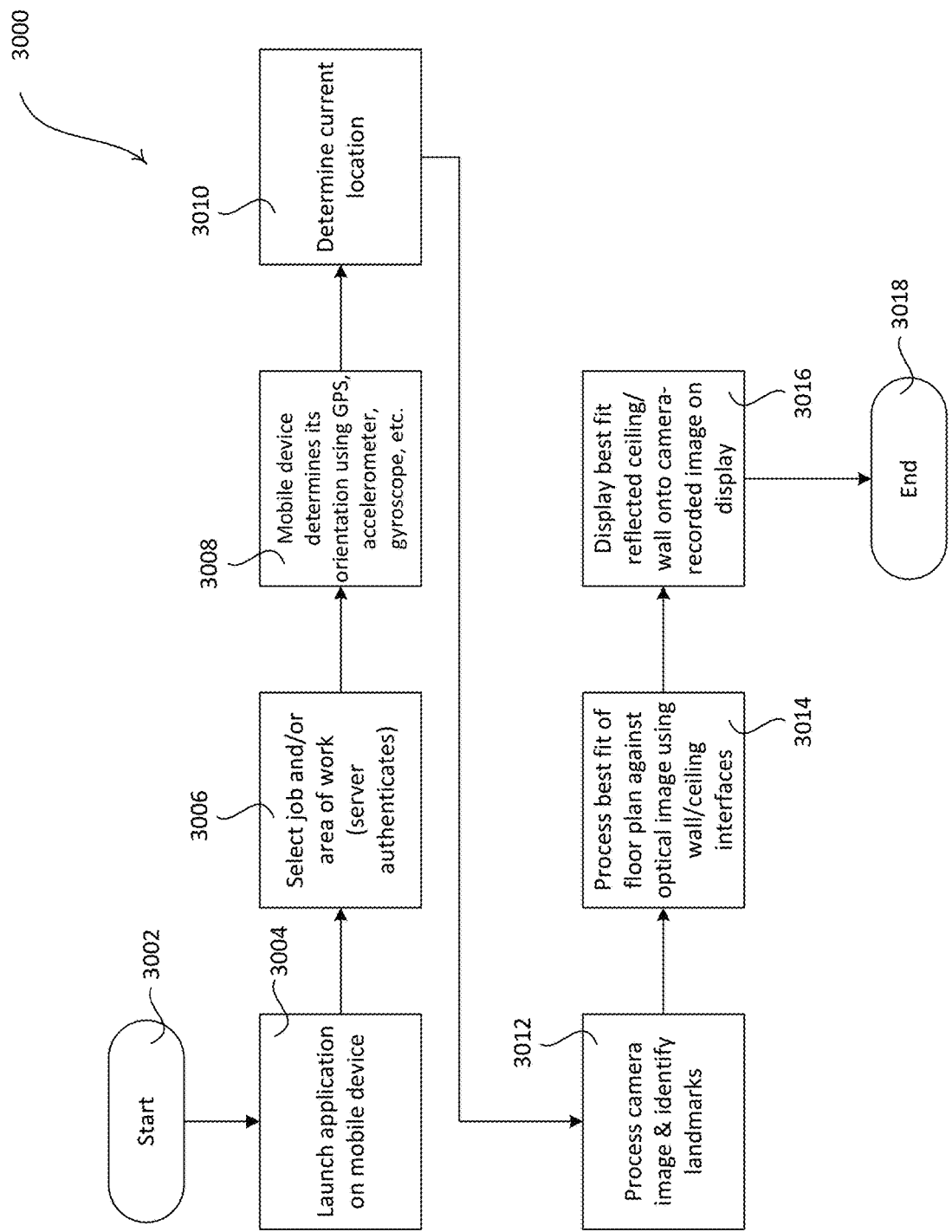
FIG. 6B is a flow diagram depicting an example method for identifying a location and/or orientation of a mobile device.

FIG. 6B is a flow diagram depicting an example method 3000 for identifying a location and/or orientation of a mobile device (e.g., the mobile device 124 and/or the autonomous mobile devices 126, 128). The method 3000 may be performed on a programming device, such as the mobile device, or distributed across multiple programming devices, such as the mobile device, a system controller, control devices, and/or other devices. The method 3000 may be performed with user input or without user input (e.g., autonomously). The method 3000 may start at 3002. At 3004, an application may be launched on the mobile device. The application may be, for example, an application for use in installing, commissioning, and/or controlling one or more control devices (e.g., lighting fixtures, lighting control devices, and/or other types of control devices). At 3006, a job and/or area of work may be selected. The selected job and/or area of work may be authenticated by a server. At 3008, the mobile device (e.g., the application) may determine its orientation. The orientation may be determined automatically (e.g., using a real-time orientation sensors). For example, the mobile device may use an accelerometer, an altimeter, a gyroscope, and/or any other sensor for detecting orientation on a mobile device to determine its orientation. The accelerometer and/or gyroscope may indicate, for example, that the mobile device is facing in an upwards direction. The orientation may be determined based on two or more defined portions of a room captured in an image by the mobile device.

At 3010, the mobile device may determine its current location. The mobile device may determine its location based on user input. For example, a user of the mobile device may select the current location on a floor plan displayed on a display of the mobile device. The mobile device may determine its location without user input (e.g., automatically). For example, the mobile device may determine its location using a real-time locating system executed on the mobile device (e.g., GPS, triangulation, NFC, geolocation, etc.). At 3012, the mobile device may process an image taken by an internal camera of the mobile device of the room in which the mobile device is located. In processing the image, the mobile device may identify one or more landmarks in the image. For example, the landmarks may be corners, walls, a ceiling, a floor, windows, etc. The mobile device may identify the landmarks using one or more image analysis techniques. The mobile device may process a best fit of the floor plan against the image using one or more of the identified landmarks (e.g., wall and/or ceiling interfaces) at 3014. At 3016, the mobile device may display a best fit reflected ceiling and/or wall onto an image taken by the camera and shown on a display of the mobile device. The method 3000 may end at 3018.

Figure 6C:
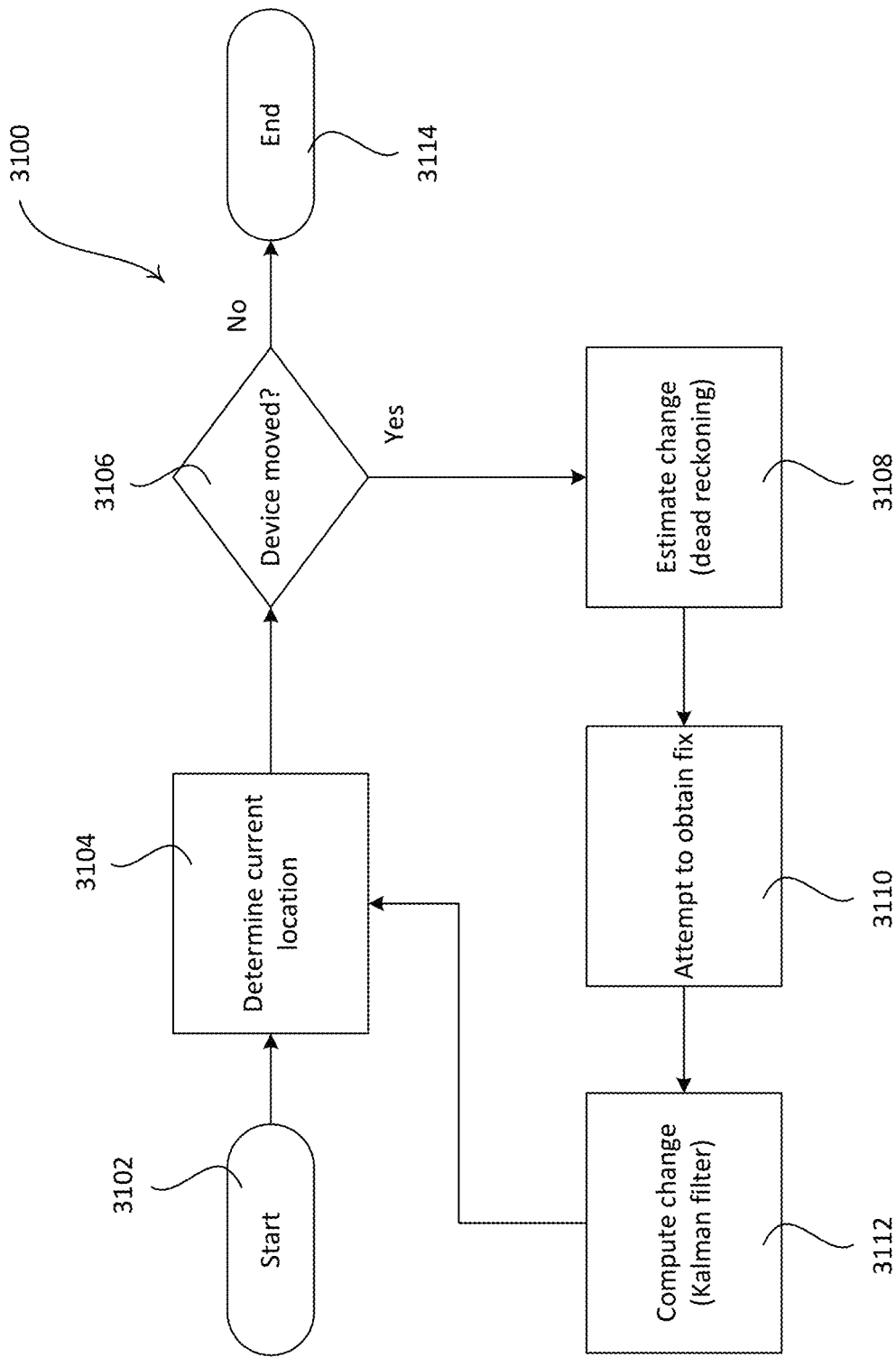
FIG. 6C is a flow diagram depicting an example method for identifying a location of a mobile device.

FIG. 6C is a flow diagram depicting an example method 3100 for identifying a location of a mobile device (e.g., the mobile device 124 and/or the autonomous mobile devices 126, 128) which may be executed by a mobile application on the mobile device. The method 3100 may be performed on a programming device, such as the mobile device, or distributed across multiple programming devices, such as the mobile device, a system controller, control devices, and/or other devices. The method 3100 may be performed with user input or without user input (e.g., autonomously). The method 3100 may start at 3102. At 3104, the mobile device may determine its current location. The mobile device may determine its location based on user input. For example, a user of the mobile device may select the current location on a floor plan displayed on a display of the mobile device. The mobile device may determine its location without user input (e.g., automatically). For example, the mobile device may determine its location using a real-time locating system executed on the mobile device (e.g., GPS, triangulation, NFC, geolocation, etc.). At 3106, the mobile application may determine whether the mobile device has been moved since it determined its current location at 3104. If the mobile device has not been moved, the method 3100 may end at 3114. The method 3100 may be executed periodically (e.g., beginning at 3102), for example, while the method 3000 shown in FIG. 6B is being executed. If the device has been moved, the method 3100 may continue to 3108. At 3108, the mobile device may estimate the change in the mobile device's location. The mobile device may estimate the change based on, for example, dead reckoning. For example, the mobile device may use one or more of its internal GPS, accelerometer, gyroscope, altimeter, and/or compass to estimate the change in location via dead reckoning. At 3110, the mobile device may attempt to obtain a fix to reconcile the location with the estimate by using input from the camera of the mobile device. At 3112, the mobile device may compute the change in the mobile device's location based on the highest probability. The mobile device may compute the change based on, for example, a Kalman filter. The method 3100 may return to 3104 and the device may determine its current location based on its previous location and the computed change.

Figure 6D:
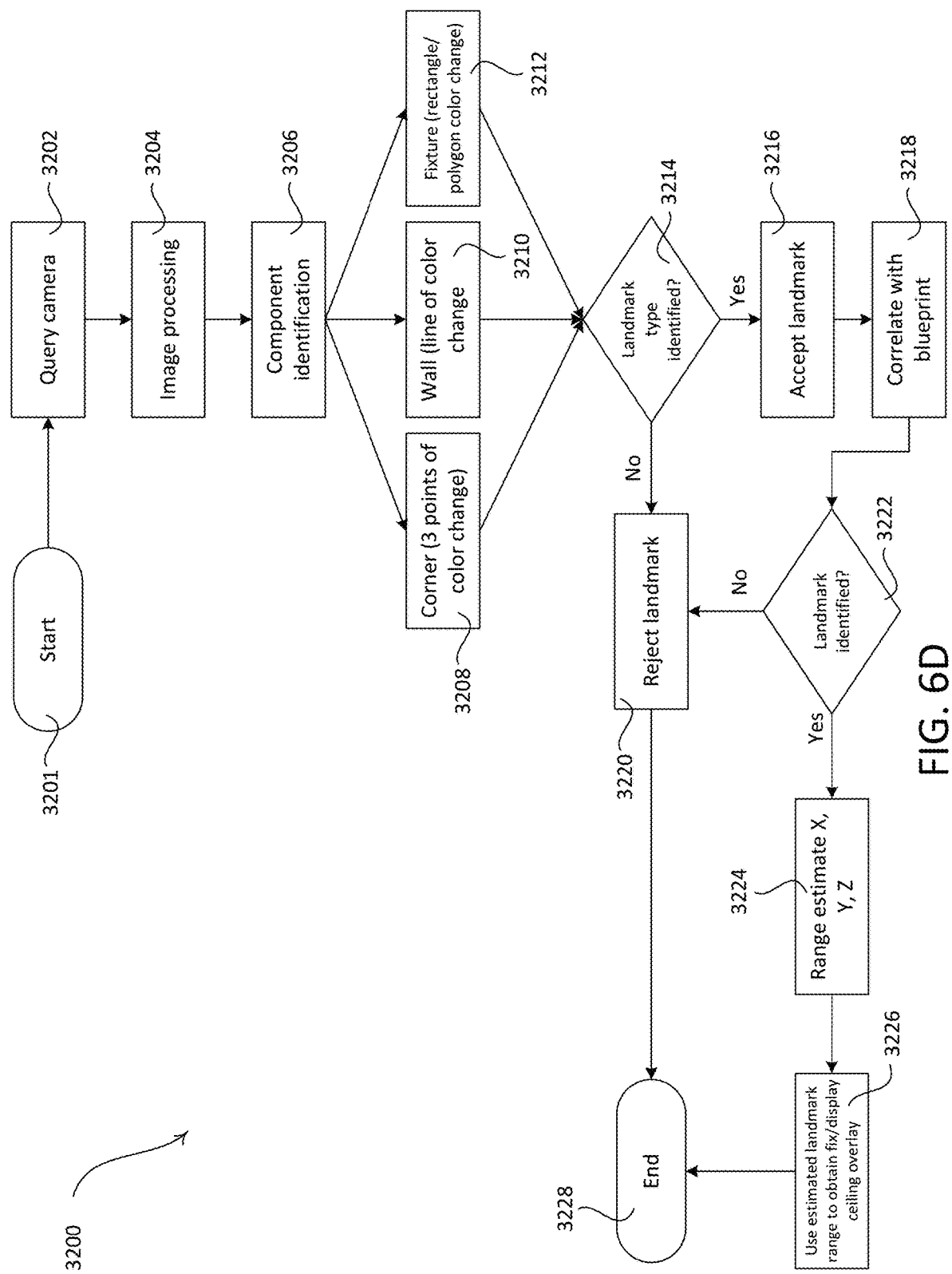
FIG. 6D is a flow diagram depicting an example method for identifying one or more landmarks.

FIG. 6D is a flow diagram depicting an example method 3200 for identifying one or more landmarks within an image taken by an internal camera of a mobile device (e.g., the mobile device 124 and/or the autonomous mobile devices 126, 128). The method 3200 may be performed on a programming device, such as the mobile device, or distributed across multiple programming devices, such as the mobile device, a system controller, control devices, and/or other devices. The method 3200 may be performed with user input or without user input (e.g., autonomously). The method 3200 may be used to obtain a fix of a mobile device (e.g., at 3110 of method 3100 of FIG. 6C). The method 3200 may start at 3201. At 3202, the mobile device may query the internal camera and may receive an image from the internal camera. At 3204, the mobile device may process the image received from the internal camera, for example using an image processing and/or image analysis technique. At 3206, the mobile device may identify one or more components in the image. For example, the mobile device may identify a corner (e.g., at 3208) based on 3 points of color change in the image, a wall (e.g., at 3210) based on a line of color change in the image, and/or a fixture (e.g., at 3212) based on a rectangle and/or polygon color change. At 3214, the mobile device may determine whether a landmark type has been identified in the image. If no landmark type is identified, the mobile device may reject the landmark at 3220 and the method 3200 may end at 3228. The method 3200 may be executed periodically (e.g., beginning at 3201), for example, while the method 3000 shown in FIG. 6B is being executed. If at least one landmark type is identified, the mobile device may accept the landmark at 3216. The mobile device may correlate the identified landmark type with a blueprint (e.g., a floor plan) of the area in which the mobile device is located at 3218. At 3222, the mobile device may determine whether a landmark (e.g., a specific landmark) has been identified. If no landmark is identified, the mobile device may reject the landmark at 3220 and the method 3200 may end at 3228. If at least one landmark is identified in the image, the mobile device may estimate a range (e.g., in three-dimensional space as defined by X, Y, and Z axes) at 3224. At 3226, the mobile device may use the estimated landmark range to obtain a fix (e.g., at 3110 of method 3100 of FIG. 6C) and/or to display a ceiling overlay on a display of the mobile device (e.g., at 3016 of the method 3000 of FIG. 6B and/or at 2910 of the method 2900 of FIG. 11B). The method 3200 may end at 3228.

Figure 7:
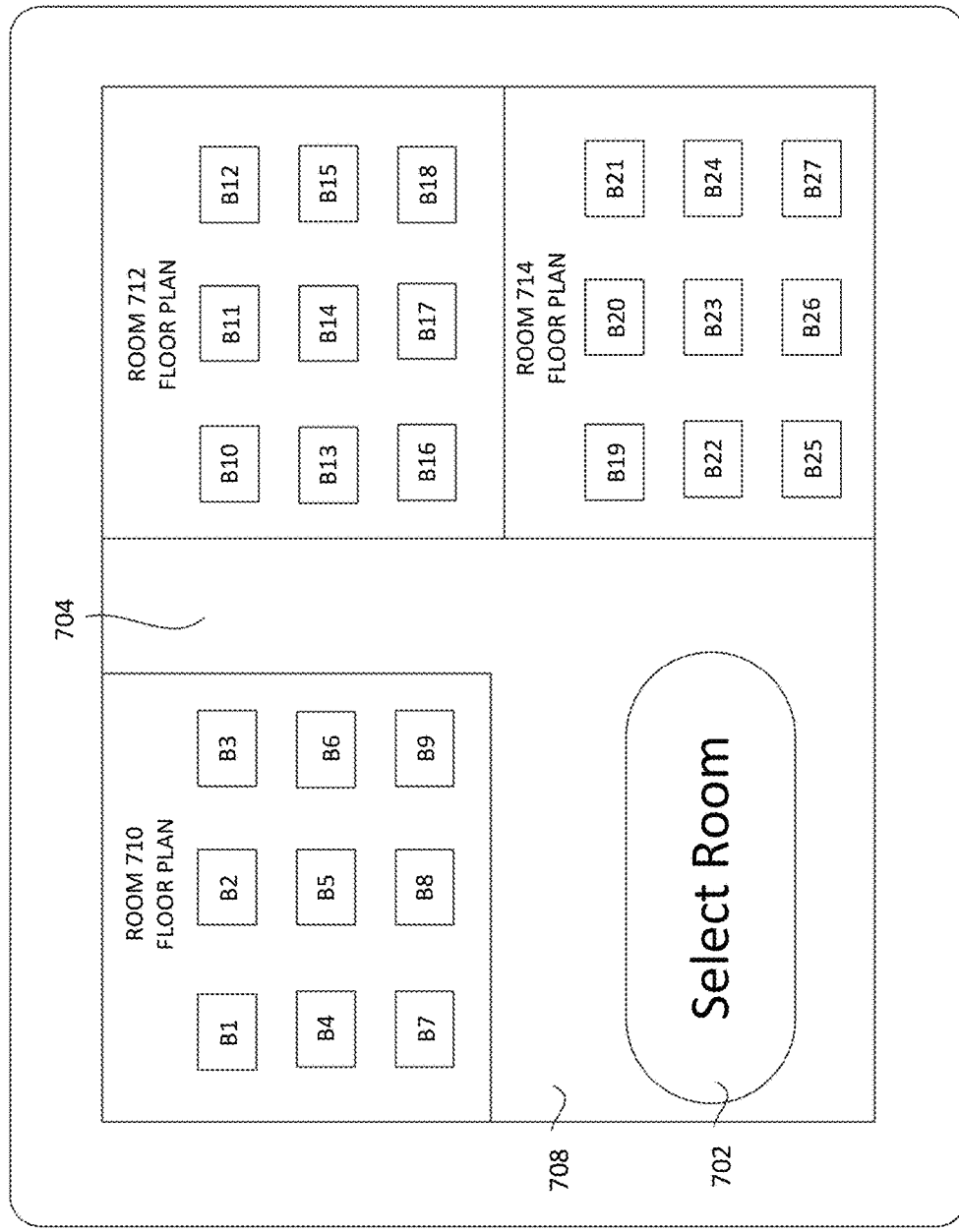
FIG. 7 depicts floor plans for identifying the physical location of a mobile device.

FIG. 7 depicts an example floor plan 704 for identifying the physical location of a mobile device (e.g., at 604 of the method 600 of FIG. 6A). An image 708 may be displayed on a mobile device and/or stored internally thereon. The image 708 may depict one or more floor plans for a given location. The image 708 may display the floor plan 704 of a building. The floor plan 704 in the image 708 may include depictions of one or more rooms 710, 712, and 714. Each room 710, 712, and 714 may reflect a location in which one or more lighting fixtures are installed, or are to be installed. For example, the location of one or more lighting fixtures B1-B27 within the rooms 710, 712, 714 may be depicted. The lighting fixtures B1-B27 may be installed a particular distance from other objects (e.g., walls, other lighting fixtures, etc.) in the room. Each of the lighting fixtures B1-B27 may be assigned a unique identifier (e.g., serial number, address, etc.) after installation for communicating with the lighting fixture.

The rooms 710, 712, and 714 may be on the same floor of a building or on different floors. A user of the mobile device may select the room in which the mobile device is located. For example, the user may select the room 710 as being the room in which the mobile device is located. The user may select the room 710 by pressing a select room button 702 and then selecting, for example, room 710. Alternatively, the user may select the room 710 and confirm their choice by pressing the select room button 702. The user may select the room 710 by choosing it from a list of rooms.

The mobile device may determine its location within the floor plan 704 automatically (e.g., without input from the user). For example, the mobile device may determine its relative location within the floor plan 704 automatically using a real-time locating system. The mobile device may use the real-time locating system to determine in which of the rooms 710, 712, and 714 it is located. The mobile device may use the real-time locating system to determine its position within the location.

The mobile device may use image data from a camera of the mobile device to determine its location and/or its position within the location. For example, the mobile device may compare images captured by the camera to one or more stored images accessible to the mobile device. The stored images may indicate the rooms in which the stored images were taken. For example, the mobile device may capture an image, compare the image to a stored image, determine that the image most closely matches a stored image of room 710, and determine that the mobile device is located in room 710. The mobile device may traverse rooms 710, 712, and 714 in a pre-determined order, and may use information regarding the distance that the mobile device has traveled to determine its location. The mobile device may use a combination of location detecting methods to determine its location.

The mobile device may (e.g., autonomously) create a map of the location. The map may be used to determine the presence and/or position of one or more objects within the location. For example, the objects may be chairs, tables, walls, desks, and/or the like. The mobile device may compare the positions with the floor plan data to determine its location, position (e.g., within the location), and/or orientation. The mobile device may determine the position of one or more light fixtures within the location relative to the objects. For example, the mobile device may be an autonomous mobile device and may move around the floor of the location. The map may be stored for future use (e.g., by the mobile device or another mobile device). The map may be compared to the floor plan 704 to identify objects in the floor plan 704 and/or update the floor plan 704.

Figure 8:
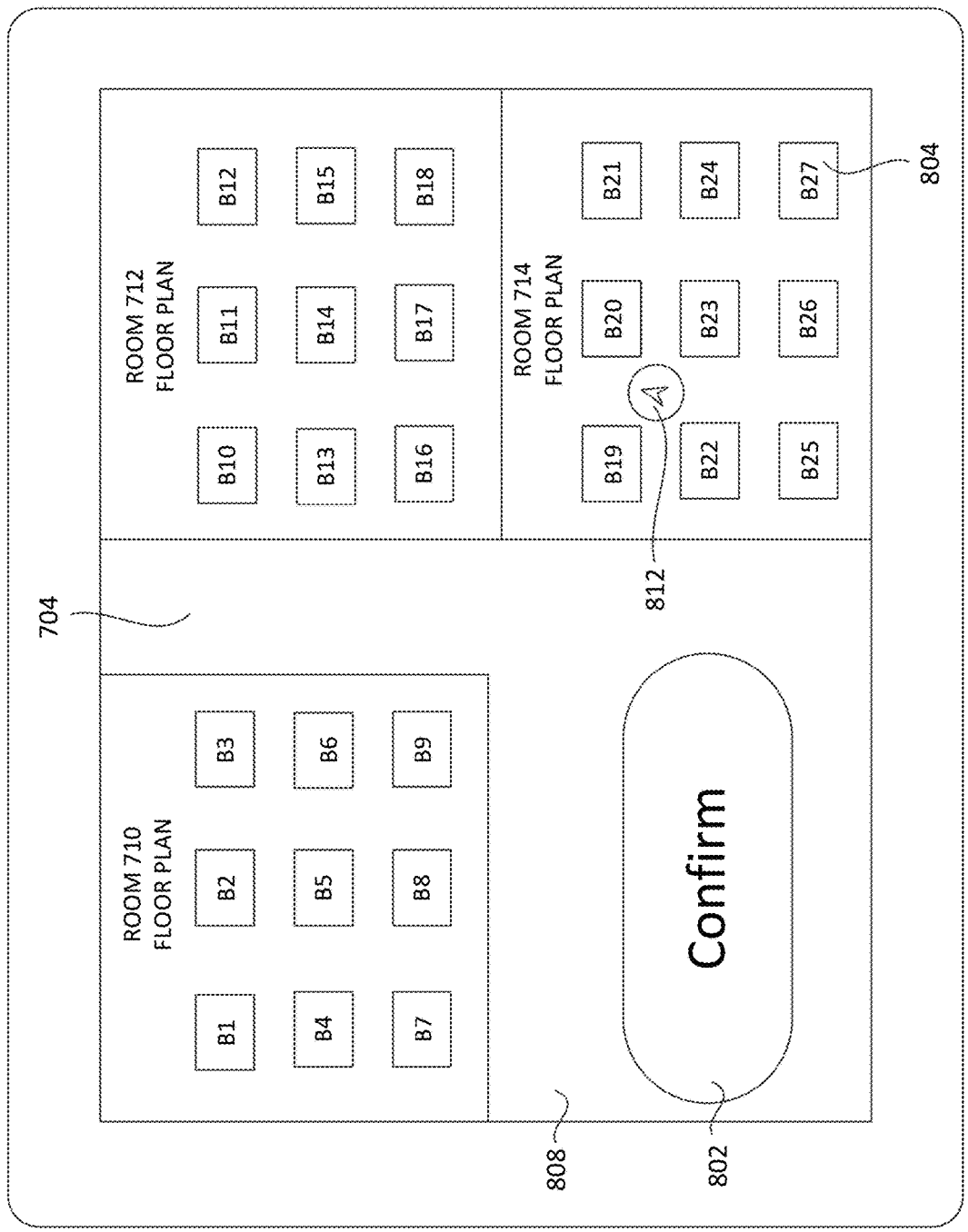
FIG. 8 depicts floor plans for identifying the orientation of a mobile device within a given location.

The location, position (e.g., within the location), and/or orientation of the mobile device may be determined and may be confirmed by the user. FIG. 8 depicts an example image 808 stored on the mobile device including the floor plan 704 for determining the location, position (e.g., within the location), and/or orientation of the mobile device within a given location (e.g., at 606 of the method 600 of FIG. 6A). The floor plan 704 may include rooms of a building, such as the room 714, for example. The floor plan 704 may include one or more icons, such as icons 804, which may represent the physical locations of lighting fixtures (e.g., lighting fixture B27 in FIG. 8). The floor plan 704 may show the locations of the lighting fixtures as they relate to one another and/or other objects in the space (e.g., the relative positions of the lighting fixtures). The mobile device and/or the system controller may have stored thereon a floor plan identifier that indicates the location of one or more of the lighting fixtures in the floor plan 704.

The location, position (e.g., within the location), and/or orientation of the mobile device relative to the objects in the floor plan 704 may be determined based on input from the user and/or automatically. The floor plan 704 may include a mobile device icon, such as an icon 812, which may indicate the location, position (e.g., within the location), and/or orientation of the mobile device. For example, the user may select a direction the mobile device is facing on the floor plan 704. The orientation may be determined automatically (e.g., using a real-time orientation sensors). For example, the mobile device may use an accelerometer, a gyroscope, and/or any other sensor for detecting orientation on a mobile device to determine its orientation. The accelerometer and/or gyroscope may indicate, for example, that the mobile device is facing in an upwards direction. The orientation may be determined based on two or more defined portions of the room 714 captured in an image by the mobile device.

The mobile device may use a weighted calculation to determine its orientation. For example, the mobile device may use data from an accelerometer, a gyroscope, an altimeter, a compass, any other sensor for detecting orientation on a mobile device, or any combination thereof to determine its orientation. The mobile device may use information from an internal camera to verify its orientation. The mobile device may automatically determine the location, position (e.g., within the location), and/or orientation without notifying the user.

The determined location, position (e.g., within the location), and/or orientation of the mobile device may be assisted by the user. For example, a user may indicate two or more defined portions of the room 714 from which the location, position (e.g., within the location), and/or orientation may be determined. The determined location, position (e.g., within the location), and/or orientation may be confirmed by a user pressing the confirm button 802.

FIG. 9 depicts an example image 908 of using two or more objects within a given location (e.g., a room of a building) to determine the orientation of a mobile device within the given location (e.g., at 606 of the method 600 of FIG. 6A). The image 908 may represent a frame of a video generated by the mobile device, for example. The image 908 may include the lighting fixtures within a location, or a subset thereof.

The mobile device may determine its orientation automatically based on two or more predetermined objects within the location. The predetermined objects may have a fixed position within the location. The mobile device may determine its orientation using, for example, the position of the predetermined objects in relation to each other. The predetermined objects may be, for example, corners of a room, windows, lighting fixtures, or a combination thereof.

The user may be prompted to select certain predetermined objects to orient the mobile device within the location on the floor plan. For example, the mobile device may select the two corners 910, 912 on the north wall of the identified room that meet the ceiling. The user may select the corners 910, 912 of the room to determine its orientation within the floor plan.

The mobile device may measure the distance between the selected objects of orientation (e.g., corners 910, 912) and set the distance in the image 908 equal to the distance indicated between the objects in the floor plan data. The distance may also be manually entered into the mobile device by the user. This distance may be used to calculate the relative size of objects, and distance between objects, in the room of the image 908. The mobile device may also, or alternatively, prompt the user to select two points of a predefined object within the room for which the distance is predetermined. For example, the mobile device may prompt the user to select top and bottom corners of a door, a wall, or a ceiling tile having a standard size.

The mobile device may use information of its orientation to determine its position within the floor plan relative to the predetermined objects in the image 908. The floor plan data may include distances between objects (e.g., walls, lighting fixtures, etc.) within the room. The mobile device may track the size of objects and the distance between objects (e.g., corners, lighting fixtures, etc.) in the image 908 to identify one or more lighting fixtures. The mobile device may identify lighting fixtures within an image based on the location/orientation of the mobile device relative to objects indicated in the floor plan data. For example, the mobile device may identify lighting fixtures within an image based on the location/orientation of the mobile device, the size of the lighting fixtures, and/or the distance of the lighting fixtures from the selected objects of orientation (e.g., corners 910, 912).

Figure 10:
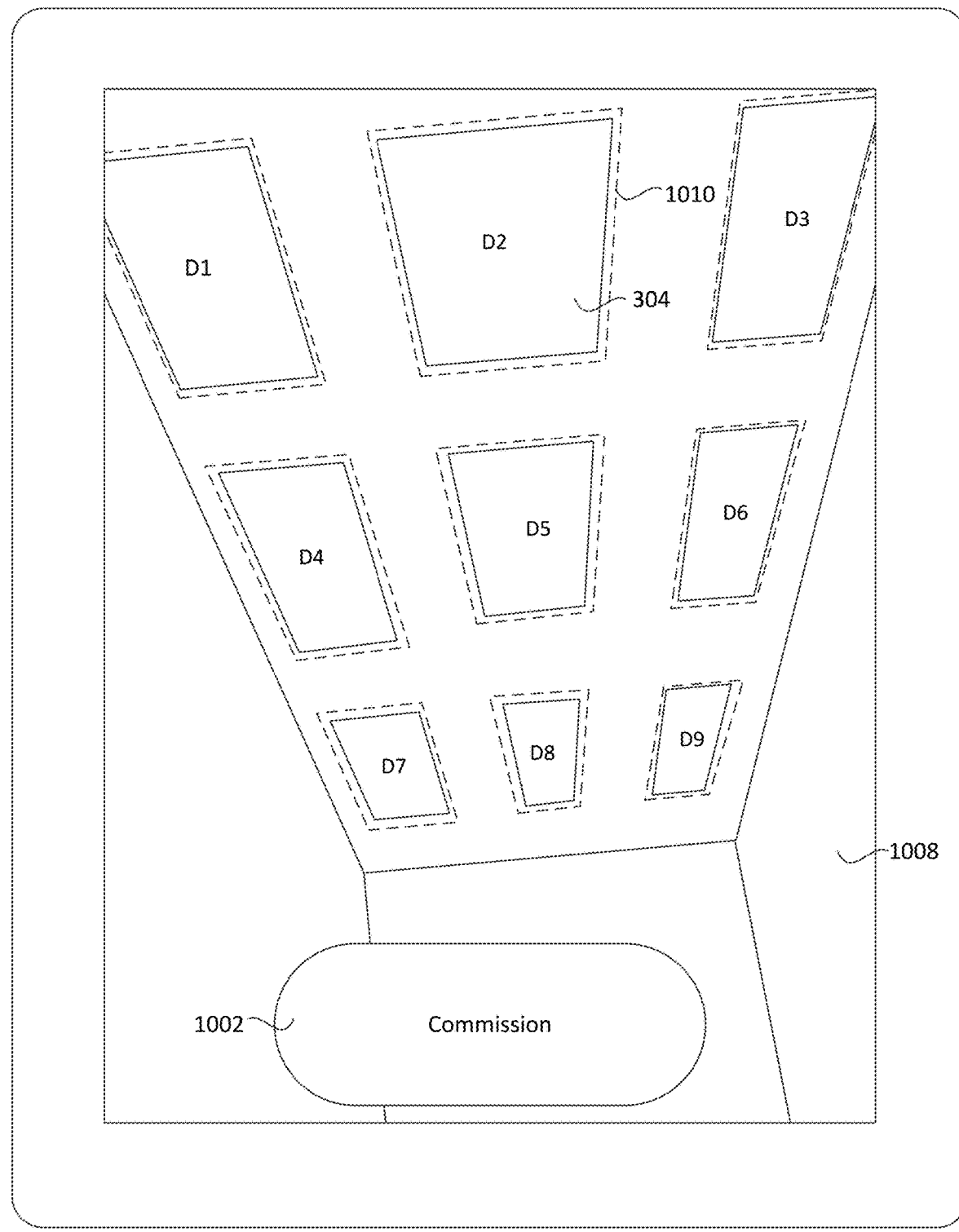
FIG. 10 depicts an example user interface for identifying one or more lighting fixtures in a given location using overlaid floor plan data.

FIG. 10 depicts an example image 1008 identifying one or more lighting fixtures in a given location using floor plan data (e.g., at 608 of the method 600 of FIG. 6A). The image 1008 may represent a frame of a video generated by the mobile device, for example. The image 1008 may include the lighting fixtures within a location, or a subset thereof. The mobile device may identify the lighting fixtures within the location based on the size and/or location of the lighting fixtures from the points of reference. The mobile device may determine which of the lighting fixtures indicated in the floor plan data are within the image 1008 based on the location of the mobile device, the orientation of the mobile device, and the floor plan data indicating the location of the lighting fixtures in the image. The mobile device may identify one or more fixtures in the image as being fixtures in the floor plan data.

The mobile device may correlate floor plan data with the lighting fixtures in the image 1008. The floor plan data may be stored on a memory of the mobile device and/or received from an external device, such as the system controller, for example. The floor plan data may identify floor plan identifiers that correspond with the physical location of the lighting fixtures. The floor plan data may include one or more floor plan identifiers (e.g., one floor plan identifier for each lighting fixture in the image 1008). The floor plan data may include one or more icons representing the physical location of the lighting fixtures, representations of connections to other devices (e.g., other lighting fixtures, switches, sensors, or other devices), group identifiers indicating groups of lighting control devices that may be controlled together, and/or a combination thereof. The floor plan data may include programming and/or control information for controlling the lighting control devices at identified locations in the floor plan. The programming and/or control information may be uploaded to a system controller for controlling the lighting fixtures.

When the mobile device is used to display information to a user, the mobile device may overlay the floor plan data onto the lighting fixtures displayed on the image 1008. The mobile device may overlay an outline 1010 identifying the lighting fixture in the corresponding location in the floor plan data. The mobile device may overlay floor plan identifier D2 onto lighting fixture 304. The mobile device may prompt the user to confirm that the overlaid floor plan data is correct. The mobile device may determine that lighting fixture 304 corresponds with floor plan identifier D2 automatically.

The mobile device may receive one or more unique identifiers from the one or more lighting fixtures. A unique identifier may identify a lighting control device (not shown) associated with a lighting fixture. For example, the mobile device may receive a separate unique identifier from each lighting fixture within the location. A unique identifier may be used to communicate with a lighting control device activating a lighting load of a corresponding lighting fixture 304.

The mobile device may prompt the user to commission the lighting control devices in the fixtures by pressing a commission button 1002. The mobile device may automatically commission the lighting fixtures upon receiving the unique identifiers. The lighting control devices may be commissioned by associating the floor plan identifiers of the lighting fixtures with the unique identifiers assigned to the lighting control devices for performing load control and other communication with the lighting control devices. After selection of the commission button 1002, the mobile device may automatically detect the unique identifiers that correspond to the lighting control devices of the lighting fixtures in the image (e.g., via VLC or RF signals), as described herein.

The unique identifiers may be communicated via VLC signals. The mobile device may analyze incoming video or frames of the video to detect unique identifiers indicated by the lighting loads of the lighting fixtures. For example, the mobile device may receive the signal from the lighting load of the lighting fixture 304 and may identify the unique identifier being signaled. The unique identifier of the lighting control device may be signaled by blinking the lighting load of the lighting fixture 304 in a pattern, sequence, rate, or the like that corresponds to the unique identifier. The unique identifiers may be sent by the lighting loads of the lighting fixtures and detected by a camera of the mobile device at a frequency that is imperceivable to the human eye.

The unique identifiers may be communicated via RF signals. The mobile device may receive the RF signals from the lighting control devices and determine the unique identifiers based on the received signals. The RF signals may be, for example, a WI-FI® signal, a BLUETOOTH® signal, a near field communication (NFC) signal, a ZIGBEE® signal, a CLEAR CONNECT™ signal, or another RF signal. The mobile device may receive unique identifiers from more than one lighting control device at the same time. The mobile device may use, for example, received signal strength to determine which unique identifier was sent by which lighting control device. For example, the mobile device may determine that the unique identifier associated with the strongest RF signal was received from the lighting control device that is physically closest to the mobile device in the image (e.g., the lighting control device in the largest lighting fixture). The mobile device may use input from the user to determine which lighting control device is closest to the mobile device. For example, the mobile device may prompt the user to select the lighting control device that is closest to the mobile device. The mobile device may use information related to its location, position (e.g., within the location), and/or orientation to determine which lighting control device is closest to the mobile device.

Once the mobile device has received the unique identifiers, the mobile device may associate the unique identifiers of the lighting control devices in the image with the lighting control devices indicated in the corresponding floor plan data (e.g., at 610 of the method 600 of FIG. 6A). For example, the mobile device may make associations between the unique identifiers and the floor plan identifiers.

The mobile device may prompt the user to confirm one or more associations (e.g., each association). The mobile device may highlight or otherwise denote lighting fixtures that have been successfully associated. The mobile device may indicate that each association has been made correctly. The user may correct an incorrect association made by the mobile device.

The associations may be stored in a memory of the mobile device. The associations may be transmitted by the mobile device to an external device having a memory (e.g., a server, a system controller, etc.) and stored on the external device. Associations may be transmitted to the lighting control devices and stored on memories of the lighting control devices. The associations may be used to configure and/or control the lighting loads in the lighting control system. For example, information may be communicated to and/or from lighting control devices using the floor plan identifier, or the unique identifier of a device may be identified for sending a message to a lighting control device having an identified floor plan identifier. For example, the mobile device 304 or the system controller may communicate digital messages to the lighting fixture 304 using the unique identifier that is associated with the floor plan identifier "D4".

Figure 11A:
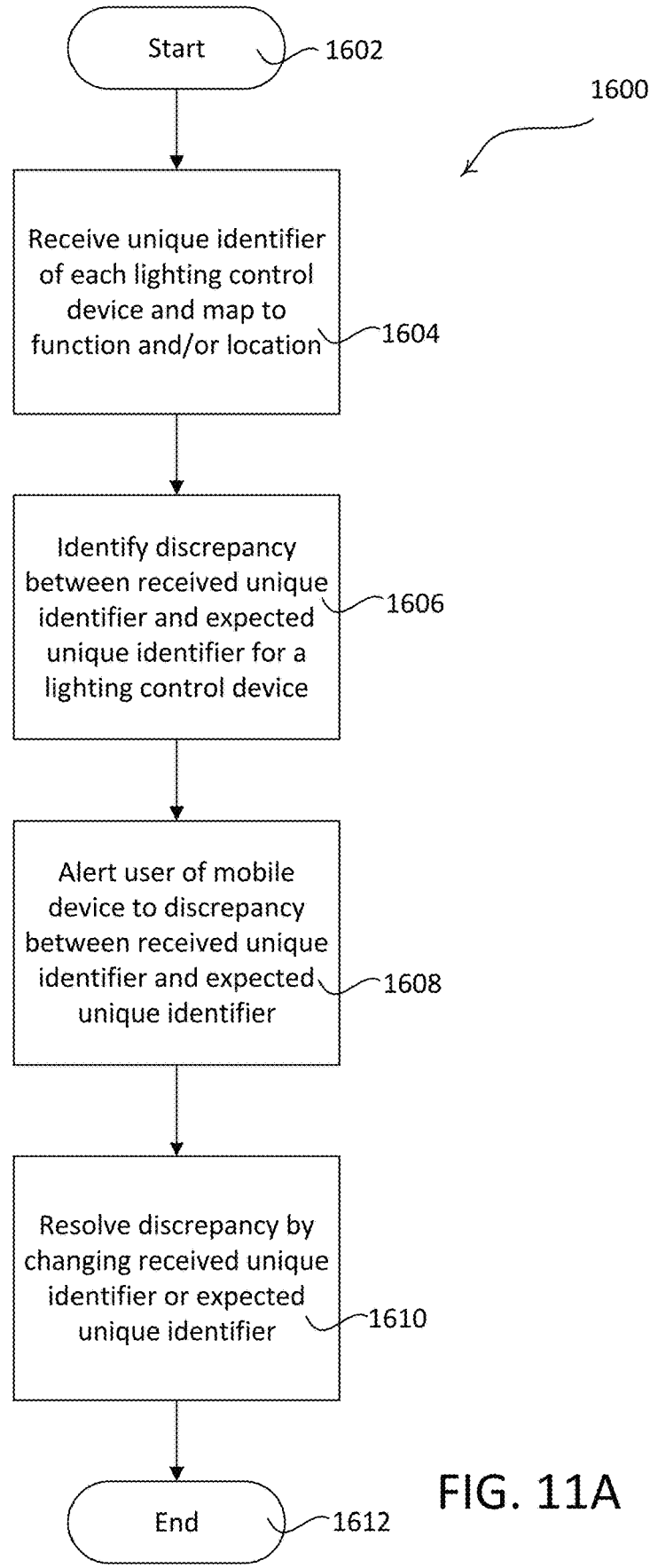
FIG. 11A is a flow diagram depicting an example method for identifying and troubleshooting a lighting fixture.

FIG. 11A is a flow diagram depicting an example method 1600 for identifying and troubleshooting a lighting fixture (e.g., lighting control devices configured to control respective lighting loads of the lighting fixtures). The method 1600 may be performed after the lighting fixture has been installed and/or commissioned. The method 1600 may be performed on a programming device, such as a mobile device (e.g., the mobile device 124 and/or the autonomous mobile devices 126, 128), or distributed across multiple programming devices, such as a mobile device, a system controller, or another device. For example, one or more portions of the method 1600 may be performed at a system controller that may provide information and/or a user interface to the mobile device for troubleshooting (e.g., via a browser or other application running on the mobile device).

The method 1600 may be performed when a lighting fixture is determined to be functioning improperly (e.g., the lighting fixture does not respond to a command from a lighting control device in an expected manner). The lighting fixture may not function properly for various reasons. For example, a lighting control device controlling the lighting fixture may be functioning improperly, e.g., it may not be properly associated with the lighting fixture and/or may be improperly wired to control the wrong lighting fixture. The lighting control device may fail to respond to commands sent from a system controller, may fail to respond to the commands after a delay, may respond to commands from devices with which the lighting control device may be improperly configured or associated, and/or may cause the lighting fixture to blink or turn on or off without input from a user.

The mobile device, a user of the mobile device, and/or the system controller may determine that the lighting fixture is functioning improperly. The user may determine that the lighting fixture is functioning improperly by viewing the lighting fixture. For example, the user may perceive that the lighting fixture is improperly responding to commands from a device, or failing to respond to commands from a device from which the lighting fixture is expected to be responsive. The user may send a command to the lighting control device controlling the lighting fixture (e.g., via the system controller and/or the mobile device), and may subsequently determine that the lighting fixture is functioning improperly based on the lighting fixture's response to the command. The system controller and/or the mobile device may determine that the lighting fixture is functioning improperly if, for example, the lighting fixture fails to respond to one or more commands, or improperly responds to commands from a device that the lighting fixture is not supposed to respond to. The determination that the lighting fixture is functioning improperly may be made during testing of the lighting fixture (e.g., following installation and commissioning), and/or during normal operation of the lighting fixture.

The method 1600 may start at 1602. The method 1600 may be initiated by the user. For example, the user may press a button or otherwise indicate on the mobile device that a lighting fixture is functioning improperly. For example, the lighting fixture may be improperly responding to commands from a device, or failing to respond to commands from a device from which the lighting fixture is expected to be responsive. At 1604, the mobile device may receive the unique identifier of each lighting control device within a given area and map the lighting control devices to their locations. For example, the area may be a room in which one or more lighting fixtures are functioning improperly. The mobile device may receive a unique identifier from a lighting control device via VLC signals (e.g., LiFi) and/or by RF signals (e.g., WI-FI®, BLUETOOTH®, near field communication (NFC), ZIGBEE®, or CLEAR CONNECT™). The mobile device may receive the unique identifiers of each lighting control device simultaneously or in a given order. The unique identifiers may be the identifier used to communicate with the lighting control devices. The unique identifiers may be zone identifiers that uniquely identify a zone that includes one or more lighting control devices. The lighting control device may additionally and/or alternatively transmit a model number of the lighting control device to the mobile device. For example, the model number may indicate that the control device in a specific fixture is an LTE-series driver. The mobile device may map the lighting control devices to their functions and/or locations based on input from the user. For example, the mobile device may prompt the user to enter a location and/or a function for each lighting control device. Alternatively, the mobile device may map the functions and/or locations of the lighting control devices based on a floor plan. The floor plan may include one or more floor plan lighting fixtures, each of which may correspond to a lighting fixture in the given area. The floor plan may include floor plan data, such as placement of the lighting control devices on the floorplan and model numbers for each of the lighting control devices, for example. For example, the floor plan data may additionally include associations between each floor plan lighting fixture and an expected unique identifier for the lighting control device controlling the lighting fixture corresponding to the floor plan lighting fixture. The floor plan data may include information about the function of each lighting fixture. For example, the floor plan data may indicate whether a given lighting fixture is used for accent lighting, ambient lighting, and/or the like. The floor plan data may indicate whether a lighting fixture is dimmable, whether the lighting fixture is a low-end intensity (e.g., the lighting fixture is a 1% lighting fixture), the color-changing ability of the lighting fixture (e.g., full color adjustment and/or color temperature control), any control devices (e.g., occupancy sensors, daylight sensors, remote controls, and/or the like) that are controlling the lighting fixture, and/or whether the lighting fixture is an emergency fixture (e.g., whether the lighting fixture will remain on if power to the building is lost).

At 1606, a discrepancy between an identifier received from the improperly-functioning lighting fixture and an expected identifier for the lighting control device controlling the lighting fixture may be identified. The mobile device may determine an expected identifier for a lighting control device based on the floor plan data. For example, the identifier may be the unique identifier, and/or the identifier may include the model number of the lighting control device. The mobile device may receive the unique identifier of a lighting control device controlling lighting fixture "Downlight 1". The mobile device may determine that "Downlight 1" is located in room 101 of a building (e.g., as described herein). The mobile device may determine that there is a floor plan lighting fixture corresponding to "Downlight 1" in the floor plan data based on the location of "Downlight 1". The mobile device may determine that the expected unique identifier for the lighting control device controlling "Downlight 1" is the unique identifier associated with the floor plan lighting fixture corresponding to "Downlight 1." For example, the mobile device may determine that the unique identifier for the floor plan lighting fixture corresponding to "Downlight 1" is "XYZ789," and may determine that the expected unique identifier for the lighting control device controlling "Downlight 1" is "XYZ789."

The mobile device may automatically (e.g., without input from the user) identify the discrepancy between the expected identifier and the actual identifier of the lighting control device. The mobile device may identify the discrepancy based on a comparison between the received identifier and the expected identifier. For example, the mobile device may receive the unique identifier "ABC123" from an improperly-functioning lighting fixture, determine that the expected unique identifier for that lighting fixture is "XYZ789", and identify a discrepancy based on the received and expected unique identifiers. According to a second example, the mobile device may determine that the model number of the lighting control device does not match the expected model number corresponding to the fixture shown on the overlaid floorplan on the mobile device display.

The mobile device may identify the discrepancy based on input from the user. For example, the mobile device may prompt the user to enter the expected identifier for a lighting control device, and may compare the expected identifier to the unique identifier received from the lighting fixture being controlled by the lighting control device. For example, the user may determine the expected unique identifier from the floor plan, and enter the expected unique identifier. In addition, the user may indicate the location of the lighting fixture in the floor plan data on the mobile device. For example, the mobile device may display the floor plan data and prompt the user to select the corresponding floor plan lighting fixture, and the mobile device may determine the expected unique identifier based on the selected lighting fixture.

At 1608, the user may be alerted to the discrepancy between the received unique identifier and the expected unique identifier. The user may be alerted by the mobile device, the system controller, the lighting control device, a separate programming device, or some combination thereof. For example, the mobile device may cause the lighting control device to blink the lighting fixture in a pre-determined pattern to alert the user. The mobile device may (e.g., upon receipt of the digital message) send a notification to the user. The mobile device may send the notification to the user by, for example, vibrating, flashing or blinking a light, displaying text on the screen, playing a sound, and/or the like. The mobile device, system controller, and/or the lighting control device may alert the user by sending a digital message to a separate programming device, which may then send a notification to the user. For example, the system controller may send an email to the user informing the user of the discrepancy. The alert may include the floor plan identifier, the expected identifier, and/or the actual identifier of the lighting control device at the location of the floor plan identifier. The mobile device may prompt the user to acknowledge the alert.

At 1610, the discrepancy between the received identifier and the expected identifier may be resolved. For example, the floor plan data may be updated. The identifier (e.g., the unique identifier and/or the model number) in the floor plan for the lighting fixture corresponding to the improperly-functioning lighting fixture (e.g., the expected identifier) may be changed to match the received identifier of the lighting fixture (e.g., the unique identifier of the lighting control device of the lighting fixture in the space), such that the floorplan (e.g., blueprint) accurately represents what controls are installed in the space. For example, if the received unique identifier is "ABC123" and the expected unique identifier is "XYZ789," the expected unique identifier may be changed to "ABC123." Alternatively, the identifier of the lighting control device controlling the improperly-functioning lighting fixture may be changed (e.g., in memory of the lighting control device, the system controller, and/or other devices in the system) to match the expected lighting fixture identifier (e.g., the unique identifier in the floor plan for the lighting fixture corresponding to the improperly-functioning lighting fixture). For example, if the received unique identifier is "ABC123" and the expected unique identifier is "XYZ789," the unique identifier of the lighting control device controlling the improperly-functioning lighting fixture may be changed to "XYZ789." Alternatively, the user may change out the lighting control device so that the model number of the lighting control device matches the model number of the floorplan (e.g., when an incorrect product has been installed).

The mobile device may resolve the discrepancy based on input from the user. For example, the mobile device may prompt the user to select whether to change the received unique identifier (e.g., change the unique identifier of the lighting control device of the lighting fixture) or the expected unique identifier (e.g., change the unique identifier for the lighting fixture in the floor plan data). The mobile device may then change the selected unique identifier to match the non-selected unique identifier. The mobile device may prompt the user to enter another unique identifier (e.g., other than the expected or received unique identifier) for the lighting control device, and may then update both the expected unique identifier and the received unique identifier to match the unique identifier entered by the user. For example, the user may enter the unique identifier "MNO654." The mobile device may update the floor plan data to reflect the new unique identifier, and may send a digital message to the lighting control device (e.g., via the system controller), the system controller, and/or other devices in the system to inform the devices of the unique identifier for being stored thereon.

The mobile device may resolve the discrepancy without input from the user. For example, the mobile device may automatically select the received unique identifier or the expected unique identifier, and update the selected unique identifier. The method 1600 may end at 1612.

Figure 11B:
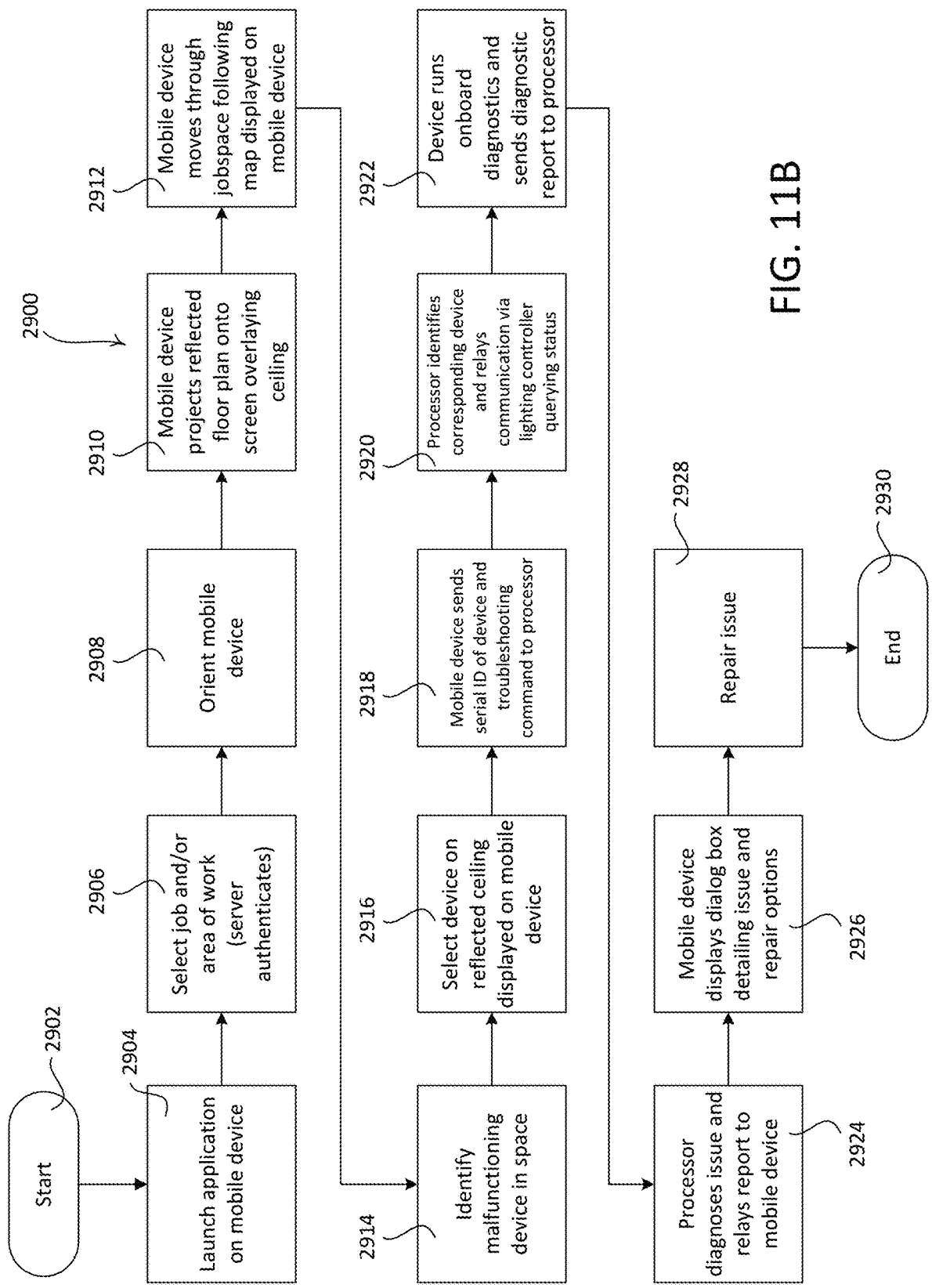
FIG. 11B is a flow diagram depicting an example method for identifying and troubleshooting a lighting fixture.

FIG. 11B is a flow diagram depicting an example method 2900 for identifying and troubleshooting a lighting fixture or lighting control device. The method 2900 may be performed on a programming device, such as a mobile device (e.g., the mobile device 124 and/or the autonomous mobile devices 126, 128), or distributed across multiple programming devices, such as a mobile device, a system controller, control devices, and/or other devices. The method 2900 may begin at 2902. At 2904, an application may be launched on the mobile device. The application may be, for example, an application for use in installing, commissioning, troubleshooting, and/or controlling one or more control devices (e.g., lighting fixtures, lighting control devices, and/or other types of control devices). At 2906, a job and/or area of work may be selected. The selected job and/or area of work may be authenticated by a server. That is, the application and/or a user may provide credentials to access the specific job and any associated floorplans/blueprints or other information about the job or area.

At 2908, the mobile device (e.g., the application) may determine its orientation. The orientation may be determined automatically (e.g., using a real-time orientation sensors). For example, the mobile device may use an accelerometer, an altimeter, a gyroscope, and/or any other sensor for detecting orientation on a mobile device to determine its orientation. The accelerometer and/or gyroscope may indicate, for example, that the mobile device is facing in an upwards direction. The orientation may be determined based on two or more defined portions of a room captured in an image by the mobile device.

At 2910, the mobile device may overlay a reflected floor plan onto an image displayed on a display of the mobile device. The image may be taken by an internal camera of the mobile device. For example, the application may use a front or rear-facing camera of the mobile device to display a map, e.g., a live video feed of the ceiling of the space with the floorplan overlaid on the video feed image, as shown and described in FIG. 12. At 2912, the mobile device (e.g., a user of the mobile device) may move around the job space, following the map displayed on the mobile device. At 2914, an improperly-functioning (e.g., not functioning as expected) control device in the job space may be identified (e.g., by the user and/or by the mobile device). For example, if the control device is a lighting fixture (e.g., a lighting control device controlling the lighting fixture), the lighting fixture may be flickering and/or have one or more burnt out bulbs. At 2916, the improperly-functioning control device may be selected (e.g., by the user) on the reflected floor plan displayed on the mobile device. At 2918, the mobile device may send a serial ID (e.g., a unique identifier) of the improperly-functioning control device and/or a troubleshooting command to the system controller. At 2920, the system controller may identify the improperly-functioning control device and may transmit to the improperly-functioning control device a message (e.g., a message querying for the status of the improperly-functioning control device). At 2922, the improperly-functioning control device may run onboard diagnostics and may send a diagnostic report to the processor (e.g., in response to receiving the message querying for the status of the improperly-functioning control device). At 2924, the processor may diagnose an issue with the improperly-functioning control device based on the diagnostic report and may relay the diagnostic report to the mobile device. For example, the processor may determine that one or more lamps of a fixture are off, and may determine that the lamp is faulty or has burned out and may be in need of replacement. At 2926, the mobile device may display a dialog box detailing the issue and/or repair options. At 2928, the issue may be repaired (e.g., by the user). The method 2900 may end at 2930.

Figure 11C:
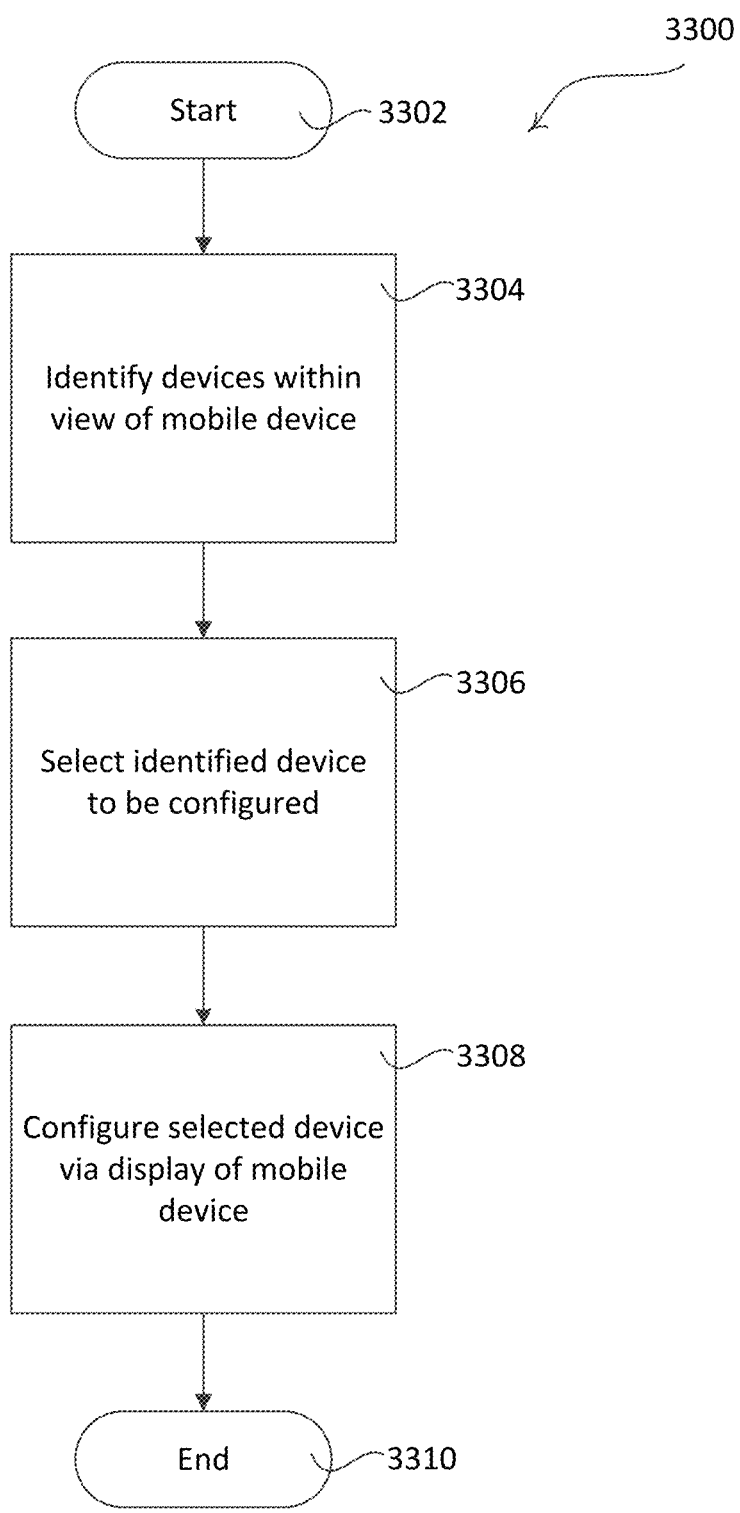
FIG. 11C is a flow diagram depicting an example method for configuring a control device via a mobile device.

FIG. 11C is a flow diagram depicting an example method 3300 for configuring (e.g., reconfiguring) a control device via a mobile device. The method 3300 may be performed after the control device has been installed and/or commissioned. The method 3300 may be performed on a programming device, such as a mobile device (e.g., the mobile device 124 and/or the autonomous mobile devices 126, 128), or distributed across multiple programming devices, such as a mobile device, a system controller, control devices, and/or other devices. For example, one or more portions of the method 3300 may be performed at a system controller that may provide information and/or a user interface to the mobile device (e.g., via a browser or other application running on the mobile device) and/or a control device for configuring the control device. For example, the method 3300 may be performed when a lighting fixture is determined to be functioning improperly (e.g., the lighting fixture is malfunctioning) and the lighting control device controlling the lighting fixture needs to be reconfigured in order to operate properly.

The method 3300 may be performed when a user of the mobile device determines to configure (e.g., reconfigure) one or more control devices within a given area. The area may be, for example, a room of a building. A control device may be, for example, a lighting fixture, a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or another control device. The method 3300 may be performed simultaneously for multiple control devices or in sequential order. For example, the user may control the brightness of multiple lighting fixtures at the same time.

The method 3300 may begin at 3302. At 3304, the mobile device may identify one or more control devices within view of the mobile device. For example, the mobile device may have an internal camera, and may identify each device within view of the internal camera. The mobile device may display an image including the control devices on a display of the mobile device. The mobile device may identify the control devices based on input from the user. The mobile device may prompt the user to enter a location and/or establish an orientation of the mobile device, as described herein.

The mobile device may have access to a floor plan that includes floor plan data. The floor plan data may include information regarding the location of each control device. The mobile device may use the floor plan data to identify the control devices in the area. The floor plan data may include information about one or more floor plan control devices, each corresponding to a control device in the area in which the mobile device is located. For example, the floor plan data may include a location, function, unique identifier, floor plan identifier, or type for each floor plan control device. The floor plan data may indicate connections between two or more floor plan control devices. A connection (e.g., association or link) between two control devices (e.g., the remote control device and the lighting control device) may be wired or wireless. A connection may be made between two or more control devices at installation and/or commissioning of the control devices or during normal operation of the control devices. For example, the user may create a connection between two control devices by associating the two control devices and storing the association in local memory and/or a remote server. The user may create a connection between the control devices by wiring the devices together at installation. The mobile device may determine its location and orientation and determine which control devices are at the determined location using the floor plan data. The mobile device may identify the control devices in view of the mobile device based on the mobile device's orientation as described herein.

The mobile device may identify the control devices automatically (e.g., without input from the user). The mobile device may identify the control devices by determining a location and orientation of the mobile device (e.g., as described herein). For example, the mobile device may determine the location of the mobile device using a real-time locating system executed on the mobile device (e.g., GPS, triangulation, NFC, geolocation, etc.). The mobile device may determine the orientation of the mobile device using one or more of an internal compass, gyroscope, accelerometer, and/or any other sensor for detecting orientation on a mobile device. The mobile device may receive a unique identifier from each control device within the area (e.g., as described herein). For example, the unique identifiers may be communicated via RF signals and/or via VLC signals (e.g., LiFi). The RF signals may be, for example, a WI-FI® signal, a BLUETOOTH® signal, a near field communication (NFC) signal, a ZIGBEE® signal, a CLEAR CONNECT™ signal, or another RF signal. The mobile device may receive the unique identifiers from the control devices and determine the unique identifiers based on the received signals. The mobile device may determine a floor plan identifier for each control device based on the unique identifiers and the floor plan data. For example, the floor plan data may include, for each control device, an association between a unique identifier and a floor plan identifier. The mobile device may overlay the floor plan identifiers onto the respective control devices on the display of the mobile device. The mobile device may prompt the user to confirm that the displayed floor plan identifiers are correct.

At 3306, one or more of the identified control devices may be selected to be configured (e.g., reconfigured). An individual control device, multiple control devices, a predetermined group of control devices, or each control device within the area may be selected. For example, in an area including multiple lighting fixtures, one lighting fixture, a subset of the lighting fixtures, or each lighting fixture within the area may be selected. The predetermined groups may be determined based on, for example, user input, type or function of a control device, location of the control device, and/or the like. For example, a first group may include each motorized treatment in a room, and a second group may contain each lighting fixture on the left side of the room. An indication of the control devices selected for configuration may be overlaid over the image and/or video of the control devices, such that the user may identify the selected devices. For example, the indicator may be a color, symbol, or other identifier that is overlaid on, or adjacent to, the selected control device(s).

One or more control devices may be selected based on user input. For example, the mobile device may prompt the user to select one or more control devices on the display of the mobile device. For example, the user may select one or more of the lighting fixtures or zones of lighting fixtures indicated as being recognized on the display of the mobile device (e.g., by the overlaid indicators identifying lighting fixtures). The mobile device may prompt a user to select one or more settings of the controls being overlaid on the display of the mobile device. The settings may include, for example, a high-end trim (e.g., a maximum intensity), a low-end trim (e.g., a minimum intensity), a present intensity, a fade rate, a turn-off delay time, a color temperature range, an occupancy/vacancy mode, an occupancy sensitivity setting, a daylighting threshold, etc. For example, the user may select a high-end trim setting on the display of the mobile device, and the mobile device may select one or more lighting fixtures and/or motorized window treatments to be configured (e.g., to have the high-end trim adjusted).

At 3308, the selected device may be configured via the display of the mobile device. The mobile device may prompt the user to select and/or enter a setting based on the selected control device(s). The mobile device may prompt the user to enter the setting via a slider, a switch, a text box, and/or the like. The mobile device may display a popup window or other information on the display of the mobile device. The popup window may be overlaid over the image and/or video of the room being displayed from the camera of the mobile device. The user may enter a value for the setting into the popup window. For example, an occupancy sensitivity setting may be selected for configuration. The mobile device may display a popup window prompting the user to adjust the occupancy sensitivity in the popup window. If multiple control devices are selected for configuration, the mobile device may display a single popup window or multiple popup windows (e.g., one for each selected control device). If a single popup window is displayed, the mobile device may prompt the user to enter a single setting or multiple settings (e.g., one for each selected control device). For example, the user may select four lighting fixtures for configuration. The mobile device may display a single popup window and prompt the user to enter four settings (e.g., one for each of the four lighting fixtures) or one command (e.g., for each of the four lighting fixtures).

After the user has entered the value of the setting, the mobile device may transmit configuration data including the value of the setting to the control device(s). The configuration data may be sent as one or more digital messages (e.g., as a series of digital messages). The mobile device may send the configuration data via, for example, an RF signal (e.g., a WI-FI® signal, a BLUETOOTH® signal, a near field communication (NFC) signal, a ZIGBEE® signal, a CLEAR CONNECT™ signal, or another RF signal). The mobile device may send the configuration data to the control device(s) directly and/or via a separate device (e.g., a system controller). The control device(s) may send a response message to the mobile device (e.g., via a system controller) after receiving the configuration data. The response message may include an acknowledgement and/or the status of the control device(s). The updated value of the setting of the control device(s) may be overlaid on top of the images and/or video being displayed from the camera to present the configuration data of the control device(s) in view. The method 3300 may end at 3310.

Figure 12:
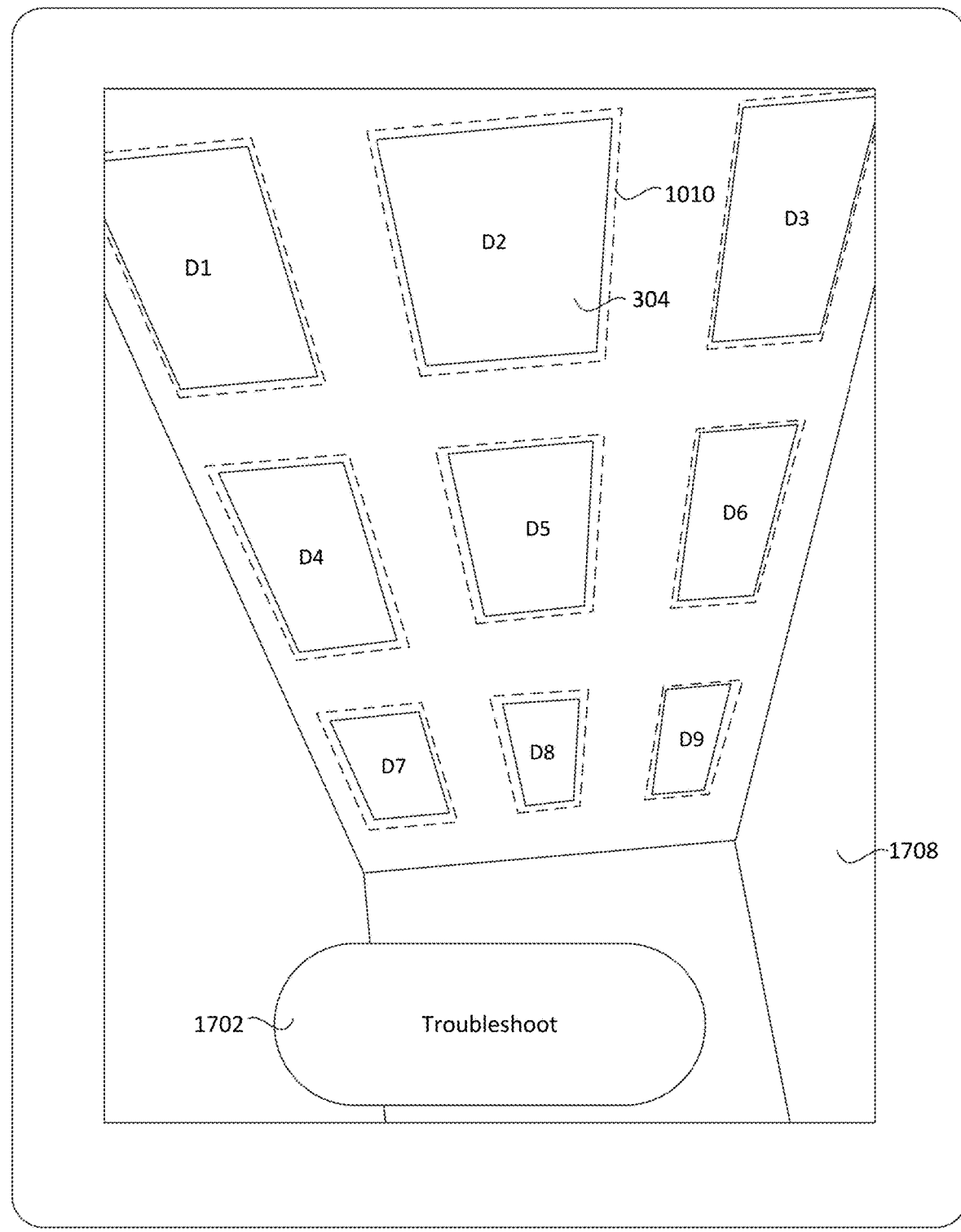
FIG. 12 depicts a representative image of an example user interface that may be displayed on a mobile device to troubleshoot one or more improperly-functioning lighting fixtures.

FIG. 12 depicts a representative image 1708 that may be displayed on a mobile device to troubleshoot one or more lighting fixtures (e.g., lighting control devices controlling the respective lighting fixtures) that are functioning improperly. The image 1708 may represent a frame of a video generated by the mobile device, for example. The image 1708 may be similar to the image 1008 displayed in FIG. 10. The image 1708 may include the lighting fixtures within a location, or a subset thereof. The image 1708 may display one or more lighting fixtures within a location and/or information associated with the lighting fixtures. For example, image 1708 may display lighting fixture 304, outline 1010 identifying the lighting fixture 304, and floor plan identifier D2 identifying lighting fixture 304. The mobile device may overlay an outline surrounding each lighting fixture and/or a floor plan identifier for each lighting fixture onto image 1708. Outline 1010 and/or floor plan identifier D2 may be overlaid onto the image 1708 by the mobile device.

The mobile device may overlay one or more objects (e.g., lines, arrows, symbols, etc.) onto an image (e.g., the image 1708). The mobile device may determine to overlay the objects onto the image based on the location/orientation of the mobile device and/or floor plan data accessible to the mobile device. The floor plan data may indicate information about one or more floor plan control devices. For example, the floor plan data may indicate a location, floor plan identifier, unique identifier, function, type, and/or the like for each floor plan control device.

The mobile device may determine its location and/or orientation as described herein. The mobile device may be located within an area (e.g., a room of a building). The mobile device may view the area, for example using an internal camera of the mobile device, and may generate an image of the area (e.g., the image 1708). The mobile device may identify that one or more control devices are present within the image, for example using imaging analysis. The mobile device may determine an approximate location (e.g., absolute or relative to the mobile device) of each control device in the image using one or more techniques described herein.

The mobile device may identify the control devices in the image based on the floor plan data. For example, the floor plan data may include a corresponding floor plan control device for each control device present in the area in which the mobile device is located. The floor plan data may indicate a location (e.g., a relative location and/or an absolute location) for each floor plan control device. The mobile device may identify a control device based on the mobile device's location/orientation and/or the floor plan data. The mobile device may determine that a floor plan control device is indicated as being at a location that is within a threshold distance of the location of a given control device within the image. For example, the mobile device may determine that the floor plan control device indicated as being at the same location as the given control device. The mobile device may determine that the given control device corresponds to the floor plan control device. After the mobile device has identified a control device, the mobile device may information from the floor plan data (e.g., an outline and/or floor plan identifier) onto each control device in the image.

The image 1708 may be displayed on the mobile device after the lighting fixtures have been commissioned. The lighting fixtures may be commissioned as described herein. The image 1708 may be displayed on the mobile device after it has been determined that one or more of the lighting fixtures is functioning improperly (e.g., at 1604 of the method 1600 of FIG. 10A). A user of the mobile device may indicate that a lighting fixture is functioning improperly. The mobile device, a system controller, and/or any other programming device may detect that the lighting fixture is functioning improperly. The mobile device may alert the user of the improperly functioning lighting fixture by, for example, vibrating, flashing or blinking a light, displaying text on a display screen, playing a sound, and/or the like. The mobile device may prompt the user to troubleshoot the lighting control devices in the fixtures by pressing a troubleshoot button 1702. Alternatively, the mobile device may automatically (e.g., without input from the user) troubleshoot the improperly-functioning lighting fixture.

Figure 13:
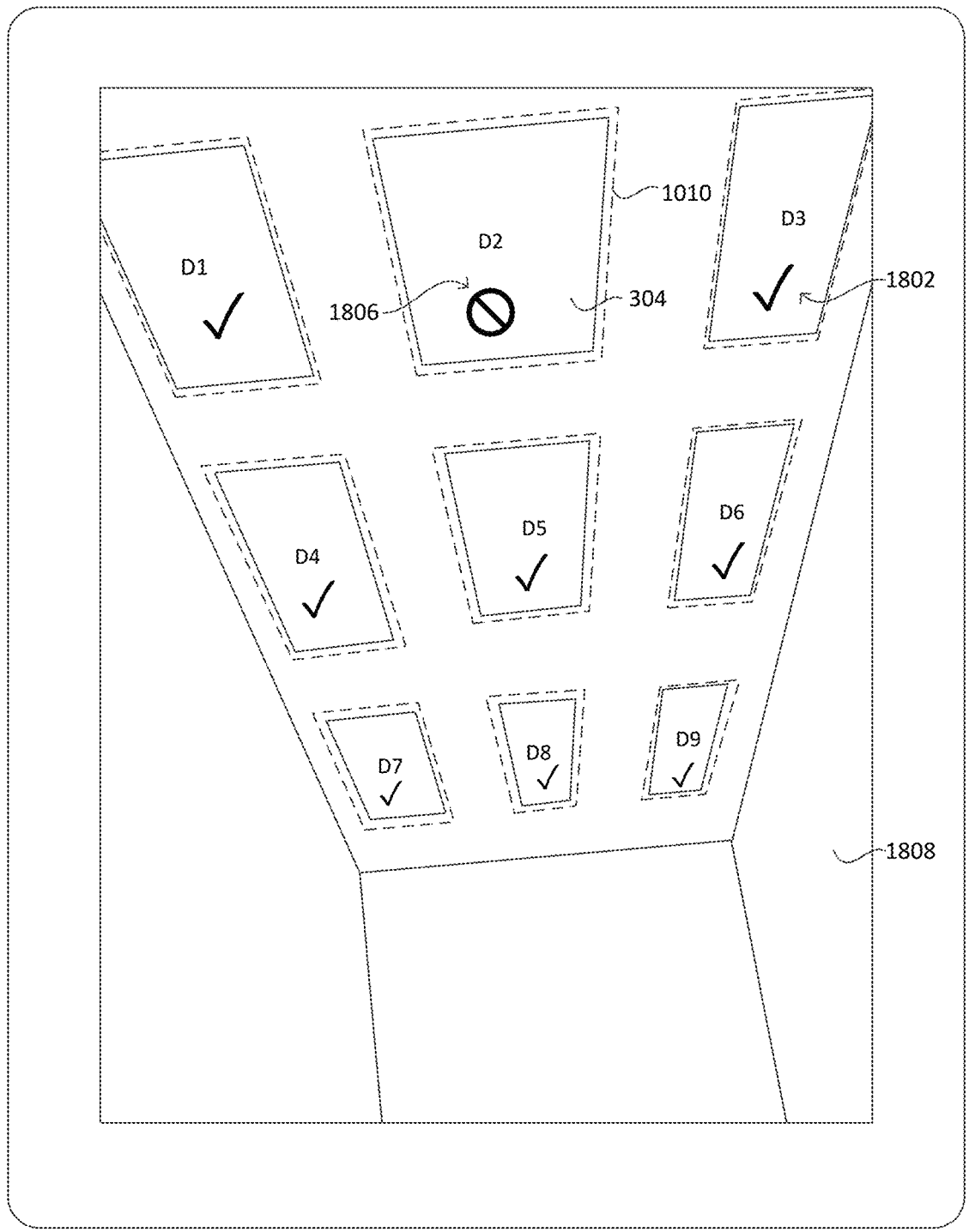
FIG. 13 depicts a representative image of an example user interface that may be displayed on a mobile device to identify an improperly-functioning lighting fixture.

FIG. 13 depicts a representative image 1808 that may be displayed on a mobile device to identify an improperly-functioning lighting fixture (e.g., at 1606 of the method 1600 of FIG. 11A). The image 1808 may represent a frame of a video generated by the mobile device, for example. The image 1808 may display one or more lighting fixtures within a location and/or information associated with the lighting fixtures. For example, image 1808 may display lighting fixture 304, outline 1010 from the floor plan overlay, and floor plan identifier D2 identifying lighting fixture 304. As described herein, the mobile device may overlay an outline surrounding each lighting fixture and/or a floor plan identifier for each lighting fixture onto image 1808. For example, outline 1010 and/or floor plan identifier D2 may be overlaid onto the image 1808 by the mobile device.

The mobile device may determine that lighting fixture 304 is functioning improperly based on an indication from the user. For example, the mobile device may prompt the user to select which lighting fixture is functioning improperly, and the user may select lighting fixture 304 on the display of the mobile device. The mobile device may determine that lighting fixture 304 is functioning improperly based on information received from the system controller, the lighting control device (not shown) controlling lighting fixture 304, and/or any other programming device. For example, the system controller or the mobile device may detect that lighting fixture 304 is functioning improperly by failing to respond to messages sent to the lighting fixture 304 using the unique identifier 304 of the lighting control device, or inappropriately responds to messages intended for other lighting control devices, and may send a digital message to the mobile device indicating that lighting fixture 304 is functioning improperly.

The mobile device may determine that lighting fixture 304 is functioning improperly based on information received from a lighting control device which controls lighting fixture 304. The mobile device may receive a unique identifier that identifies the lighting control device from the lighting control device. The lighting control device may transmit the unique identifier via, for example, VLC signal (e.g., LiFi) and/or an RF signal. The mobile device may determine that lighting fixture 304 is functioning improperly if the unique identifier (e.g., serial number and/or model number) received from the lighting control device does not match an expected unique identifier for the lighting control device (e.g., there is a discrepancy between the expected unique identifier and the received unique identifier). The mobile device may determine the expected unique identifier based on floor plan data. For example, the expected unique identifier may be a unique identifier for a floor plan lighting fixture that corresponds to lighting fixture 304.

The image 1808 may indicate the improperly-functioning lighting fixture 304 on the display of the mobile device. For example, as shown in FIG. 13, the mobile device may overlay a symbol 1806 or other indicator that indicates the lighting control device is improperly functioning onto the lighting fixture 304 in the image 1808. For example, the symbol 1806 may be a no symbol, a letter (e.g., X), a number, a given color (e.g., red), and/or any other symbol or indicator that indicates that the lighting control device is functioning improperly. The outline 1010 may change to indicate that the lighting control device is functioning improperly. For example, the outline 1010 may turn a given color (e.g., red), blink, and/or become animated. The image 1808 may also indicate one or more lighting fixtures that are functioning properly. For example, as shown in FIG. 10C, the mobile device may overlay a symbol 1802 or other indicator that indicates the lighting control device is improperly functioning over each properly functioning lighting fixture D1, D3-D9 displayed in the image 1808. For example, the symbol 1802 may be a checkmark, a letter, a number, a given color (e.g., green), and/or any other symbol or indicator that indicates that the lighting control device is functioning properly. The mobile device may shade the improperly-functioning lighting fixture 304 in a first color (e.g., red) and shade the properly functioning lighting fixtures in a second color (e.g., green).

Figure 14A:
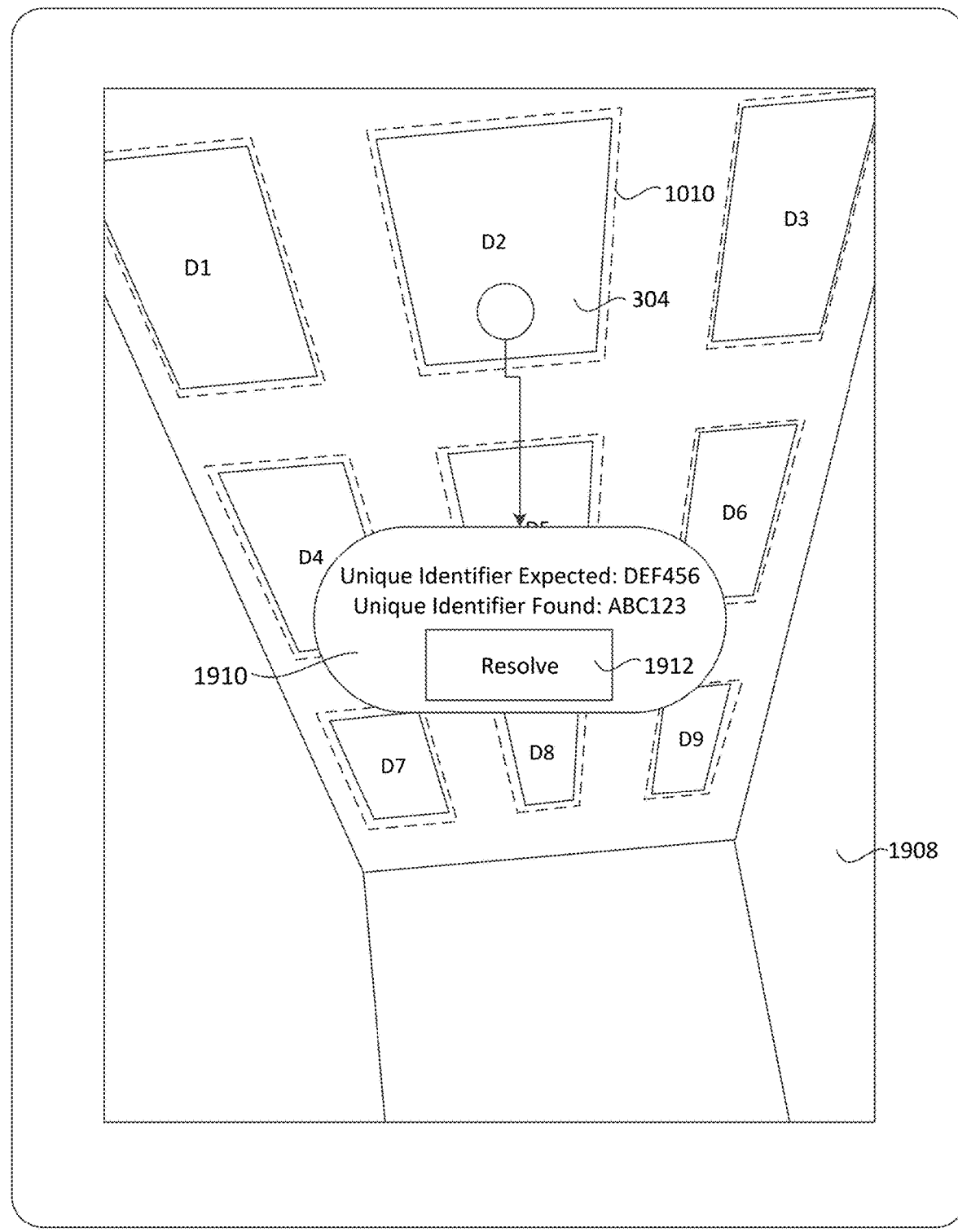
FIG. 14A depicts a representative image that may be displayed on a mobile device to resolve a discrepancy between unique identifiers for a lighting fixture.

FIG. 14A depicts a representative image that may be displayed on a mobile device to resolve a discrepancy between a received unique identifier for a lighting fixture and an expected unique identifier for the lighting fixture (e.g., at 1610 of the method 1600 of FIG. 11A). The mobile device may determine that the unique identifier of the lighting control device controlling the improperly-functioning lighting fixture does not match the unique identifier of the corresponding floor plan lighting fixture. For example, the mobile device may determine that the unique identifier of the lighting control device controlling lighting fixture 304 is "ABC123," while the unique identifier of the floor plan lighting fixture corresponding to lighting fixture 304 is "DEF456." The mobile device may determine the unique identifier of the lighting control device controlling the improperly-functioning lighting fixture as described herein.

The mobile device may display the received unique identifier and the expected unique identifier in popup window 1910 (e.g., at 1608 of the method 1600 of FIG. 11A). The mobile device may overlay popup window 1910 onto image 1908. For example, the mobile device may display the unique identifier of the floor plan lighting fixture corresponding to lighting fixture 304 (e.g., the expected unique identifier) and the unique identifier of the lighting control device controlling lighting fixture 304 (e.g., the received unique identifier). The popup window 1910 may include a resolve button 1912. The user may press the resolve button 1912 in order to resolve the discrepancy between the received unique identifier and the expected unique identifier (e.g., at 1610 of the method 1600 of FIG. 11A). For example, the mobile device may update the unique identifier of the floor plan lighting fixture corresponding to light fixture 304 such that it matches the unique identifier of the lighting control device controlling the improperly-functioning lighting fixture. The mobile device may display a message (not shown) or otherwise indicate to the user that the discrepancy has been resolved. For example, the mobile device may cause (e.g., via the system controller) the light fixture 304 to blink in a given color (e.g., green). The mobile device may prompt the user to test and/or confirm that the discrepancy has been resolved. For example, the mobile device may prompt the user to send a command to the light fixture 304 and may prompt the user to confirm that the light fixture 304 responded correctly.

Figure 14B:
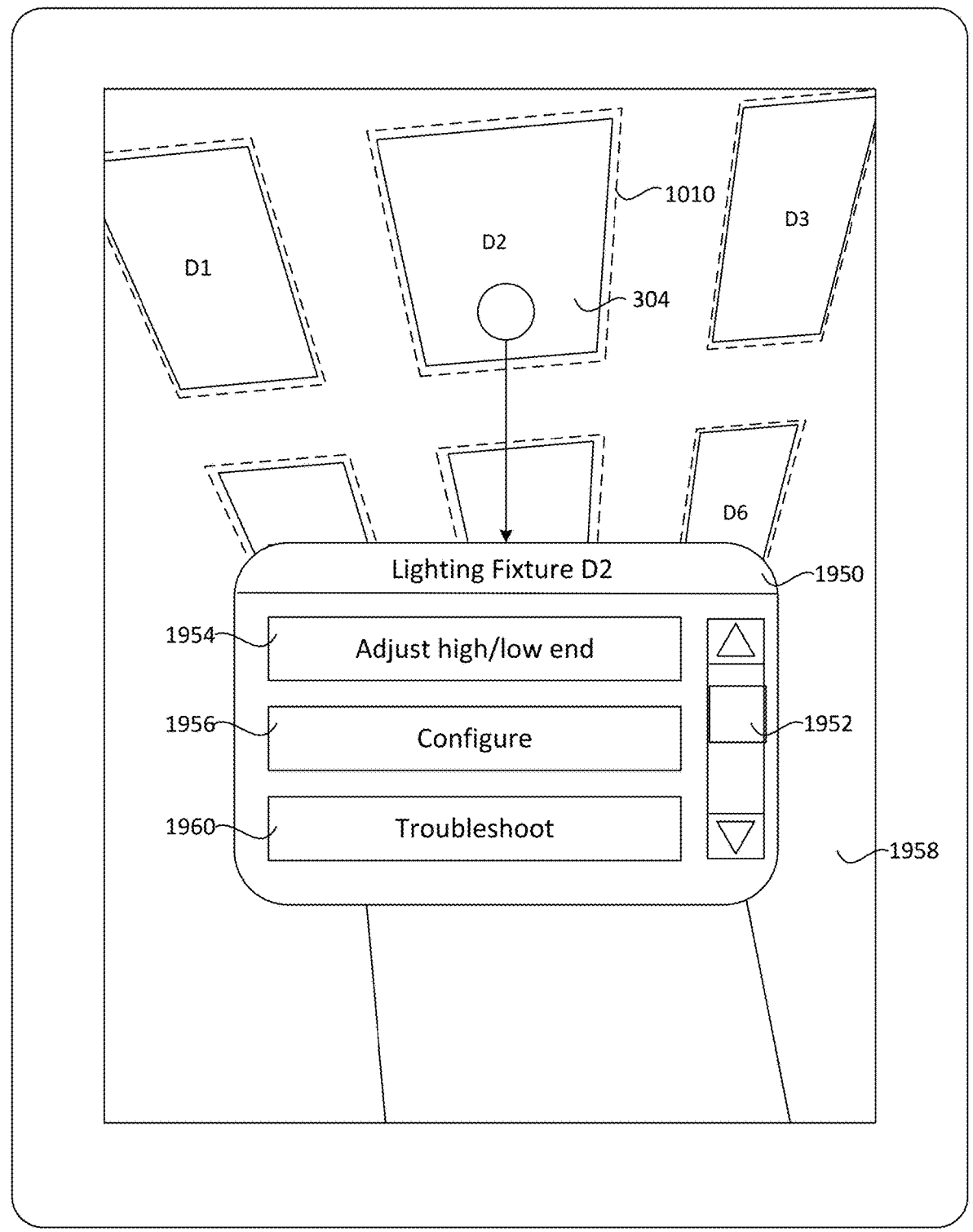
FIG. 14B depicts a representative image that may be displayed on a mobile device to troubleshoot an improperly-functioning control device (e.g., a lighting fixture, lighting control device, load control device, and/or any other type of control device).

FIG. 14B depicts a representative image 1958 that may be displayed on a mobile device (e.g., the mobile device 124 and/or the autonomous mobile devices 126, 128) to reconfigure and/or troubleshoot a control device (e.g., an improperly-functioning control device). For example, the control device may be a lighting fixture, lighting control device, and/or any other type of control device. The image 1958 may represent a frame of a video generated by the mobile device, for example. The image 1958 may display one or more lighting fixtures within a location and/or information associated with the lighting fixtures. For example, the image 1958 may display lighting fixture 304, outline 1010 identifying the lighting fixture 304, and/or floor plan identifier D2 identifying lighting fixture 304. Outline 1010 and/or floor plan identifier D2 may be overlaid onto the image 1958 by the mobile device.

The image 1958 may be displayed on the mobile device after the mobile device has determined the location/orientation of the mobile device and/or identified the control devices in view of the mobile device, as described herein. For example, the mobile device may determine the location and/or orientation of the mobile device using a real-time locating system executed on the mobile device. The mobile device may identify the control devices in view of the mobile device based on the location/orientation of the mobile device and floor plan data accessible to the mobile device.

The image 1958 may be displayed on the mobile device after a user of the mobile device has indicated that a control device (e.g., lighting fixture 304) to reconfigure and/or troubleshoot (e.g., a control device that is functioning improperly). For example, the control device may be failing to respond to commands sent to the control device (e.g., a lighting control device controlling a lighting fixture) and/or improperly respond to commands sent to the control device. The user may determine that the control device is functioning improperly by viewing the control device. For example, if the control device is a lighting fixture, the user may perceive that the lighting fixture is blinking, flashing, failing to respond to commands, is too bright, or otherwise functioning improperly. The user may indicate the control device by selecting the control device in the image 1958. For example, to select lighting fixture 304 (e.g., to indicate that lighting fixture 304 is functioning improperly), the user may press within the area formed by outline 1010 on the display of the mobile device.

The image 1958 may include information about the improperly-functioning control device. For example, as shown in FIG. 14B, the image 1958 may include a popup window 1950. The popup window 1950 may display the type, function, floor plan identifier, unique identifier, or any other information for the control device. For example, as shown in FIG. 14B, the popup window 1950 may display the floor plan identifier D2 for lighting fixture 304. The popup window 1950 may include one or more buttons that the user may actuate in order to perform one or more actions related to the improperly-functioning control device. For example, as shown in FIG. 14B, the popup window 1950 may include buttons 1954, 1956, and/or 1960. The user may actuate the button 1954 in order to adjust the control device as a high-end trim (e.g., a maximum intensity) or a low-end trim (e.g., a minimum intensity) of one or more of the lighting fixtures.

The user may actuate the button 1956 in order to adjust the configuration of the control device. For example, actuating the button 1956 may cause the popup window 1950 to display one or more settings associated with the lighting fixture 304. The settings may include, for example, a high-end trim, a low-end trim, a present intensity, a fade rate, a turn-off delay time, a color temperature range, an occupancy/vacancy mode, an occupancy sensitivity setting, a daylighting threshold, etc. For example, the user may actuate the button 1956 to configure the lighting fixture 304, and modify the occupancy sensitivity setting for the lighting fixture 304 from "High" to "Low."

One or more types of control devices may be configured. For example, a temperature control device may be selected for configuration. The mobile device may display a popup window prompting the user to enter a temperature in the popup window. If multiple control devices are selected for configuration, the mobile device may display a single popup window or multiple popup windows (e.g., one for each selected control device). If a single popup window is displayed, the mobile device may prompt the user to enter a single command or multiple commands (e.g., one for each selected control device). For example, the user may select four lighting fixtures for configuration. The mobile device may display a single popup window and prompt the user to enter four commands (e.g., one for each of the four lighting fixtures) or one command (e.g., for each of the four lighting fixtures).

The user may actuate the button 1960 in order to troubleshoot the lighting fixture 304 (e.g., if the lighting fixture is operating improperly). For example, actuating the button 1960 may cause the lighting fixture 304 (e.g., a lighting control device controlling lighting fixture 304) to run a diagnostics program. For example, the diagnostics program may include providing one or more predefined commands to the lighting fixture 304 and determining responses of the lighting fixture 304 to the predefined commands. The lighting fixture 304 may diagnose one or more issues based on the results of the diagnostics program. For example, the lighting fixture 304 may determine that one or more components of the lighting fixture 304 (e.g., an LED bulb) are not functioning properly. The lighting fixture 304 may send the results of the diagnostic program and/or information about the diagnosed issues to the mobile device and/or a system controller as described herein. The popup window 1950 may display the results of the diagnostic program and/or the information about the diagnosed issues. The popup window 1950 may display one or more recommendations for troubleshooting the diagnosed issue. The mobile device may prompt the user to resolve the diagnosed issue.

The popup window 1950 may include a scroll bar 1952. The user may use the scroll bar 1952 to view one or more buttons (not shown) in addition to buttons 1954, 1956, and 1960. For example, the user may use the scroll bar 1952 to view a button (not shown) labeled "Add Remote Control Device" that, when actuated, may allow the user to associate a control device with the lighting fixture 304.

Figure 15:
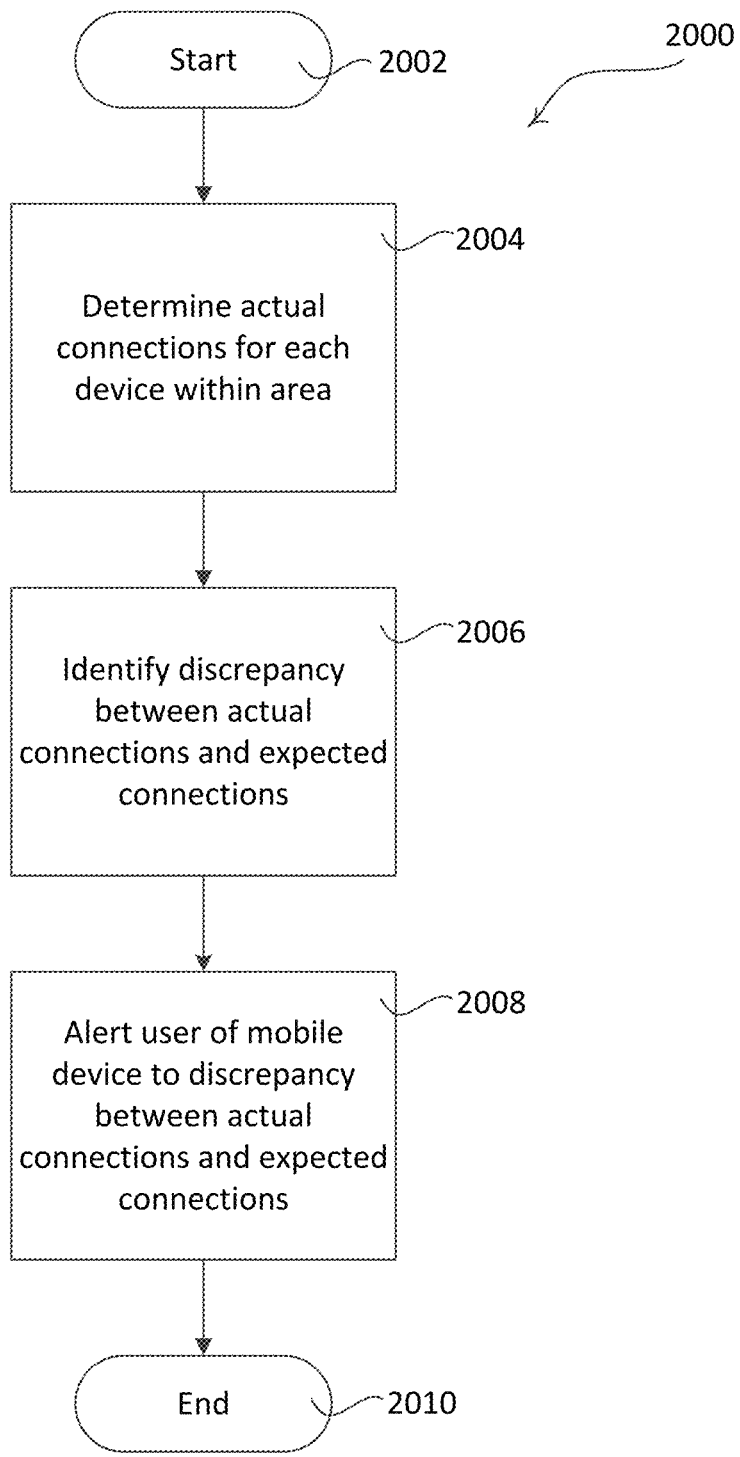
FIG. 15 is a flow diagram depicting an example method for identifying and troubleshooting a control device.

FIG. 15 is a flow diagram depicting an example method 2000 for identifying and troubleshooting a control device (e.g., a lighting control device configured to control a lighting load of a lighting fixture). The method 2000 may be performed after the control device has been installed and/or commissioned. The method 2000 may be performed on a programming device, such as a mobile device (e.g., the mobile device 124 and/or the autonomous mobile devices 126, 128), or distributed across multiple programming devices, such as a mobile device, a system controller, and/or another device. For example, one or more portions of the method 2000 may be performed at a system controller that may provide information and/or a user interface to the mobile device for troubleshooting (e.g., via a browser or other application running on the mobile device).

The method 2000 may be performed when a control device (e.g., a lighting fixture, lighting control device, load control device, or control-target device) is determined to be functioning improperly (e.g., the control device is malfunctioning). For example, a lighting control device controlling a lighting fixture may be functioning improperly. The control device may fail to respond to commands sent from a system controller or a control-target device (e.g., via the system controller), may fail to respond to the commands after a delay, and/or may cause the lighting fixture to blink or turn on or off without input from a user. For example, a lighting fixture may fail to change in intensity when a button of a remote control device is activated.

The mobile device, a user of the mobile device, the system controller, and/or the control device may determine that the lighting fixture is functioning improperly. The user may determine that the control device is functioning improperly by viewing the control device. For example, the user may perceive that a motorized window treatment is failing to respond to commands or that a lighting fixture is blinking, flashing, failing to respond to commands, or otherwise functioning improperly. The user may send a command to the control device (e.g., via the system controller and/or the mobile device), and may determine that the control device is functioning improperly based on the control device's response to the command. The system controller and/or the mobile device may determine that the control device is functioning improperly if, for example, the control device fails to respond to one or more commands. The control device may determine that it is functioning improperly if, for example, the control device fails to receive commands from the system controller or receives contradictory commands. The determination that the control device is functioning improperly may be made during testing of the control device (e.g., following installation and/or commissioning), and/or during normal operation of the control device.

The method 2000 may start at 2002. The method 2000 may be initiated by the user. For example, the user may press a button or otherwise indicate on the mobile device that a control device is functioning improperly. At 2004, the mobile device may determine connections for each control device (e.g., each lighting control device, lighting fixture, control-target device, and/or load control device) within a given area. For example, the area may be a room in which one or more control devices are functioning improperly. A load control device (e.g., a control-target device) may be, for example, a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or other load control device.

Each control device (e.g., each lighting control device, lighting fixture, control-target device, and/or load control device) within the area may be connected to (e.g., associated with or linked to) one or more other control devices within the area. For example, a first lighting fixture may be connected to a lighting control device and a second lighting fixture. The second fixture may be connected to the first lighting fixture and the lighting control device (e.g., via the first lighting fixture). The lighting control device may control the intensity of the first lighting fixture and/or the second lighting fixture. For example, an occupant of the area may adjust the intensity of the first lighting fixture and the second lighting fixture by actuating a raise button and/or a lower button on a remote control device.

The mobile device may determine the actual connections between the control devices based on actual connection data. The mobile device may determine the actual connections prior to beginning troubleshooting. For example, the mobile device may determine the actual connections based on input from the user during installation of the control devices. For example, at installation of each control device, the mobile device may prompt the user to enter other control devices that are connected to the control device. The mobile device may prompt the user to enter one or more connections (e.g., associations) between the control devices after installation but prior to commissioning of the control devices. The mobile device may store the connections locally or at a remote server.

The mobile device may determine the actual connections based on information received from the control devices.

Each control device may send, to the mobile device, information about the control device's connections to other control devices. The mobile device may receive information from a control device via VLC signals (e.g., LiFi) and/or by RF signals (e.g., WI-FI®, BLUETOOTH®, near field communication (NFC), ZIGBEE®, or CLEAR CONNECT™). The information about the control device's connections may include one or more unique identifiers, associations, and/or the like. For example, a control device may send a unique identifier that identifies the control device to the mobile device, in addition to an indication that the control device is connected to a second control device within the area. The mobile device may retrieve previously-stored associations from local memory or the remote server prior to beginning troubleshooting and/or during troubleshooting.

Each control device may send, to the mobile device, a unique identifier of each control device to which the given control device is connected. For example, for a given control device, the mobile device may receive a unique identifier that identifies the control device. For example, a lighting fixture may be connected to load control device. The load control device may send (e.g., via the lighting fixture that the load control device is controlling) its unique identifier to the mobile device. The mobile device may receive the unique identifiers simultaneously or in a given order.

The actual connections may include direct connections and/or indirect connections. For example, a first lighting fixture may be directly connected to a second lighting fixture. The second lighting fixture may be connected to a third lighting fixture. Each control device may send, to the mobile device, information about the control device's direct connections and/or indirect connections. The actual connections for a control device may be determined by sending the control device a command (e.g., via a system controller) and measuring a response of the control device and/or other control devices to the command. For example, the mobile device may send a command to a load control device to adjust the intensity of each lighting fixture connected to the load control device. It may be determined (e.g. by the mobile device) that each lighting fixture that adjusts in intensity in response to the command is connected to the load control device.

At 2006, one or more discrepancies between actual connections between two or more control devices and expected connections between the lighting fixtures and/or the control devices may be identified. For example, one or more expected connections may be missing, and/or one or more actual connections that do not have corresponding expected connections may be present. The mobile device may determine the expected connections between the control devices based on a floor plan. The floor plan lighting control device may include one or more floor plan floor plan control devices (e.g., floor plan lighting fixtures, floor plan lighting control devices, and/or floor plan lighting control devices), each of which may correspond to a control device in the given area. The floor plan may include floor plan data. The floor plan data may include information about connections between two or more floor plan control devices in the area. For example, the floor plan data may include information that indicates that a first floor plan lighting fixture is connected to a floor plan lighting control device and a floor plan second lighting fixture. The floor plan data may include information about the function of each control device. For example, the floor plan data may indicate whether a given lighting fixture is used for accent lighting, ambient lighting, and/or the like. The floor plan data may indicate whether a lighting fixture is dimmable, whether the lighting fixture is a low-end intensity (e.g., the lighting fixture is a 1% lighting fixture), the color-changing ability of the lighting fixture (e.g., full color adjustment and/or color temperature control), any control devices (e.g., occupancy sensors, daylight sensors, remote controls, and/or the like) that are controlling the lighting fixture, and/or whether the lighting fixture is an emergency fixture (e.g., whether the lighting fixture will remain on if power to the building is lost). The floor plan data may indicate the type of communication line for a connection (e.g., Ecosystem link, DALI link, 0-10V control, PWM control), and/or whether the connection is a wired or wireless link.

For example, an area may include first, second, third, and fourth lighting fixtures and first and second remote control devices. The mobile device may determine (e.g., as described herein) that the first, second, and third lighting fixtures are connected (e.g., linked or associated) to the first remote control device. The mobile device may determine that the fourth lighting fixture is connected (e.g., linked or associated) to the second remote control device. Each lighting fixture and remote control device may correspond to a floor plan lighting fixture or remote control device, respectively. The mobile device may determine that the actual connections (e.g., the connections between the lighting fixtures and the remote control device) do not correspond to the expected connections (e.g., the connections between the floor plan lighting fixtures and the floor plan remote control devices). For example, the mobile device may determine that the first and second floor plan lighting fixtures are connected to the first floor plan remote control device. The mobile device may determine that the third and fourth floor plan lighting fixtures are connected to the second floor plan remote control device. The mobile device may therefore determine that one expected connection (e.g., the connection between the third floor plan lighting fixture and the second floor plan remote control device) is missing, and that there is an actual connection that is not present in the expected connections (e.g., the connection between the third lighting fixture and the first remote control device is incorrect).

At 2008, the user may be alerted to the discrepancy between the actual connections and the expected connections. The user may be alerted by the mobile device, the system controller, a control device (e.g., a lighting control device), a separate programming device, or some combination thereof. For example, a lighting control device may cause a corresponding lighting fixture to blink in a predetermined pattern to alert the user. The lighting control device and/or the system controller may send a digital message to the mobile device. The mobile device may (e.g., upon receipt of the digital message) send a notification to the user. The mobile device may send the notification to the user by, for example, vibrating, flashing or blinking a light, displaying text on the screen, playing a sound, and/or the like. The mobile device, system controller, and/or the lighting control device may alert the user by sending a digital message to a separate programming device, which may then send a notification to the user. For example, the system controller may send an email to the user informing the user of the discrepancy. The notification may include, for example, the unique identifier of the improperly-functioning control device, the expected connections and/or actual connections for the improperly-functioning control device, unique identifiers of control devices to which the improperly-functioning control device is connected, and/or unique identifiers of control devices that the improperly-functioning control device is expected to be connected to. The mobile device may prompt the user to acknowledge the alert. The method 2000 may end at 2012.

Figure 16:
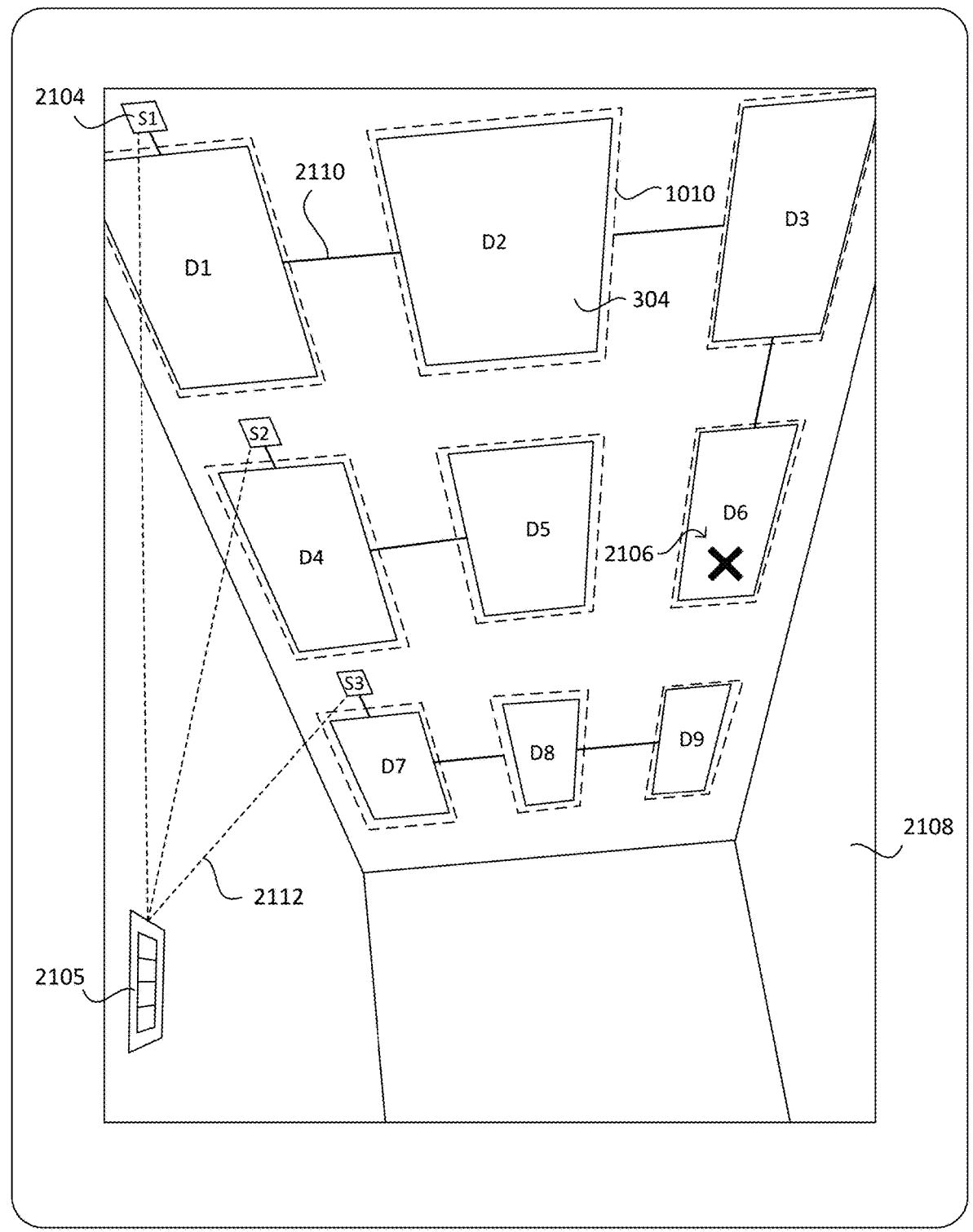
FIG. 16 depicts a representative image of an example user interface that may be displayed on a mobile device to troubleshoot one or more control devices that are functioning improperly.

FIG. 16 depicts a representative image 2108 that may be displayed on a mobile device to troubleshoot one or more control devices (e.g., lighting fixtures, lighting control devices, and/or load control devices) that are functioning improperly. The image 2108 may represent a frame of a video generated by the mobile device, for example. The image 2108 may display one or more control devices within a location and/or information associated with the control devices. For example, the image 2108 may display lighting fixture 304, outline 1010 identifying the lighting fixture 304, lighting control device 2104, remote control device 2105, floor plan identifier D2 identifying lighting fixture 304, and floor plan identifier S2 identifying lighting control device 2104. The image 2108 may display floor plan identifiers D1, D3-D9, S1, and/or S3. The mobile device may overlay an outline surrounding each control device and/or a floor plan identifier for each control device onto image 2108. Outline 1010 may be overlaid onto lighting fixture 304 in the image 2108 by the mobile device. Floor plan identifiers D2 and S2 may be overlaid onto lighting fixture 304 and load control device 2104, respectively, in the image 2108 by the mobile device.

The mobile device may overlay one or more objects (e.g., lines, arrows, symbols, etc.) onto an image (e.g., the image 2108). The overlaid objects may be "pinned" to the image such that the objects maintain their position relative to the control devices within the image as the mobile device moves. The mobile device may determine to overlay the objects onto the image based on the location/orientation of the mobile device and/or floor plan data accessible to the mobile device. The floor plan data may indicate information about one or more floor plan control devices. For example, the floor plan data may indicate a location, floor plan identifier, unique identifier, function, type, and/or the like for each floor plan control device.

The mobile device may determine its location and/or orientation as described herein. The mobile device may be located within an area (e.g., a room of a building). The mobile device may view the area, for example using an internal camera of the mobile device, and may generate an image of the area (e.g., the image 2108). The mobile device may identify that one or more control devices are present within the image, for example using an imaging analysis. The mobile device may determine an approximate location (e.g., absolute or relative to the mobile device) of each control device in the image using one or more techniques described herein.

The mobile device may identify the control devices in the image based on the floor plan data. For example, the floor plan data may include a corresponding floor plan control device for each control device present in the area in which the mobile device is located. The floor plan data may indicate a location (e.g., a relative location and/or an absolute location) for each floor plan control device. The mobile device may identify a control device based on the mobile device's location/orientation and/or the floor plan data. The mobile device may determine that a floor plan control device is indicated as being at a location that is within a threshold distance of the location of a given control device within the image. For example, the mobile device may determine that the floor plan control device indicated as being at the same location as the given control device. The mobile device may determine that the given control device corresponds to the floor plan control device. After the mobile device has identified a control device, the mobile device may overlay information from the floor plan data (e.g., an outline and/or floor plan identifier) onto each control device in the image.

The image 2108 may be displayed on the mobile device after lighting fixtures D1-D9 have been commissioned. The lighting fixtures D1-D9 may be commissioned as described herein. The image 2108 may be displayed on the mobile device after it has been determined that one or more of the control devices is functioning improperly. A user of the mobile device may indicate that a control device is functioning improperly (e.g., by selecting the improperly-functioning control device on the display of the mobile device). The mobile device, another control device, a system controller, and/or any other programming device may detect that the control device is functioning improperly.

For example, a lighting fixture (e.g., a lighting control device controlling one or more lighting fixtures) may fail to respond to commands sent from a remote control device 2105 (e.g., via a system controller). The remote control device 2105 may send a command (e.g., based on input from the user) for the lighting fixture to decrease in intensity level by 10%. The mobile device and/or a sensor may determine that the lighting fixture failed to respond to the command by viewing the lighting fixture both before and after the command was sent, and determining that the intensity of the lighting fixture did not change. The lighting control device and/or the system controller may determine that the lighting fixture failed to respond to the command if the dimmer switch and/or system controller failed to receive a response to the command from the lighting fixture. The lighting control devices may each cause the lighting fixtures that they are controlling to transmit the unique identifier of the load control device (e.g., via VLC). If the mobile device sees a unique identifier from one of the lighting fixtures that is not expected (e.g., a discrepancy with the floor plan data), the mobile device may determine that one of the lighting fixtures is wired to the wrong lighting control device.

The mobile device may alert the user of the improperly functioning control device by, for example, vibrating, flashing or blinking a light, displaying text on a display screen, playing a sound, and/or the like. The mobile device may overlay a symbol 2106 onto the improperly-functioning control device in the image 2108. Symbol 2106 may indicate that the control device is functioning improperly.

The image 2108 may be displayed on the mobile device after actual connections for each control device within the image 2108 have been determined (e.g., at 2104 of FIG. 15). The mobile device may receive information about the actual connections from the user, the system controller, and/or the control devices. For example, the mobile device may prompt the user to enter connections between the control devices during installation and/or commissioning of the control devices. The mobile device may receive one or more unique identifiers from each of the control devices, for example via VLC signals (e.g., LiFi) and/or by RF signals. For example, each control device may send its own unique identifier to the mobile device in addition to unique identifiers for each other control device that is connected to the control device.

The mobile device may overlay a representation for each actual connection in the image 2108. For example, the image 2108 may display one or more lines 2110, 2112, with each line representing a connection between two control devices. For example, lines 2110 may represent physical wiring connection between the lighting control devices 2104 and the lighting fixtures 304, and the lines 2112 may represent communication and/or programming links (e.g., associations) between the remote control device 2105 and the lighting control devices 2104. Each line 2112 may represent a wired and/or wireless connection or link (e.g., association). The mobile device may retrieve the connections from local memory and/or from a remote server. The mobile device may overlay the connections onto the image 2108 so that the user can see the connections of the improperly-functioning control device as well as other control devices in the location. The overlaid connections may be "pinned" to the image 2108 such that the overlaid connections maintain their position relative to the control devices within the image 2108 as the mobile device moves.

Figure 17:
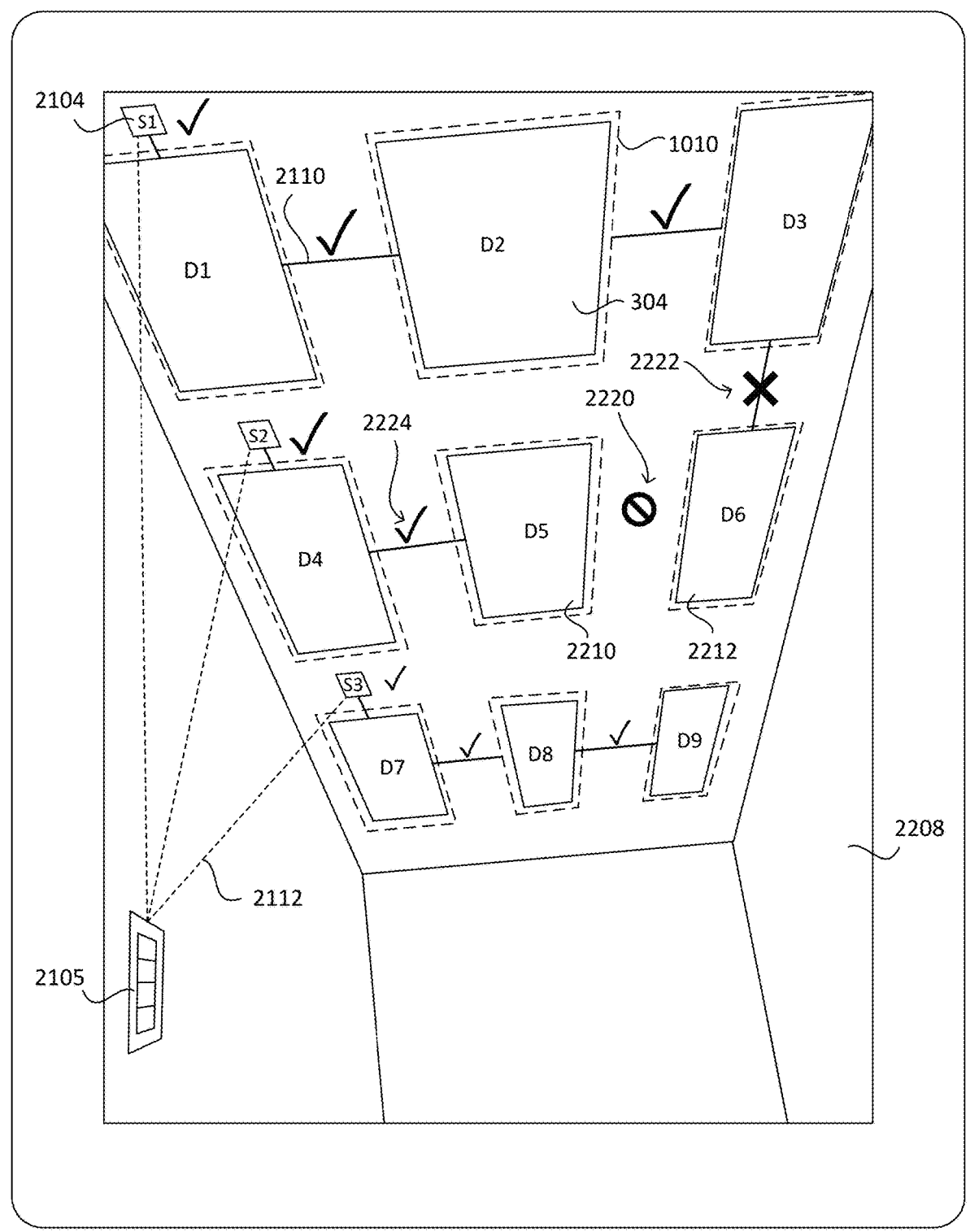
FIG. 17 depicts a representative image of an example user interface that may be displayed on a mobile device to identify one or more discrepancies between connections for control devices.

FIG. 17 depicts a representative image 2208 that may be displayed on a mobile device to identify one or more discrepancies between actual connections and expected connections for control devices (e.g., at 2006 of the method 2000 of FIG. 15). The image 2208 may represent a frame of a video generated by the mobile device, for example. The image 2208 may display one or more control devices within a location and/or information associated with the control devices. For example, the image 2208 may display lighting fixture 304, outline 1010 identifying the lighting fixture 304, lighting control device 2104, remote control device 2105, floor plan identifier D2 identifying lighting fixture 304, and/or floor plan identifier S2 identifying lighting control device 2104. The mobile device may overlay an outline surrounding each control device and/or a floor plan identifier for each control device onto image 2208. Outline 1010 may be overlaid onto lighting fixture 304 in the image 2208 by the mobile device. Floor plan identifiers D2 and S2 may be overlaid onto lighting fixture 304 and lighting control device 2104, respectively, in the image 2208 by the mobile device.

The mobile device may overlay one or more objects (e.g., lines, arrows, symbols, etc.) onto an image (e.g., the image 2208). The overlaid objects may be "pinned" to the image such that the objects maintain their position relative to the control devices within the image as the mobile device moves. The mobile device may determine to overlay the objects onto the image based on the location/orientation of the mobile device and/or floor plan data accessible to the mobile device. The floor plan data may indicate information about one or more floor plan control devices. For example, the floor plan data may indicate a location, floor plan identifier, unique identifier, function, type, and/or the like for each floor plan control device.

The mobile device may determine its location and/or orientation as described herein. The mobile device may be located within an area (e.g., a room of a building). The mobile device may view the area, for example using an internal camera of the mobile device, and may generate an image of the area (e.g., the image 2208). The mobile device may identify that one or more control devices are present within the image, for example using an imaging analysis. The mobile device may determine an approximate location (e.g., absolute or relative to the mobile device) of each control device in the image using one or more techniques described herein.

The mobile device may identify the control devices in the image based on the floor plan data. For example, the floor plan data may include a corresponding floor plan control device for each control device present in the area in which the mobile device is located. The floor plan data may indicate a location (e.g., a relative location and/or an absolute location) for each floor plan control device. The mobile device may identify a control device based on the mobile device's location/orientation and/or the floor plan data. The mobile device may determine that a floor plan control device is indicated as being at a location that is within a threshold distance of the location of a given control device within the image. For example, the mobile device may determine that the floor plan control device indicated as being at the same location as the given control device. The mobile device may determine that the given control device corresponds to the floor plan control device. After the mobile device has identified a control device, the mobile device may overlay information from the floor plan data (e.g., an outline and/or floor plan identifier) onto each control device in the image.

The mobile device may identify the discrepancies by comparing the actual connections between the control devices to the expected connections for the control devices. The mobile device may determine the expected connections for the control devices based on user input. For example, upon detecting that a control device is functioning improperly the mobile device may prompt the user to enter (e.g., draw) expected connections between the control devices. The mobile device may determine the expected connections for the control devices based on floor plan data accessible to the mobile device. For example, the floor plan data may indicate one or more connections between floor plan control devices corresponding to the control devices. The floor plan data may be stored on local memory and/or at a remote server. The floor plan data may indicate the connections by including, for a given floor plan control device, a list of floor plan control devices to which the given floor plan control device is connected. For example, the floor plan data may include information about each floor plan control device (e.g., location, function, type, unique identifier, etc.) The information about each floor plan control device may include the unique identifiers of other floor plan control devices to which the floor plan control device is connected. The floor plan data may include a list (e.g., a table) of connections (e.g., associations) between two or more floor plan control devices.

The mobile device may determine that a discrepancy exists when an expected connection is not present in the actual connections (e.g., there is a missing connection), and/or when an actual connection exists that is not present in the expected connections (e.g., there is an extra connection). For example, as shown in FIG. 17, the image 2208 may include lighting fixture 2210 and lighting fixture 2212. Lighting fixture 2210 and lighting fixture 2212 may correspond to floor plan lighting fixtures in the floor plan data having the floor plan identifiers D5 and D6, respectively. The mobile device may determine that the lighting control device 2204 (e.g., which may correspond to a floor plan dimmer switch having the floor plan identifier S1) is connected to the lighting fixture 2210 and the lighting control device 2204 (e.g., which may correspond to a floor plan dimmer switch having the floor plan identifier S2) is connected to the lighting fixture 2212. The mobile device may determine that the floor plan lighting control device S1 is connected to both of the floor plan lighting fixtures D5, D6. The mobile device may also determine that the floor plan lighting control device S1 is not connected to the floor plan lighting fixture D6. The mobile device may therefore determine that two discrepancies exist (e.g., the extra actual connection between the lighting control device S1 and the lighting fixture D6, and the missing actual connection between the lighting control device S2 and the lighting fixture D6).

The image 2208 may include a representation of each actual connection between the control devices. The mobile device may overlay a line representing a connection for each actual connection onto the image 2208. For example, as shown in FIG. 17, mobile device may represent each actual connection as an overlaid line between two control devices onto the image 2208. The mobile device may determine where to locate each overlaid representation onto the image 2208. For example, the mobile device may determine the borders and/or the center of each control device within the image 2208 based on an image analysis. For each control device in the image 2208, the mobile device may overlay an outline (e.g., outline 1010) surrounding the control device. The mobile device may determine the relative locations of two connected control devices based on the borders and/or centers of those control devices. The mobile device may determine the two points (e.g., one for each control device) where the distance between the borders of the connected control devices is shortest. The mobile device may overlay a representation of a connection between two control devices at the center of a line connecting the two points on the borders of the control devices, along a line connecting the two points on the borders, and/or at each of the two points on the borders. The mobile device may overlay a representation of a connection between at the center of a line connecting the two centers of the control devices, along a line connecting the two centers, and/or at each of the two centers. An overlaid line representing a connection between two control devices may be straight or may have one or more angles/curves. For example, if a third control device is located between the two connected control devices, the line may be located such that it goes around the third control device. An overlaid line representing a connection between two control devices may be angled such that it follows a wall, ceiling, or other physical feature of the location of the mobile device.

The image 2208 may indicate the discrepancies on the display of the mobile device. The mobile device may indicate a discrepancy by overlaying one or more symbols onto image 2208. The mobile device may indicate a missing connection between two or more control devices by overlaying a symbol 2220 (e.g., a warning symbol) or other indicator. For example, as shown in FIG. 17, the mobile device may overlay the symbol 2220 onto the missing connection between the lighting fixture 2212 and the lighting control device 2104 (e.g., which may correspond to a floor plan dimmer switch having the floor plan identifier S2) in the image 2208. The mobile device may indicate an extra connection between two or more control devices by overlaying a symbol 2222 (e.g., an X symbol) or other indicator. For example, as shown in FIG. 17, the mobile device may overlay the symbol 2222 onto the extra connection between the lighting fixture 2212 and the lighting control device 2104 (e.g., which may correspond to a floor plan dimmer switch having the floor plan identifier S1) in the image 2208. The symbols indicating an extra and/or missing connections may each be, for example, a no symbol, a letter (e.g., X), a number, a given color (e.g., red), and/or any other symbol or indicator that indicates that there is an extra and/or missing connection. The image 2208 may also indicate one or more actual connections that correspond to correct expected connections. For example, as shown in FIG. 17, the mobile device may overlay a symbol 2224 (e.g., checkmark) or other indicator on or near each actual connection displayed in the image 2208 that corresponds to an expected connection (e.g., each matching connection). For example, a symbol indicating a matching connection may be a checkmark, a letter, a number, a given color (e.g., green), and/or any other symbol or indicator that indicates that the actual connection corresponds to a correct expected connection.

The mobile device may determine a location at which to overlay a symbol indicating an extra/missing connection or a symbol indicating a matching connection. The mobile device may determine a location to overlay a representation of an actual connection as described herein. The mobile device may determine to overlay a symbol at the center of a line representing a connection between two control devices. The mobile device may overlay the symbol above, below, left of, and/or right of the line. For a missing connection between two control devices, the mobile device may determine the locations of the centers and/or borders of the two control devices as described herein. The mobile device may overlay the symbol indicating the missing connection at the center of a line connecting the two centers/borders.

Figure 18:
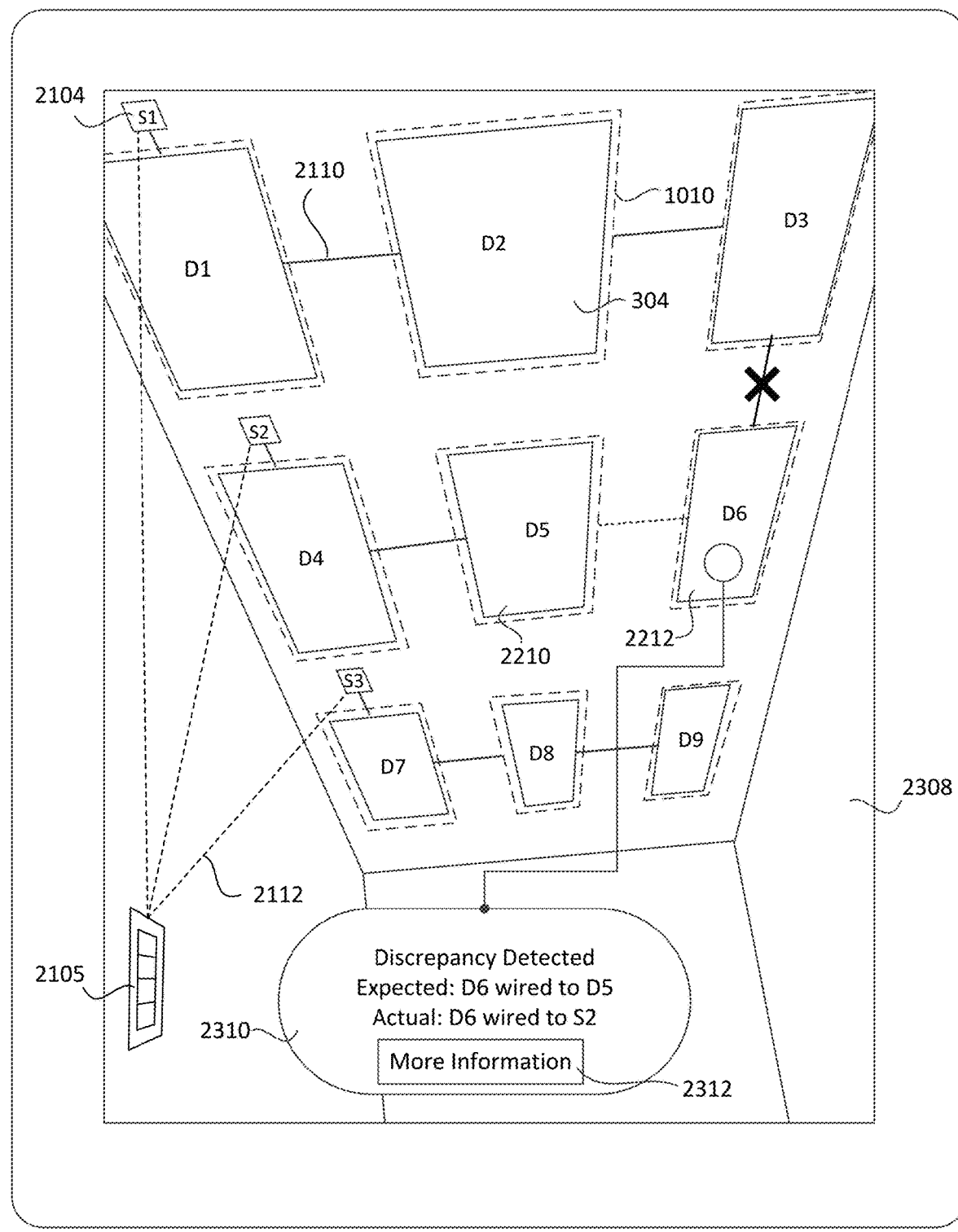
FIG. 18 depicts a representative image of an example user interface that may be displayed on a mobile device to alert a user to one or more discrepancies between connections for control devices.

FIG. 18 depicts a representative image 2308 that may be displayed on a mobile device to alert a user to one or more discrepancies between actual connections and expected connections for control devices (e.g., at 2008 of the method 2000 of FIG. 15). The image 2308 may represent a frame of a video generated by the mobile device, for example. The image 2308 may display one or more control devices within a location and/or information associated with the control devices. For example, the image 2308 may display lighting fixture 304, outline 1010 identifying the lighting fixture 304, lighting control device 2104, remote control device 2105, floor plan identifier D2 identifying lighting fixture 304, and floor plan identifier S2 identifying lighting control device 2104. Outline 1010 may be overlaid onto lighting fixture 304 in the image 2208 by the mobile device. Floor plan identifiers D2 and S2 may be overlaid onto lighting fixture 304 and lighting control device 2104, respectively, in the image 2308 by the mobile device.

The mobile device may overlay one or more objects (e.g., lines, arrows, symbols, etc.) onto an image (e.g., the image 2308). The overlaid objects may be "pinned" to the image such that the objects maintain their position relative to the control devices within the image as the mobile device moves. The mobile device may determine to overlay the objects onto the image based on the location/orientation of the mobile device and/or floor plan data accessible to the mobile device. The floor plan data may indicate information about one or more floor plan control devices. For example, the floor plan data may indicate a location, floor plan identifier, unique identifier, function, type, and/or the like for each floor plan control device.

The mobile device may determine its location and/or orientation as described herein. The mobile device may be located within an area (e.g., a room of a building). The mobile device may view the area, for example using an internal camera of the mobile device, and may generate an image of the area (e.g., the image 2308). The mobile device may identify that one or more control devices are present within the image, for example using an imaging analysis. The mobile device may determine an approximate location (e.g., absolute or relative to the mobile device) of each control device in the image using one or more techniques described herein.

The mobile device may identify the control devices in the image based on the floor plan data. For example, the floor plan data may include a corresponding floor plan control device for each control device present in the area in which the mobile device is located. The floor plan data may indicate a location (e.g., a relative location and/or an absolute location) for each floor plan control device. The mobile device may identify a control device based on the mobile device's location/orientation and/or the floor plan data. The mobile device may determine that a floor plan control device is indicated as being at a location that is within a threshold distance of the location of a given control device within the image. For example, the mobile device may determine that the floor plan control device indicated as being at the same location as the given control device. The mobile device may determine that the given control device corresponds to the floor plan control device. After the mobile device has identified a control device, the mobile device may overlay information from the floor plan data (e.g., an outline and/or floor plan identifier) onto each control device in the image.

The mobile device may alert the user by displaying a popup window 2310. The popup window 2310 may display information about the discrepancies identified by the mobile device. For example, as shown in FIG. 18, the popup window may display information about a missing connection, incorrect connection, and/or an extra connection. The popup window 2310 may include a button 2312. When the button 2312 is actuated by the user, the mobile device may display more information about the discrepancies. The information may include, for example, the floor plan data, the expected connections, the actual connections, instructions on how to resolve the discrepancy, and/or any other information regarding the actual and expected connections.

The image 2308 may include a representation of each extra connection, incorrect connection, and/or missing connection. Each extra connection, incorrect connection, and/or missing connection may be represented by, for example, a line between the identified devices between which there is determined to be an extra connection, an incorrect connection, and/or a missing connection. A representation of an extra connection, an incorrect connection, and/or a missing connection may be different from a representation of a matching connection. For example, as shown in FIG. 18, each matching connection may be represented by a solid line between two devices, while each an extra connection, an incorrect connection, and/or a missing connection may be represented by a dotted line between two devices. Extra connections may be represented differently from missing connections. For example, as shown in FIG. 18, the missing connection between lighting fixture 2210 and lighting fixture 2212 may be represented as a dotted line, while the extra connection between lighting fixture 2212 and dimmer switch 2104 may be represented as a dotted line with an X.

The mobile device may determine a location at which to overlay a symbol indicating an extra/missing connection or a symbol indicating a matching connection. The mobile device may determine a location to overlay a representation of an actual connection as described herein. For example, each actual connection between two control devices may be represented as a line between the control devices. The mobile device may represent extra/missing connections differently from matching connections. For example, the mobile device may modify the line representing an extra connection such that the line is dotted (e.g., instead of solid). The mobile device may overlay a symbol (e.g., an X as shown in FIG. 18) onto the representation of the extra connection. The mobile device may determine a location to overlay the symbol as described herein. The mobile device may represent a missing connection as a dotted line. The mobile device may determine a location to overlay the dotted line as described herein.

Figure 19:
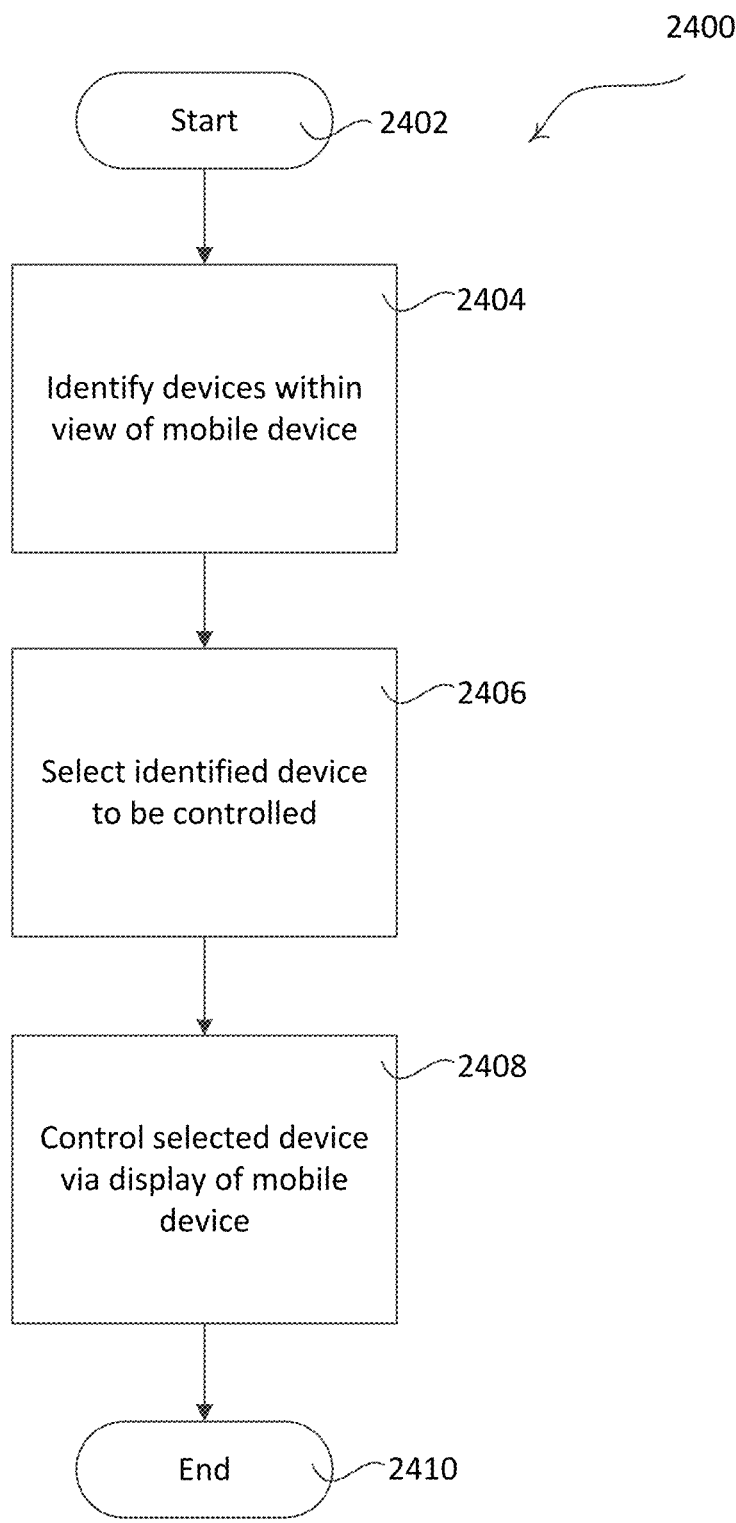
FIG. 19 is a flow diagram depicting an example method for controlling a control device via a mobile device.

FIG. 19 is a flow diagram depicting an example method 2400 for controlling a control device via a mobile device. The method 2400 may be performed after the control device has been installed and/or commissioned. The method 2400 may be performed on a mobile device (e.g., the mobile device 124 and/or the autonomous mobile devices 126, 128), or distributed across multiple programming devices, such as a mobile device, a system controller, control devices, and/or other devices. For example, one or more portions of the method 2400 may be performed at a system controller that may provide information and/or a user interface to the mobile device (e.g., via a browser or other application running on the mobile device) and/or a control device for enabling control of an electrical load.

The method 2400 may be performed when a user of the mobile device determines to control one or more control devices within a given area. The area may be, for example, a room of a building. A control device may be, for example, a lighting fixture, a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or another control device. The method 2400 may be performed simultaneously for multiple control devices or in sequential order. For example, the user may control the intensity of multiple lighting fixtures at the same time.

The method 2400 may begin at 2402. At 2404, the mobile device may identify one or more control devices within view of the mobile device. For example, the mobile device may have an internal camera, and may identify each device within view of the internal camera. The mobile device may display an image including the control devices on a display of the mobile device. The mobile device may identify the control devices based on input from the user. The mobile device may prompt the user to enter a location and/or establish an orientation of the mobile device, as described herein.

The mobile device may have access to a floor plan that includes floor plan data. The floor plan data may include information regarding the location of each control device. The mobile device may use the floor plan data to identify the control devices in the area. The floor plan data may include information about one or more floor plan control devices, each corresponding to a control device in the area in which the mobile device is located. For example, the floor plan data may include a location, function, unique identifier, floor plan identifier, or type for each floor plan control device. The floor plan data may indicate connections between two or more floor plan control devices. The mobile device may determine its location and orientation and determine which control devices are at the determined location using the floor plan data. The mobile device may identify the control devices in view of the mobile device based on the mobile device's orientation as described herein.

The mobile device may identify the control devices automatically (e.g., without input from the user). The mobile device may identify the control devices by determining a location and orientation of the mobile device (e.g., as described herein). For example, the mobile device may determine the location of the mobile device using a real-time locating system executed on the mobile device (e.g., GPS, triangulation, NFC, geolocation, etc.). The mobile device may determine the orientation of the mobile device using one or more of an internal compass, gyroscope, accelerometer, and/or any other sensor for detecting orientation on a mobile device. The mobile device may receive a unique identifier from each control device within the area (e.g., as described herein). For example, the unique identifiers may be communicated via RF signals and/or via VLC signals (e.g., LiFi). The RF signals may be, for example, a WI-FI® signal, a BLUETOOTH® signal, a near field communication (NFC) signal, a ZIGBEE® signal, a CLEAR CONNECT™ signal, Thread, or another RF signal. The mobile device may receive the unique identifiers from the control devices and determine the unique identifiers based on the received signals. The mobile device may determine a floor plan identifier for each control device based on the unique identifiers and the floor plan data. For example, the floor plan data may include, for each control device, an association between a unique identifier and a floor plan identifier. The mobile device may overlay the floor plan identifiers onto the respective control devices on the display of the mobile device. The mobile device may prompt the user to confirm that the displayed floor plan identifiers are correct.

At 2406, one or more of the identified control devices may be selected to be controlled. An individual control device, multiple control devices, a predetermined group of control devices, or each control device within the area may be selected. For example, in an area including multiple lighting fixtures, one lighting fixture, a subset of the lighting fixtures, or each lighting fixture within the area may be selected. The predetermined groups may be determined based on, for example, user input, type or function of a control device, location of the control device, and/or the like. For example, a first group may include each motorized treatment in a room, and a second group may contain each lighting fixture on the left side of the room. An indication of the control devices selected for control may be overlaid over the image and/or video of the control devices, such that the user may identify the selected devices. For example, the indicator may be a color, symbol, or other identifier that is overlaid on, or adjacent to, the selected control device(s).

One or more control devices may be selected based on user input. For example, the mobile device may prompt the user to select one or more control devices on the display of the mobile device. For example, the user may select one or more of the lighting fixtures or zones of lighting fixtures indicated as being recognized on the display of the mobile device (e.g., by the overlaid indicators identifying lighting fixtures. The mobile device may prompt a user to select one or more commands being overlaid on the display of the mobile device, and may select the control devices based on the commands. For example, the user may select an "Increase Intensity" command on the display of the mobile device, and the mobile device may select one or more lighting fixtures and/or motorized window treatments for control.

At 2408, the selected device may be controlled via the mobile device. The mobile device may prompt the user to select and/or enter a command based on the selected control device(s) by displaying commands and/or controls on the display. The mobile device may prompt the user to enter the command via a slider, a switch, a text box, and/or the like. The mobile device may display a popup window or other information on the display of the mobile device. The popup window may be overlaid over the image and/or video of the room being displayed from the camera of the mobile device. The user may enter a command into the popup window. For example, a temperature control device may be selected for controlling. The mobile device may display a popup window prompting the user to enter a temperature in the popup window. If multiple control devices are selected for control, the mobile device may display a single popup window or multiple popup windows (e.g., one for each selected control device). If a single popup window is displayed, the mobile device may prompt the user to enter a single command or multiple commands (e.g., one for each selected control device). For example, the user may select four lighting fixtures for controlling. The mobile device may display a single popup window and prompt the user to enter four commands (e.g., one for each of the four lighting fixtures) or one command (e.g., for each of the four lighting fixtures).

After the user has entered the command, the mobile device may send the command to the control device(s). The command may be sent as one or more digital messages (e.g., as a series of digital messages). The command may include an action to be performed by the control device(s), the unique identifier(s) of the control device(s), and/or any other information that may be used to control the control devices. The mobile device may send the command via, for example, an RF signal (e.g., a WI-FI® signal, a BLUETOOTH® signal, a near field communication (NFC) signal, a ZIG-BEE® signal, a CLEAR CONNECT™ signal, or another RF signal). The mobile device may send the command to the control device(s) directly and/or via a separate device (e.g., a system controller). The control device(s) may send a response message to the mobile device (e.g., via a system controller). The response message may include an acknowledgement and/or the status of the control device(s). The status of the control device(s) may be overlaid on top of the images and/or video being displayed from the camera to indicate the current status of the control device(s) in view. The method 2400 may end at 2410.

Figure 20:
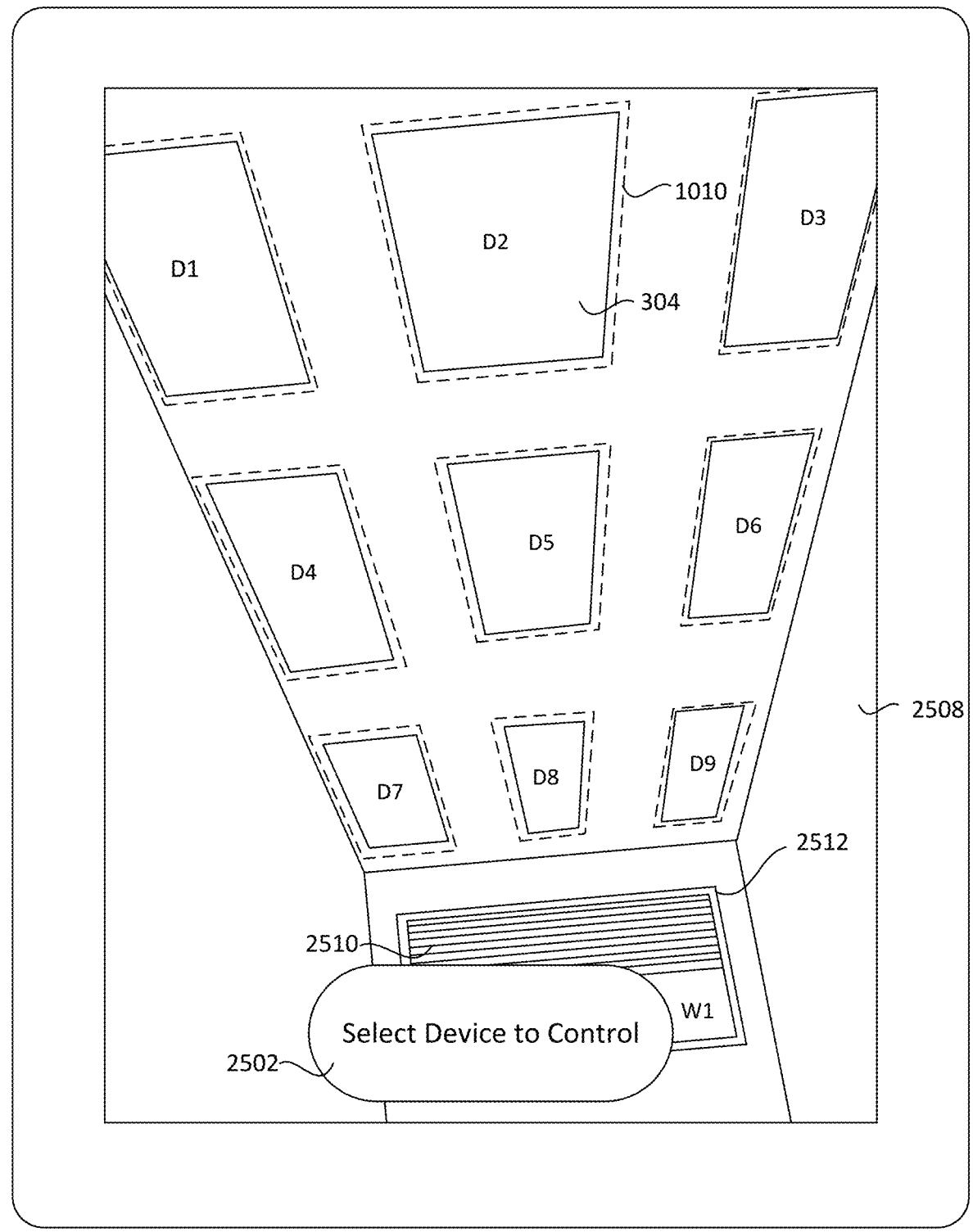
FIG. 20 depicts a representative image of an example user interface that may be displayed on a mobile device to identify one or more control devices and select a control device to be controlled.

FIG. 20 depicts a representative image 2508 of an example user interface that may be displayed on a mobile device to identify one or more control devices and select a control device to be controlled. The image 2508 may represent a frame of a video generated by the mobile device, for example. The image 2508 may display one or more control devices within a location and/or information associated with the control devices. For example, the image 2508 may display lighting fixture 304, outline 1010 identifying the lighting fixture 304, motorized window treatment 2510, outline 2512 identifying the motorized window treatment 2510, floor plan identifier D2 identifying lighting fixture 304, and floor plan identifier W1 identifying motorized window treatment 2510. The mobile device may overlay an outline surrounding each control device and/or a floor plan identifier for each control device onto image 2508. Outlines 1010 and 2512 may be overlaid onto lighting fixture 304 and motorized window treatment 2510, respectively, in the image 2508 by the mobile device. Floor plan identifiers D2 and W1 may be overlaid onto lighting fixture 304, and motorized window treatment 2510, respectively, in the image 2208 by the mobile device.

The image 2508 may be an image of an area in which the mobile device is located. The mobile device may determine its location and/or orientation as described herein. The mobile device may identify the control devices in the area by, for example, prompting the user to enter identifying information, image analysis to recognize control devices similar to other images of predefined control devices, receiving unique identifiers from the control devices, and/or accessing floor plan data stored on local memory or at a remote server. For example, as shown in FIG. 20, the mobile device may identify lighting fixtures D1-D9 and motorized window treatment W1. The lighting fixtures D1-D9 and motorized window treatment W1 may be automatically identified via imaging analysis. The mobile device may overlay an outline and/or a floor plan identifier for each control device on the image 2508. The floor plan identifier may be overlaid based on the location of the identified device being determined to be at a similar location in a floor plan as is identified based on the location of the mobile device and the distance of the control devices from the location and/or orientation of the mobile device. For example, as shown in FIG. 20, the mobile device may overlay outline 1010 around lighting fixture 304, and may overlay floor plan identifier D2 onto lighting fixture 304. The mobile device may overlay an outline and/or a floor plan identifier for a group of control devices (e.g., that have a similar location, function, and/or type). For example, the mobile device may overlay an outline (not shown) surrounding lighting fixtures D1, D2, and D3. The mobile device may prompt the user of the mobile device to confirm that the overlaid outlines and/or floor plan identifiers are correct.

The mobile device may overlay one or more objects (e.g., lines, arrows, symbols, etc.) onto an image (e.g., the image 2508). The overlaid objects may be "pinned" to the image such that the objects maintain their position relative to the control devices within the image as the mobile device moves. The mobile device may determine to overlay the objects onto the image based on the location/orientation of the mobile device and/or floor plan data accessible to the mobile device. The floor plan data may indicate information about one or more floor plan control devices. For example, the floor plan data may indicate a location, floor plan identifier, unique identifier, function, type, and/or the like for each floor plan control device.

The mobile device may determine its location and/or orientation as described herein. The mobile device may be located within an area (e.g., a room of a building). The mobile device may view the area, for example using an internal camera of the mobile device, and may generate an image of the area (e.g., the image 2508). The mobile device may identify that one or more control devices are present within the image, for example using an imaging analysis. The mobile device may determine an approximate location (e.g., absolute or relative to the mobile device) of each control device in the image using one or more techniques described herein.

The mobile device may identify the control devices in the image based on the floor plan data. For example, the floor plan data may include a corresponding floor plan control device for each control device present in the area in which the mobile device is located. The floor plan data may indicate a location (e.g., a relative location and/or an absolute location) for each floor plan control device. The mobile device may identify a control device based on the mobile device's location/orientation and/or the floor plan data. The mobile device may determine that a floor plan control device is indicated as being at a location that is within a threshold distance of the location of a given control device within the image. For example, the mobile device may determine that the floor plan control device indicated as being at the same location as the given control device. The mobile device may determine that the given control device corresponds to the floor plan control device. After the mobile device has identified a control device, the mobile device may overlay information from the floor plan data (e.g., an outline and/or floor plan identifier) onto each control device in the image.

The mobile device may prompt the user to select one or more of the control devices for being controlled. For example, the mobile device may display button 2502. The user may press button 2502 to select a control device. The user may select the control device by, for example, pressing on the control device (e.g., within an outline around the control device) in the image 2508. For example, the user may select the button 2502, and then may select lighting fixture 304 by pressing in the area formed by the outline 1010 on the mobile device's display. The user may select a group of control devices by pressing on multiple control devices. The mobile device may prompt the user to confirm the selection. Once the user has selected a control device, the mobile device may change the image 2508 to indicate that the control device has been selected. For example, if the user selects the motorized window treatment 2510, the mobile device may fill in the area formed by outline 2512 in a given color.

Figure 21:
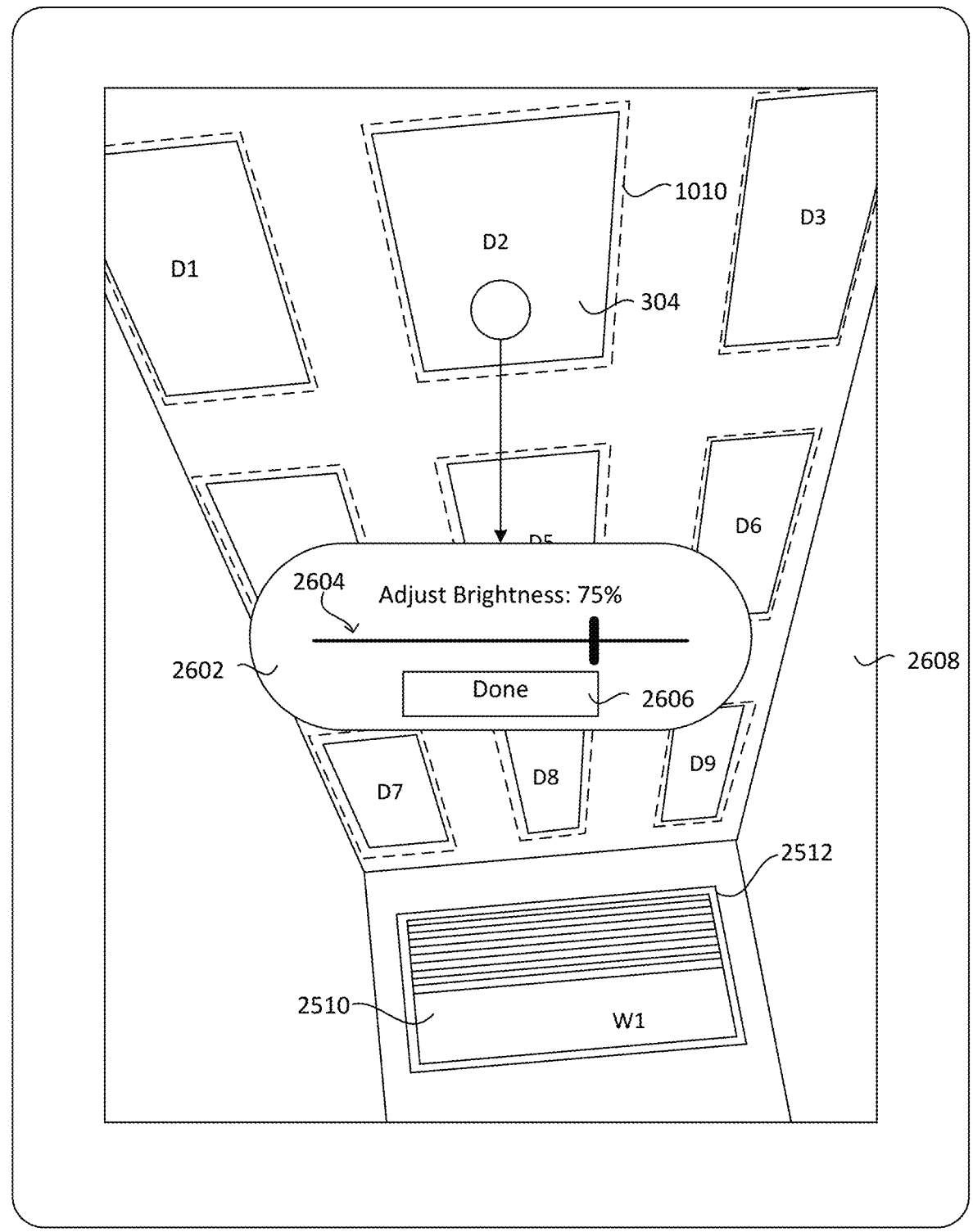
FIG. 21 depicts a representative image of an example user interface that may be displayed on a mobile device to control a lighting fixture via the mobile device.

FIG. 21 depicts a representative image 2608 of an example user interface that may be displayed on a mobile device to control a lighting fixture via the mobile device (e.g., at 2408 of the method 2400 of FIG. 19). The image 2608 may represent a frame of a video generated by the mobile device, for example. The image 2608 may display one or more control devices within a location and/or information associated with the control devices. For example, the image 2608 may display lighting fixture 304, outline 1010 identifying the lighting fixture 304, motorized window treatment 2510, outline 2512 identifying the motorized window treatment 2510, floor plan identifier D2 identifying lighting fixture 304, and floor plan identifier W1 identifying motorized window treatment 2510. The mobile device may overlay an outline surrounding each control device and/or a floor plan identifier for each control device onto image 2608. Outlines 1010 and 2512 may be overlaid onto lighting fixture 304 and motorized window treatment 2510, respectively, in the image 2208 by the mobile device. Floor plan identifiers D2 and W1 may be overlaid onto lighting fixture 304 and motorized window treatment 2510, respectively, in the image 2608 by the mobile device.

The mobile device may overlay one or more objects (e.g., lines, arrows, symbols, etc.) onto an image (e.g., the image 2608). The overlaid objects may be "pinned" to the image such that the objects maintain their position relative to the control devices within the image as the mobile device moves. The mobile device may determine to overlay the objects onto the image based on the location/orientation of the mobile device and/or floor plan data accessible to the mobile device. The floor plan data may indicate information about one or more floor plan control devices. For example, the floor plan data may indicate a location, floor plan identifier, unique identifier, function, type, and/or the like for each floor plan control device.

The mobile device may determine its location and/or orientation as described herein. The mobile device may be located within an area (e.g., a room of a building). The mobile device may view the area, for example using an internal camera of the mobile device, and may generate an image of the area (e.g., the image 2608). The mobile device may identify that one or more control devices are present within the image, for example using an imaging analysis. The mobile device may determine an approximate location (e.g., absolute or relative to the mobile device) of each control device in the image using one or more techniques described herein.

The mobile device may identify the control devices in the image based on the floor plan data. For example, the floor plan data may include a corresponding floor plan control device for each control device present in the area in which the mobile device is located. The floor plan data may indicate a location (e.g., a relative location and/or an absolute location) for each floor plan control device. The mobile device may identify a control device based on the mobile device's location/orientation and/or the floor plan data. The mobile device may determine that a floor plan control device is indicated as being at a location that is within a threshold distance of the location of a given control device within the image. For example, the mobile device may determine that the floor plan control device indicated as being at the same location as the given control device. The mobile device may determine that the given control device corresponds to the floor plan control device. After the mobile device has identified a control device, the mobile device may overlay information from the floor plan data (e.g., an outline and/or floor plan identifier) onto each control device in the image.

The image 2608 may be displayed after the user has selected one or more control devices for controlling. The mobile device may prompt the user to select one or more controls for the selected control devices. The controls may be specific to the selected devices. For example, as shown in FIG. 21, if the selected control device is a lighting fixture, the user may select the intensity level of the lighting fixture for control. The mobile device may display information about the selected control devices and/or the selected controls, for example in a popup window. For example, as shown in FIG. 21, the image 2608 may include popup window 2602 that overlays information about lighting fixture 304 on top of the image and/or video. The popup window may remain in the same location on the display of the mobile device as the mobile device is moved. For example, the popup window may move relative to the control devices in image 2608. The popup window 2602 may include a value associated with the selected control device and/or the selected control. For example, as shown in FIG. 21, the popup window 2602 may display the current intensity level for lighting fixture 304. The user may control the selected control device by entering information into the popup window 2602, for example by entering text into a text box, positioning an indicator on a slider, selecting a button, and/or the like.

As shown in FIG. 21, the popup window 2602 may include a slider control 2604. The slider control 2604 may include a line and/or an indicator (e.g., a slider handle or knob) crossing the line. The indicator may cross the line at a position that is related to the value associated with the control device. For example, the position of the indicator along the length of the line of the slider control 2604 may represent the intensity of lighting fixture 304. For example, the indicator may be positioned ¾ of the way along the length of the line of the slider control 2604 to represent that the lighting fixture 304 is at an intensity level of 75%. The user may control the lighting fixture 304 by adjusting the position of the indicator along the length of the line of the slider control 2604. For example, if the user wishes to decrease the intensity of the lighting fixture 304 to 50%, the user may move the indicator to the middle of the line of the slider control 2604. The mobile device may determine a command based on the input from the user and may send the command to the control device (e.g., as one or more digital messages). The mobile device may send the digital messages directly to the control device and/or via a separate programming device (e.g., a system controller). The popup window 2602 may include a button 2606 that, when pressed, removes the popup window 2602 from the display. The popup window 2602 may include a toggle button, an on button, an off button, a raise button, a lower button, and/or one or more preset buttons.

Figure 22:
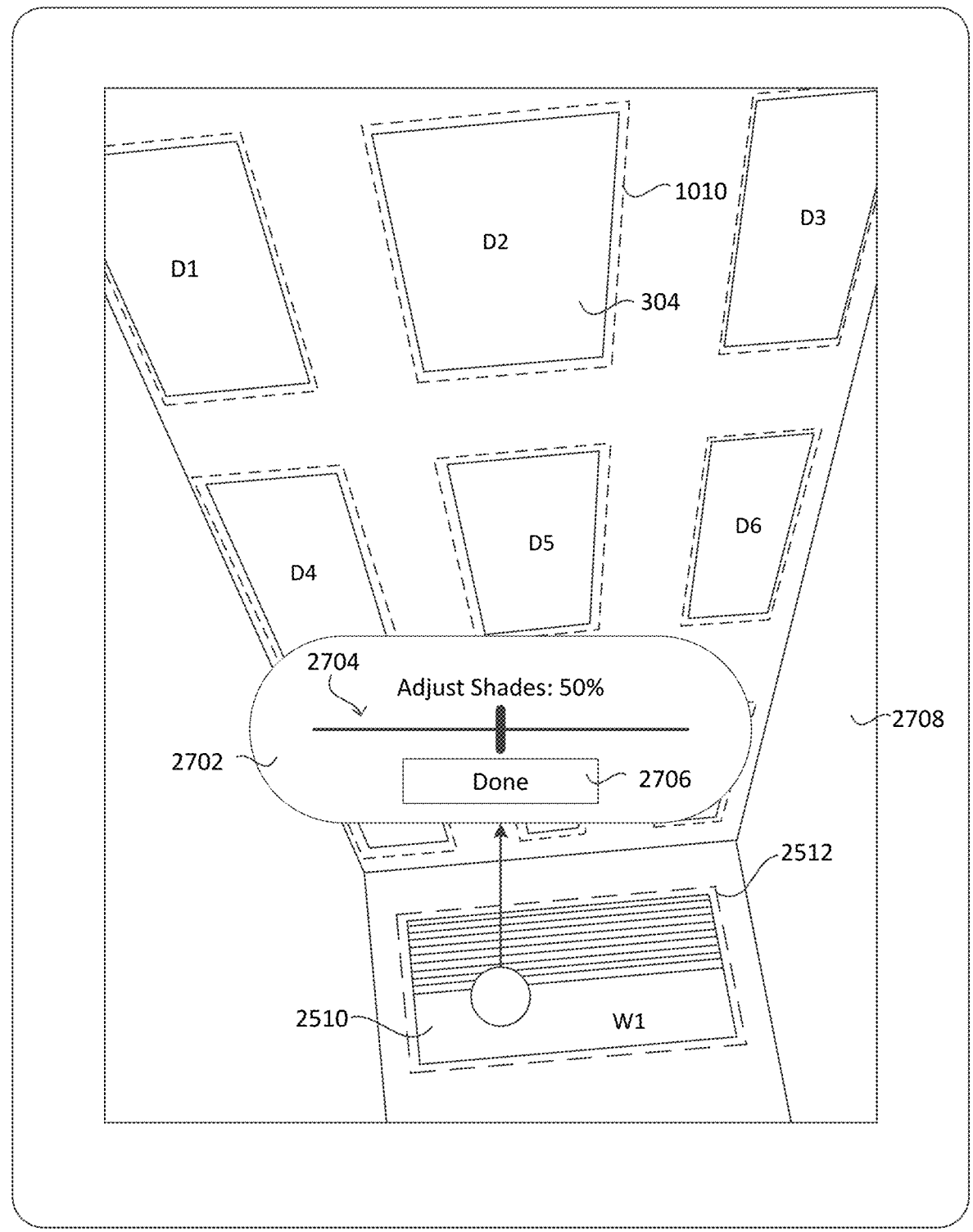
FIG. 22 depicts a representative image of an example user interface that may be displayed on a mobile device to control a motorized window treatment via the mobile device.

FIG. 22 depicts a representative image 2708 of an example user interface that may be displayed on a mobile device to control a motorized window treatment via the mobile device (e.g., at 2408 of the method 2400 of FIG. 19). The image 2708 may represent a frame of a video generated by the mobile device, for example. The image 2708 may display one or more control devices within a location and/or information associated with the control devices. For example, the image 2708 may display lighting fixture 304, outline 1010 identifying the lighting fixture 304, motorized window treatment 2510, outline 2512 identifying the motorized window treatment 2510, floor plan identifier D2 identifying lighting fixture 304, and floor plan identifier W1 identifying motorized window treatment 2510. The mobile device may overlay an outline surrounding each control device and/or a floor plan identifier for each control device onto image 2208. Outlines 1010 and 2512 may be overlaid onto lighting fixture 304 and motorized window treatment 2510, respectively, in the image 2208 by the mobile device. Floor plan identifiers D2 and W1 may be overlaid onto lighting fixture 304 and motorized window treatment 2510, respectively, in the image 2208 by the mobile device.

The mobile device may overlay one or more objects (e.g., lines, arrows, symbols, etc.) onto an image (e.g., the image 2708). The overlaid objects may be "pinned" to the image such that the objects maintain their position relative to the control devices within the image as the mobile device moves. The mobile device may determine to overlay the objects onto the image based on the location/orientation of the mobile device and/or floor plan data accessible to the mobile device. The floor plan data may indicate information about one or more floor plan control devices. For example, the floor plan data may indicate a location, floor plan identifier, unique identifier, function, type, and/or the like for each floor plan control device.

The mobile device may determine its location and/or orientation as described herein. The mobile device may be located within an area (e.g., a room of a building). The mobile device may view the area, for example using an internal camera of the mobile device, and may generate an image of the area (e.g., the image 2708). The mobile device may identify that one or more control devices are present within the image, for example using an imaging analysis. The mobile device may determine an approximate location (e.g., absolute or relative to the mobile device) of each control device in the image using one or more techniques described herein.

The mobile device may identify the control devices in the image based on the floor plan data. For example, the floor plan data may include a corresponding floor plan control device for each control device present in the area in which the mobile device is located. The floor plan data may indicate a location (e.g., a relative location and/or an absolute location) for each floor plan control device. The mobile device may identify a control device based on the mobile device's location/orientation and/or the floor plan data. The mobile device may determine that a floor plan control device is indicated as being at a location that is within a threshold distance of the location of a given control device within the image. For example, the mobile device may determine that the floor plan control device indicated as being at the same location as the given control device. The mobile device may determine that the given control device corresponds to the floor plan control device. After the mobile device has identified a control device, the mobile device may overlay information from the floor plan data (e.g., an outline and/or floor plan identifier) onto each control device in the image.

The image 2708 may be displayed after the user has selected one or more control devices for controlling. The mobile device may prompt the user to select one or more controls for the selected control devices. The controls may be specific to the selected devices. For example, as shown in FIG. 22, if the selected control device is a motorized window treatment, the user may select the level (e.g., height) of the motorized window treatment for control. The mobile device may display information about the selected control devices and/or the selected controls, for example in a popup window.

For example, as shown in FIG. 22, the image 2708 may include popup window 2702 that displays information about motorized window treatment 2510. The popup window may remain in the same location on the display of the mobile device as the mobile device is moved. For example, the popup window may move relative to the control devices in image 2608. The popup window 2702 may include a value associated with the selected control device and/or the selected control. For example, as shown in FIG. 22, the popup window 2702 may display the current level for motorized window treatment 2510. The user may control the selected control device by entering information into the popup window 2702, for example by entering text into a text box, positioning an indicator on a slider, selecting a button, and/or the like.

For example, as shown in FIG. 22, the popup window 2702 may include a slider control 2704. The slider control 2704 may include a line and an indicator (e.g., a slider handle or knob) crossing the line. The indicator may cross the line at a position that is related to the value associated with the control device. For example, the position of the indicator along the length of the line of the slider control 2704 may represent a position of a bottom edge (e.g., a bottom bar or hembar) of a covering material of the motorized window treatment 2510. For example, the indicator may be positioned at the middle of the slider 2704 to represent that the motorized window treatment 2510 is 50% of the way between a fully-open position and a fully-closed position. The user may control the motorized window treatment 2510 by adjusting the position of the indicator along the length of the line of the slider control 2704. For example, if the user wishes to increase the position of the motorized window treatment 2510 to 100% (e.g., the fully-open position), the user may move the indicator to the right end of the line of the slider control 2704. The mobile device may determine a command based on the input from the user and may send the command to the control device (e.g., as one or more digital messages). The mobile device may send the digital messages directly to the control device and/or via a separate programming device (e.g., a system controller). The popup window 2702 may include a button 2706 that, when pressed, removes the popup window 2602 from the display. The popup window 2702 could also include a toggle button, an on button, an off button, a raise button, a lower button, and/or one or more preset buttons.

Figure 23:
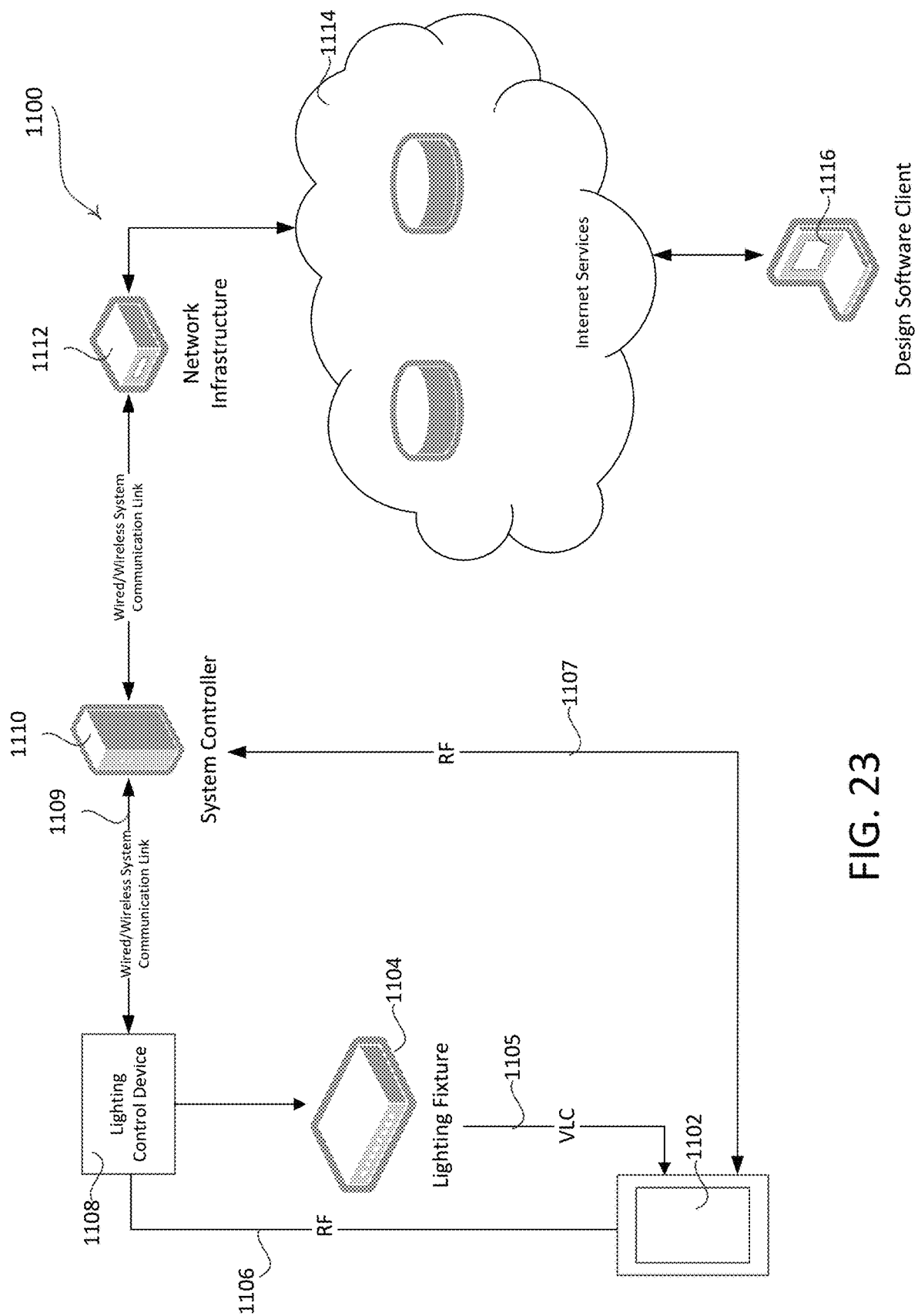
FIG. 23 shows an example system architecture.

FIG. 23 shows an example system architecture 1100 as described herein. The system architecture 1100 may include a mobile device 1102 (e.g., the mobile device 124). The mobile device 1102 may be, for example, a cell phone, a laptop or tablet computer, or a wearable device (e.g., wearable computer glasses). The mobile device 1102 may be an autonomous mobile device (e.g., the ground-based autonomous mobile device 126 or the airborne autonomous mobile device 128) or attached to an autonomous mobile device, as described herein.

The mobile device 1102 may have an internal camera capable of capturing signals on the VLC communication link 1105 from a lighting fixture 1104 or other light source. The mobile device 1102 may include a communication circuit (e.g., receiver, transceiver, etc.) capable of receiving communications via the RF communication link 1106.

The mobile device 1102 may receive information (e.g., a unique identifier) from a lighting control device 1108 installed in a lighting fixture 1104 for controlling a lighting load. The information may be communicated by VLC (e.g., LiFi) on the VLC communication link 1105 and/or by RF on the RF communication link 1106 (e.g., WI-FI®, BLUETOOTH®, near field communication (NFC), ZIGBEE®, or CLEAR CONNECT™). The lighting control device 1108 may be installed in the lighting fixture 1104 and may control a lighting load to produce VLC signals on the VLC communication link 1105 at a rate imperceivable to the human eye. The lighting control device 1108 may include a communication circuit (e.g., transmitter, transceiver, etc.) that is capable of communicating via the RF communication link 1106. The information included on the VLC communication link 1105 or the RF communication link 1106 may be unique to the lighting control device 1108.

The lighting control device 1108 may be connected to a system controller 1110 (e.g., a hub). The lighting control device 1108 may be connected to the system controller 1110 via a wired communication link (e.g., Ethernet or other wired network communication link) and/or wireless communication link 1109 (e.g., Bluetooth®, WI-FI®, WiMAX®, HSPA+, LTE, 5G, or another wireless communication link). The lighting control device 1108 may send information to and/or receive information from the system controller 1110 via the wired and/or wireless communication link 1109. For example, the lighting control device 1108 may be programmed with a unique identifier, which is received from the system controller 1110, for sending and/or receiving digital messages. The association of the unique identifier with the floor plan identifier may also be communicated from the system controller 110 to the lighting control device 1108 via the wired and/or wireless communication link 1109.

The system controller 1110 may communicate with the mobile device 1102 via an RF communication link 1107. The RF communication link 1107 may include communications using Bluetooth®, WI-FI®, WiMAX®, HSPA+, LTE, 5G, or another wireless communication signal. Though shown as a wireless communication link, the RF communication link 1107 may be replaced with a wired communication link, such as Ethernet. The mobile device 1102 may receive floor plan data or other system information via the RF communication link 1107. The mobile device 1102 may send unique identifiers and/or association information comprising an association between unique identifiers and floor plan data via the RF communication link 1107. The mobile device 1102 may also, or alternatively, communicate directly with a network infrastructure or Internet services to send and/or receive information.

The system controller 1110 may be connected to network infrastructure 1112, e.g. by a wired communication link (e.g., Ethernet or other wired network communication link) and/or wireless communication link 1109 (e.g., Bluetooth®, WI-FI®, WiMAX®, HSPA+, LTE, 5G, or another wireless communication link). The network infrastructure 1112 may use internet services 1114 for sending information to and/or receiving information from remote computing devices.

The internet services 1114 may be used to communicate with a design software client 1116. The design software client 1116 may be used to program and/or store the floor plan data. The system controller 1110 may receive information from and send information to the design software client 1116 via the network infrastructure 1112 and/or the internet services 1114. For example, the system controller 1110, or other devices in the system, may access the floor plan data, or portions thereof, by request from the design software client.

Figure 24:
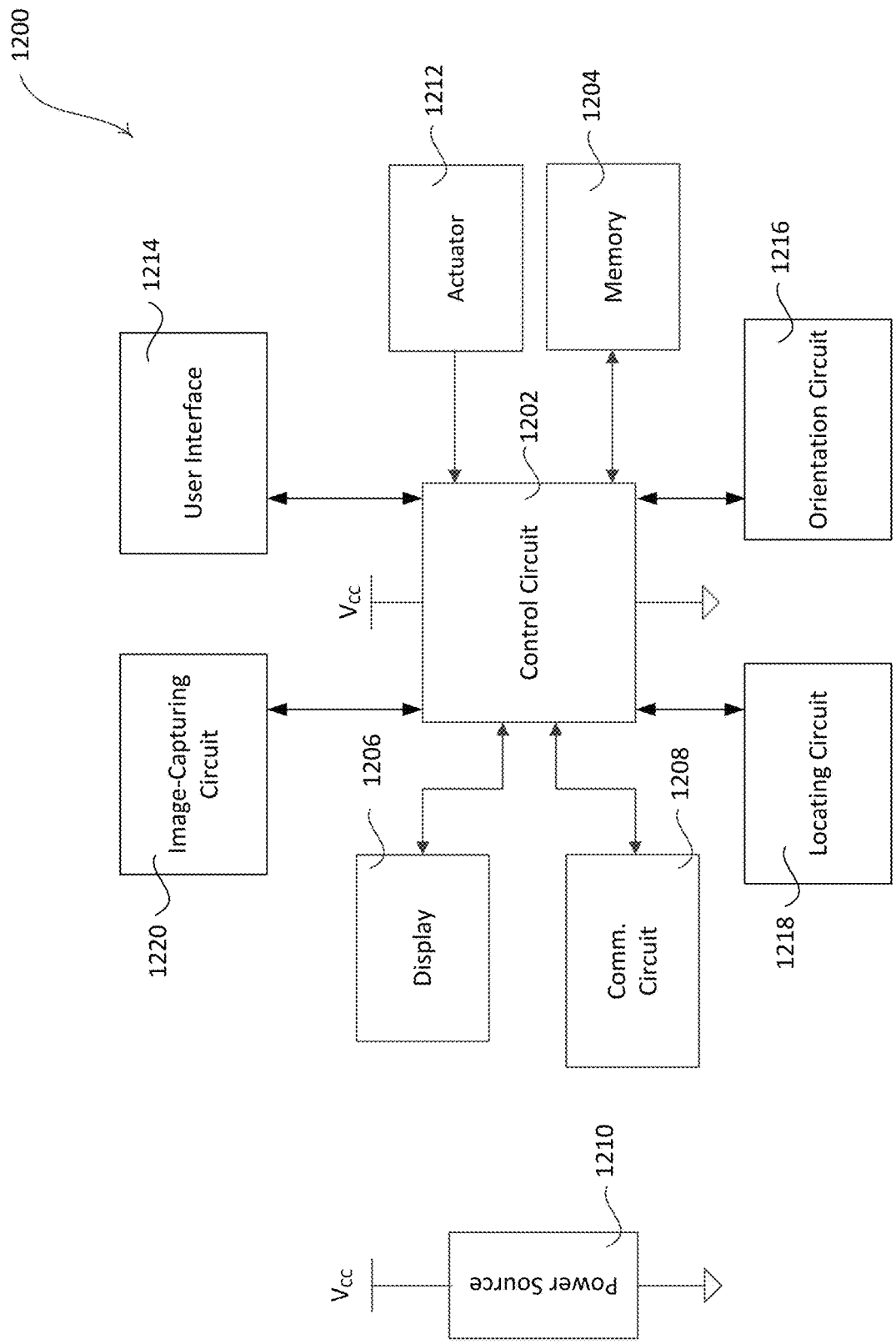
FIG. 24 is a block diagram of an example mobile device.

FIG. 24 is a block diagram illustrating an example mobile device 1200 as described herein. The mobile device 1200 may be the mobile device 124 shown in FIG. 1, for example. The mobile device 1200 may include a control circuit 1202 for controlling the functionality of the mobile device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), or the like. The control circuit 1202 may perform signal coding, data processing, power control, input/output processing, or any other functionality that enables the mobile device 1200 to perform as described herein. The control circuit 1202 may store information in and/or retrieve information from the memory 1204. The memory 1204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The mobile device 1200 may include a communications circuit 1208 for transmitting and/or receiving information. The communications circuit 1208 may perform wireless and/or wired communications. The communications circuit 1208 may include an RF transceiver or other circuit capable of performing wireless communications via an antenna. Communications circuit 1208 may be in communication with control circuit 1202 for transmitting and/or receiving information.

The control circuit 1202 may also be in communication with a display 1206 and/or a user interface 1214 for providing information to a user. The control circuit 1202, the display 1206, and/or the user interface 1214 may generate GUIs for being displayed on the mobile device 1200. The display 1206 and/or the user interface 1214 and the control circuit 1202 may be in two-way communication, as the display 1206 and/or the user interface 1214 may include a touch screen module capable of receiving information from a user and providing such information to the control circuit 1202. The mobile device may also include an actuator 1212 (e.g., one or more buttons) that may be actuated by a user to communicate user selections to the control circuit 1202.

The mobile device 1200 may include one or more circuits or sensors that may be used to determine the location and/or the orientation of the mobile device 1200. For example, the mobile device 1200 may include a locating circuit 1218 and/or an orientation circuit (e.g., an accelerometer and/or a gyroscope) 1216 or another circuit from which the output may be used to determine the orientation of the mobile device 1200. The locating circuit 1218 may be used to determine a location of the mobile device 1200. For example, the locating circuit 1218 may be configured to transmit and/or receive beacons (e.g., VLC or RF signals) that may be used by the mobile device 1200 and/or an external device (e.g., the system controller 112) to determine the location of the mobile device. The orientation circuit 1216 may be used to determine an orientation of the mobile device 1200.

The mobile device 1200 may include one or more circuits that may be used to capture images. For example, mobile device 1200 may include an image-capturing circuit 1220, such as a camera. The image-capturing circuit 1220 may be used to capture images of a location in order to determine, for example, a unique identifier transmitted by a light fixture. The image-capturing circuit 1220 may also be used to determine the location, position (e.g., within the location), and/or orientation of mobile device 1200.

Each of the modules within the mobile device 1200 may be powered by a power source 1210. The power source 1210 may include an AC power supply or DC power supply, for example. The power source 1210 may generate a supply voltage $V_{CC}$ for powering the modules within the mobile device 1200.

Figure 25:
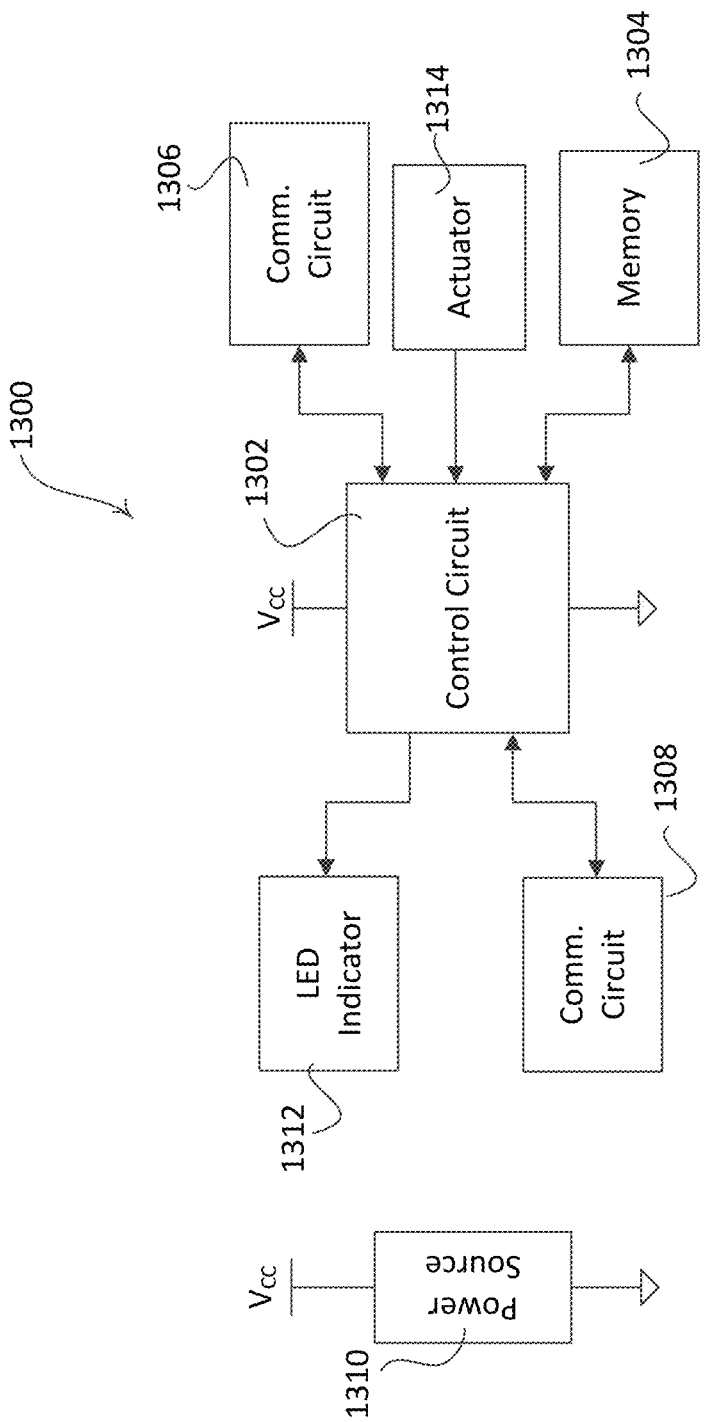
FIG. 25 is a block diagram of an example system controller.

FIG. 25 is a block diagram illustrating an example system controller 1300 as described herein. The system controller may be a gateway system controller, a target system controller, a remote system controller, and/or a combination thereof. The system controller 1300 may be the system controller 112 shown in FIG. 1, for example. The system controller 1300 may include a control circuit 1302 for controlling the functionality of the system controller 1300. The control circuit 1302 may include one or more general purpose processors, special purpose processors, conventional processors, digital signal processors (DSPs), microprocessors, integrated circuits, a programmable logic device (PLD), application specific integrated circuits (ASICs), or the like. The control circuit 1302 may perform signal coding, data processing, power control, input/output processing, or any other functionality that enables the system controller 1300 to perform as described herein. The control circuit 1302 may store information in and/or retrieve information from the memory 1304. The memory 1304 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1300 may include a communications circuit 1 for transmitting and/or receiving information. The communications circuit 1 may perform wireless and/or wired communications. The system controller 1300 may also, or alternatively, include a communications circuit 1308 for transmitting and/or receiving information. The communications circuit 1 may perform wireless and/or wired communications. Communications circuits 1and 1308 may be in communication with control circuit 1302. The communications circuits 1and 1308 may include RF transceivers or other communications modules capable of performing wireless communications via an antenna. The communications circuit 1 and communications circuit 1308 may be capable of performing communications via the same communication channels or different communication channels. For example, the communications circuit 1 may be capable of communicating (e.g., with a mobile device, over a network, etc.) via a wireless communication channel (e.g., BLUETOOTH®, near field communication (NFC), WIFI®, WI-MAX®, cellular, etc.) and the communications circuit 1308 may be capable of communicating (e.g., with control devices and/or other devices in the load control system) via another wireless communication channel (e.g., WI-FI® or a proprietary communication channel, such as CLEAR CONNECT™).

The control circuit 1302 may be in communication with an LED indicator 1312 for providing indications to a user. The control circuit 1302 may be in communication with an actuator 1314 (e.g., one or more buttons) that may be actuated by a user to communicate user selections to the control circuit 1302. For example, the actuator 1314 may be actuated to put the control circuit 1302 in an association mode and/or communicate association messages from the system controller 1300.

Each of the modules within the system controller 1300 may be powered by a power source 1310. The power source

1310 may include an AC power supply or DC power supply, for example. The power source 1310 may generate a supply voltage $V_{CC}$ for powering the modules within the system controller 1300.

Figure 26:
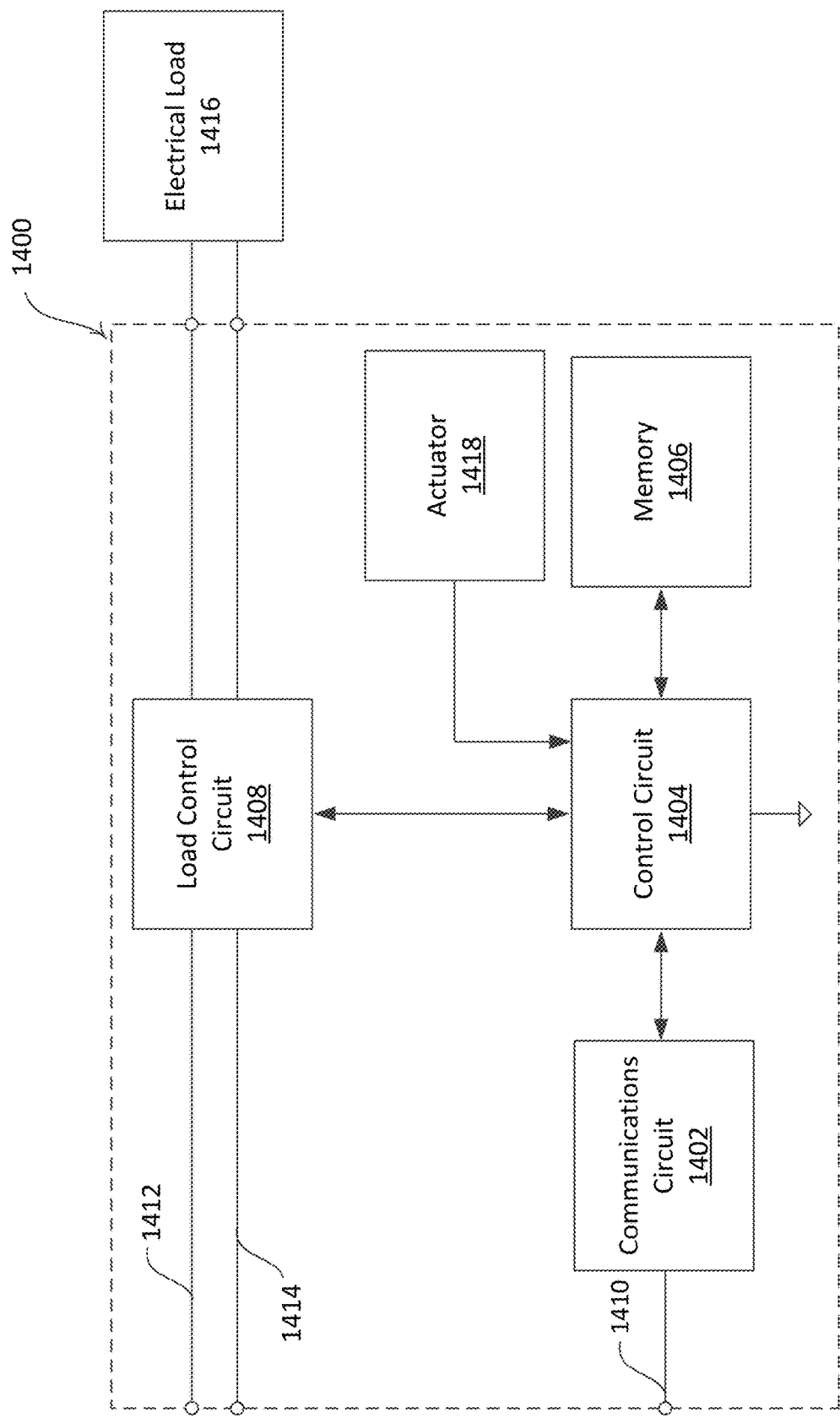
FIG. 26 is a block diagram depicting an example load control device.

FIG. 26 is a block diagram illustrating an example control-target device, e.g., a load control device 1400, as described herein. The load control device 1400 may be a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or other load control device. The load control device 1400 may include a communications circuit 1402. The communications circuit 1402 may include a receiver, an RF transceiver, or other communications module capable of performing wired and/or wireless communications via communications link 1410. The communications circuit 1402 may be in communication with control circuit 1404. The control circuit 1404 may include one or more general purpose processors, special purpose processors, conventional processors, digital signal processors (DSPs), microprocessors, integrated circuits, a programmable logic device (PLD), application specific integrated circuits (ASICs), or the like. The control circuit 1404 may perform signal coding, data processing, power control, input/output processing, or any other functionality that enables the load control device 1400 to perform as described herein.

The control circuit 1404 may store information in and/or retrieve information from the memory 1406. For example, the memory 1406 may maintain a registry of associated control devices and/or control configuration instructions. The memory 1406 may include a non-removable memory and/or a removable memory. The load control circuit 1408 may receive instructions from the control circuit 1404 and may control an electrical load 1416 based on the received instructions. The load control circuit 1408 may send status feedback to the control circuit 1404 regarding the status of the electrical load 1416. The load control circuit 1408 may receive power via the hot connection 1412 and the neutral connection 1414 and may provide an amount of power to the electrical load 1416. The electrical load 1416 may include any type of electrical load, such as a lighting load (e.g., LED, fluorescent lamp, etc.).

The control circuit 1404 may be in communication with an actuator 1418 (e.g., one or more buttons) that may be actuated by a user to communicate user selections to the control circuit 1404. For example, the actuator 1418 may be actuated to put the control circuit 1404 in an association mode and/or communicate association messages from the load control device 1400.

Figure 27:
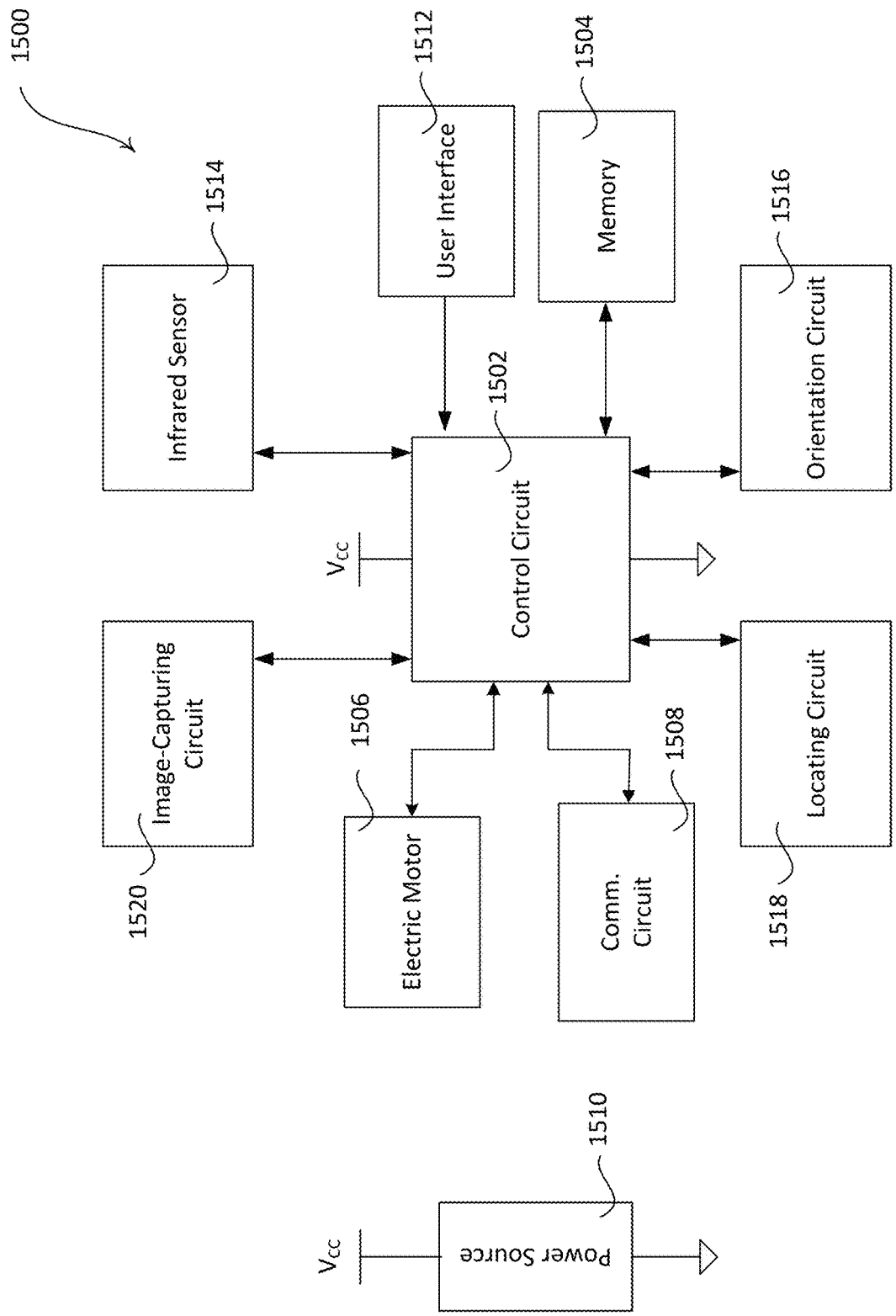
FIG. 27 is a block diagram of an example autonomous mobile device.

FIG. 27 is a block diagram illustrating an example autonomous mobile device 1500 as described herein. The autonomous mobile device 1500 may be the ground-based autonomous mobile device 126 or the airborne autonomous mobile device 128 shown in FIG. 1, for example. The autonomous mobile device 1500 may include a control circuit 1502 for controlling the functionality of the autonomous mobile device 1500. The control circuit 1502 may include one or more general purpose processors, special purpose processors, conventional processors, digital signal processors (DSPs), microprocessors, integrated circuits, a programmable logic device (PLD), application specific integrated circuits (ASICs), or the like. The control circuit 1502 may perform signal coding, data processing, power control, input/output processing, or any other functionality that enables the autonomous mobile device 1500 to perform as described herein. The control circuit 1502 may store information in and/or retrieve information from the memory 1504. The memory 1504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The autonomous mobile device 1500 may include a communications circuit 1508 for transmitting and/or receiving information. The communications circuit 1508 may perform wireless and/or wired communications. The communications circuit 1508 may include an RF transceiver or other circuit capable of performing wireless communications via an antenna. Communications circuit 1508 may be in communication with control circuit 1502 for transmitting and/or receiving information.

The control circuit 1502 may also be in communication with a user interface 1512 for providing information to a user. The control circuit 1502 and/or the user interface 1512 may generate GUIs for being displayed on the autonomous mobile device 1500. The user interface 1512 and the control circuit 1502 may be in two-way communication, as the user interface 1512 may include a touch screen capable of receiving information from a user and providing such information to the control circuit 1502. The mobile device may also include an actuator (e.g., one or more buttons) that may be actuated by a user to communicate user selections to the control circuit 1502.

The autonomous mobile device 1500 may include one or more circuits or sensors that may be used to determine the location and/or the orientation of the autonomous mobile device 1500. For example, the autonomous mobile device 1500 may include a locating circuit 1518 and/or an orientation circuit (e.g., an accelerometer and/or a gyroscope) 1516 or another circuit from which the output may be used to determine the orientation of the autonomous mobile device 1500. The locating circuit 1518 may be used to determine a location of the autonomous mobile device 1500. For example, the locating circuit 1518 may be configured to transmit and/or receive beacons (e.g., VLC or RF signals) that may be used by the autonomous mobile device 1500 and/or an external device (e.g., the system controller 112) to determine the location of the autonomous mobile device. The orientation circuit 1516 may be used to determine an orientation of the autonomous mobile device 1500.

The autonomous mobile device 1500 may include one or more circuits that may be used to capture images. For example, autonomous mobile device 1500 may include an image-capturing circuit 1520, such as a camera. The image-capturing circuit 1520 may be used to capture images of a location in order to determine, for example, a unique identifier transmitted by a light fixture. The image-capturing circuit 1520 may also be used to determine the location, position (e.g., within the location), and/or orientation of autonomous mobile device 1500.

The autonomous mobile device 1500 may also comprise an infrared sensor 1514. The infrared sensor 1514 may be used to detect a unique identifier transmitted by a light fixture. The infrared sensor 1514 may also be used to detect the location of one or more light fixtures.

The autonomous mobile device 1500 may include an electric motor 1506. The electric motor 1506 may be any circuit that is used to drive transportation of autonomous mobile device 1500. For example, the electric motor 1506 may be used in conjunction with a wheel, a propeller, a pneumatic air circuit, a hydraulic circuit, a magnetic levitation circuit, and/or the like. The electric motor 1506 may be used to change the physical location and/or the orientation of the autonomous mobile device 1500. For example, the electric motor 1506 may be used in conjunction with one or more wheels that may be used to transport the autonomous mobile device 1500 within a location. The electric motor 1506 may be used to tilt and/or rotate the autonomous mobile device 1500, or a portion thereof, such that the image-capturing circuit 1520 or other sensor of the mobile device 1500 is facing a lighting fixture within the location.

Each of the circuits within the autonomous mobile device 1500 may be powered by a power source 1510. The power source 1510 may include an AC power supply or DC power supply, for example. The power source 1510 may generate a supply voltage $V_{CC}$ for powering the circuits within the autonomous mobile device 1500.

Figure 28:
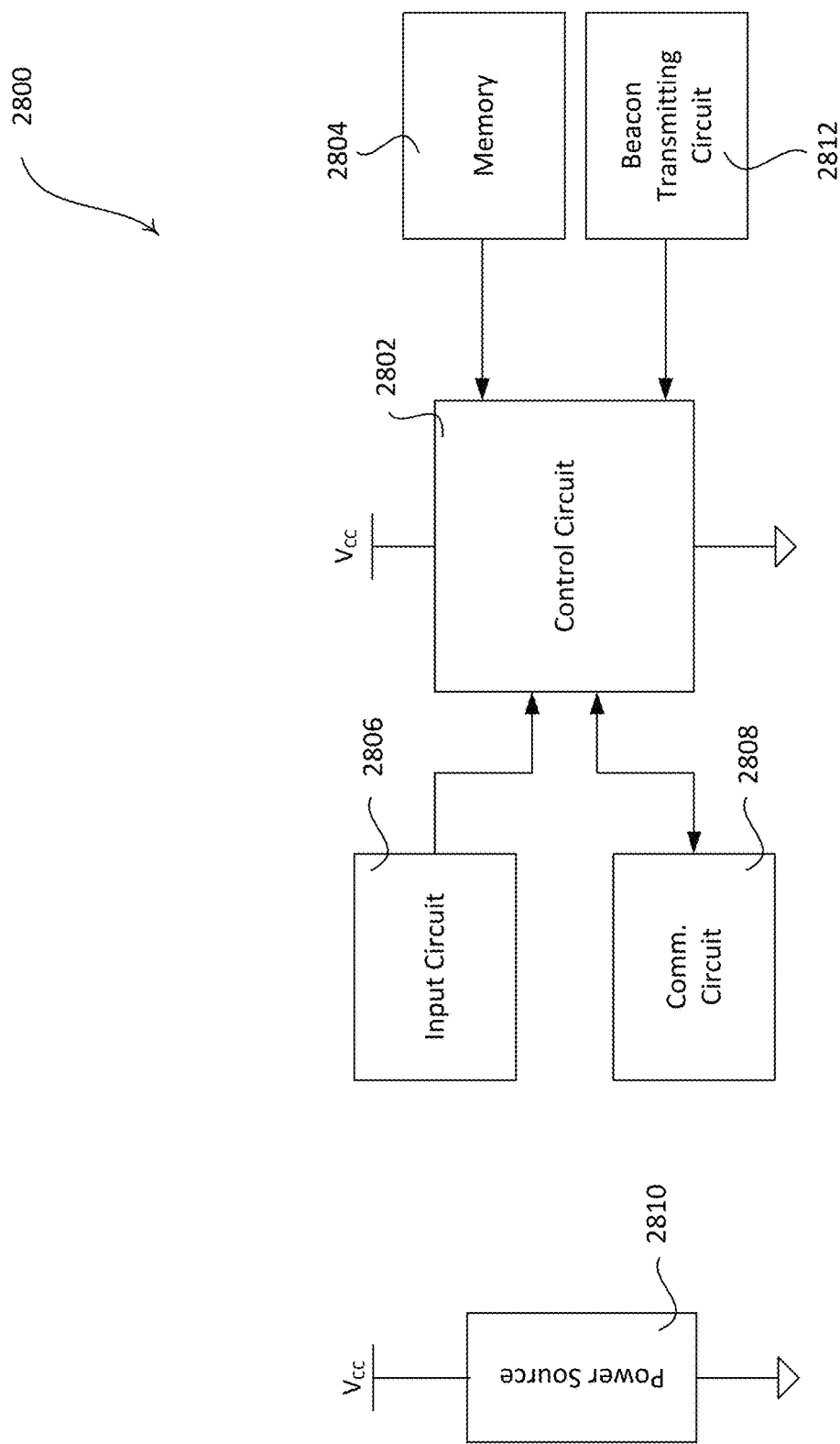
FIG. 28 is a block diagram illustrating an example control-source device.

FIG. 28 is a block diagram illustrating an example control-source device 2800 as described herein. The control-source device 2800 may be a remote-control device, an occupancy sensor, or another control-source device. The control-source device 2800 may include a control circuit 2802 for controlling the functionality of the control-source device 2800. The control circuit 2802 may include one or more general purpose processors, special purpose processors, conventional processors, digital signal processors (DSPs), microprocessors, integrated circuits, a programmable logic device (PLD), application specific integrated circuits (ASICs), or the like. The control circuit 2802 may perform signal coding, data processing, power control, input/output processing, or any other functionality that enables the control-source device 2800 to perform as described herein.

The control circuit 2802 may store information in and/or retrieve information from the memory 2804. The memory 2804 may include a non-removable memory and/or a removable memory, as described herein.

The control-source device 2800 may include a communications circuit 2808 for transmitting and/or receiving information. The communications circuit 2808 may transmit and/or receive information via wired and/or wireless communications. The communications circuit 2808 may include a transmitter, an RF transceiver, or other circuit capable of performing wired and/or wireless communications. The communications circuit 2808 may be in communication with control circuit 2802 for transmitting and/or receiving information.

The control circuit 2802 may also be in communication with an input circuit 2806. The input circuit 2806 may include an actuator (e.g., one or more buttons) or a sensor circuit (e.g., an occupancy sensor circuit) for receiving input that may be sent to a device for controlling an electrical load. For example, the control-source device may receive input from the input circuit 2806 to put the control circuit 2802 in an association mode and/or communicate association messages from the control-source device. The control circuit 2802 may receive information from the input circuit 2806 (e.g. an indication that a button has been actuated or sensed information). Each of the modules within the control-source device 2800 may be powered by a power source 2810.

Although features, elements, and functions are described above in particular combinations, a feature, element, or function is used alone or in any combination with the other features, elements, or functions. Various presently unforeseen or unanticipated alternatives, modifications, variations, or improvements may be subsequently made that are also intended to be encompassed by the following claims.

The methods described herein are implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), removable disks, and optical media such as CD-ROM disks, and digital versatile disks (DVDs).

What is claimed is:

1. A method of commissioning a lighting control system via an autonomous mobile device, the method comprising:
   determining a position of the autonomous mobile device within a physical location;
   capturing an image on a camera of the autonomous mobile device, wherein the image includes a plurality of lighting fixtures in the physical location;
   determining, based on the image, a location of the autonomous mobile device relative to the plurality of lighting fixtures;
   determining an order for commissioning the plurality of lighting fixtures in the image;
   selecting a first lighting fixture of the plurality of lighting fixtures from the image for being commissioned based on the determined order;
   determining floor plan data for the first lighting fixture, wherein the floor plan data comprises a floor plan identifier of the first lighting fixture that identifies a position of the first lighting fixture relative to other objects on a floor plan of the physical location stored in memory;
   receiving, via the autonomous mobile device, a unique identifier of a first lighting control device, wherein the unique identifier of the first lighting control device is configured to identify the first lighting control device in messages transmitted to control an amount of power provided to a lighting load in the first lighting fixture;
   automatically associating the unique identifier of the first lighting control device with the floor plan identifier of the first lighting fixture;
   selecting a second lighting fixture of the plurality of lighting fixtures from the image for being commissioned based on the determined order;
   automatically adjusting the location or the orientation of the autonomous mobile device such that the camera of the autonomous mobile device is positioned to commission the second lighting fixture selected from the image for being commissioned;
   determining floor plan data for the second lighting fixture, wherein the floor plan data comprises a floor plan identifier of the second lighting fixture that identifies a position of the second lighting fixture relative to other objects on the floor plan;
   receiving, via the autonomous mobile device, a unique identifier of a second lighting control device, wherein the unique identifier of the second lighting control device is configured to identify the second lighting control device in messages transmitted to control an amount of power provided to a lighting load in the second lighting fixture; and
   automatically associating the unique identifier of the second lighting control device with the floor plan identifier of the second lighting fixture.

2. The method of claim 1, wherein the location is within an area of a building.

3. The method of claim 1, further comprising moving the autonomous mobile device to the position within the location without the use of input from a user.

4. The method of claim 1, wherein the position is automatically determined using a real-time locating system.

5. The method of claim 1, wherein the orientation is adjusted by the autonomous mobile device without input from a user.

6. The method of claim 1, wherein the orientation is adjusted automatically by identifying predefined objects within the image.

7. The method of claim 6, wherein the predefined objects within the image comprise at least one of the corners of a room, lighting fixtures, or windows.

8. The method of claim 1, wherein the orientation is adjusted based on at least two predefined objects within an image.

9. The method of claim 1, wherein the orientation is adjusted based on information from at least one of an accelerometer or a gyroscope of the autonomous mobile device.

10. The method of claim 1, wherein the floor plan data comprises at least one of an icon representing a physical location of the lighting fixture, a representation of a connection between the lighting control device and another device, or a group identifier that indicates a group of lighting control devices that may be controlled together.

11. The method of claim 1, wherein determining the floor plan data comprises mapping a position of one or more objects within the location relative to a predetermined point.

12. The method of claim 1, wherein the orientation of the autonomous mobile device is adjusted by measuring a distance between two or more predefined objects within an image of the location and identifying the distance as corresponding to a distance in a floor plan of the location, the method further comprising using the measured distance to identify the lighting fixture as corresponding to a floor plan lighting fixture in the floor plan, and wherein associating the unique identifier of the lighting control device with the floor plan identifier comprises storing an association between the unique identifier and the floor plan identifier in a memory of the autonomous mobile device.

13. The method of claim 12, wherein the association is confirmed by user selection on the autonomous mobile device.

14. The method of claim 1, wherein the unique identifier of the lighting control device is received via visible light communication (VLC) signals.

15. The method of claim 1, wherein the unique identifier of the lighting control device is received via RF signals.

16. The method of claim 1, further comprising sending a digital message that comprises control instructions configured to control the lighting control device, and wherein the digital message comprises at least one of the unique identifier or the floor plan identifier.

17. A method of commissioning a lighting control system via an autonomous mobile device, the method comprising:
receiving, from a remote device, a command to move the autonomous mobile device to a position within a physical location;
capturing an image on a camera of the autonomous mobile device, wherein the image comprises a plurality of lighting fixtures within the physical location;
determining an order for commissioning the plurality of lighting fixtures in the image;
selecting a first lighting fixture of the plurality of lighting fixtures based on the determined order;
receiving a unique identifier of a first lighting control device associated with the first lighting fixture, wherein the unique identifier of the first lighting control device is configured to identify the first lighting control device in messages transmitted to control an amount of power provided to a lighting load in the first lighting fixture;
determining, based on the image, a location of the first lighting fixture with respect to the autonomous mobile device;
determining a floor plan identifier that identifies a position of the first lighting fixture relative to other objects on a floor plan of the physical location stored in memory based on the position of the autonomous mobile device and the location of the first lighting fixture with respect to the autonomous mobile device;
associating the unique identifier of the first lighting control device with the floor plan identifier of the first lighting fixture;
selecting a second lighting fixture of the plurality of lighting fixtures based on the determined order;
automatically adjusting an orientation of the autonomous mobile device such that the camera of the autonomous mobile device is pointed towards the second lighting fixture;
receiving a unique identifier of a second lighting control device associated with the second lighting fixture, wherein the unique identifier of the second lighting control device is configured to identify the second lighting control device in messages transmitted to control an amount of power provided to a lighting load in the second lighting fixture;
determining, based on the image, a location of the second lighting fixture with respect to the autonomous mobile device;
determining a floor plan identifier that identifies a position of the second lighting fixture relative to other objects on the floor plan based on the position of the autonomous mobile device and the location of the second lighting fixture with respect to the autonomous mobile device; and
associating the unique identifier of the second lighting control device with the floor plan identifier of the second lighting fixture.

18. The method of claim 17, wherein determining the floor plan identifier comprises selecting a floor plan identifier from a predefined list.

19. The method of claim 17, wherein the unique identifier of the lighting control device is received via visible light communication (VLC) signals.

20. The method of claim 17, wherein determining the floor plan identifier comprises sending a request to the remote device to prompt a user to provide the floor plan identifier.

21. The method of claim 17, wherein the unique identifier of the lighting control device is received via RF signals.

22. The method of claim 17, further comprising sending a digital message comprising control instructions configured to control the lighting control device, and wherein the digital message comprises at least one of the unique identifier or the floor plan identifier.

23. A non-transitory computer-readable medium having instructions stored thereon that, when executed by a control circuit, cause the control circuit to:
determine a position of an autonomous mobile device within a physical location;

capture an image via a camera of the autonomous mobile device, wherein the image includes a plurality of lighting fixtures in the physical location;

determine, based on the image, a location of the autonomous mobile device relative to the plurality of lighting fixtures;

determine an order for commissioning the plurality of lighting fixtures in the image;

select a first lighting fixture of the plurality of lighting fixtures from the image for being commissioned based on the determined order;

determine floor plan data for the first lighting fixture, wherein the floor plan data comprises a floor plan identifier of the first lighting fixture that identifies a position of the first lighting fixture relative to other objects on a floor plan of the physical location stored in memory;

receive a unique identifier of a first lighting control device, wherein the unique identifier of the first lighting control device is configured to identify the first lighting control device in messages transmitted to control an amount of power provided to a lighting load in the first lighting fixture;

automatically associate the unique identifier of the first lighting control device with the floor plan identifier of the first lighting fixture;

select a second lighting fixture of the plurality of lighting fixtures from the image for being commissioned based on the determined order;

automatically adjust the location or the orientation of the autonomous mobile device such that the camera of the autonomous mobile device is positioned to commission the second lighting fixture selected from the image for being commissioned;

determine floor plan data for the second lighting fixture, wherein the floor plan data comprises a floor plan identifier of the second lighting fixture that identifies a position of the second lighting fixture relative to other objects on the floor plan;

receive a unique identifier of a second lighting control device, wherein the unique identifier of the second lighting control device is configured to identify the second lighting control device in messages transmitted to control an amount of power provided to a lighting load in the second lighting fixture; and automatically associate the unique identifier of the second lighting control device with the floor plan identifier of the second lighting fixture.

24. The non-transitory computer readable medium of claim 23, wherein the instructions, when executed by the control circuit, further cause the control circuit to move the autonomous mobile device to the position within the location without the use of input from a user.

25. The non-transitory computer readable medium of claim 23, wherein the position is automatically determined using a real-time locating system.

26. The non-transitory computer readable medium of claim 23, wherein the orientation is adjusted automatically by identifying predefined objects within the image, wherein the predefined objects within the image comprise at least one of the corners of a room, lighting fixtures, or windows.

27. The non-transitory computer readable medium of claim 23, wherein the orientation is adjusted based on information from at least one of an accelerometer or a gyroscope of the autonomous mobile device.

28. The non-transitory computer readable medium of claim 23, wherein the floor plan data comprises at least one of an icon representing a physical location of the lighting fixture, a representation of a connection between the lighting control device and another device, or a group identifier that indicates a group of lighting control devices that may be controlled together.

29. The non-transitory computer readable medium of claim 23, wherein the unique identifier of the lighting control device is received via visible light communication (VLC) signals or via RF signals.

30. The non-transitory computer readable medium of claim 23, wherein the instructions, when executed by the control circuit, further cause the control circuit to send a digital message that comprises control instructions configured to control the lighting control device, and wherein the digital message comprises at least one of the unique identifier or the floor plan identifier.

31. A non-transitory computer-readable medium having instructions stored thereon that, when executed by a control circuit, cause the control circuit to:

receive, from a remote device, a command to move an autonomous mobile device to a position within a physical location;

capture an image via a camera of the autonomous mobile device, wherein the image comprises a plurality of lighting fixtures within the physical location;

determine an order for commissioning the plurality of lighting fixtures in the image;

select a first lighting fixture of the plurality of lighting fixtures based on the determined order;

receive a unique identifier of a first lighting control device associated with the first lighting fixture, wherein the unique identifier of the first lighting control device is configured to identify the first lighting control device in messages transmitted to control an amount of power provided to a lighting load in the first lighting fixture;

determine, based on the image, a location of the first lighting fixture with respect to the autonomous mobile device;

determine a floor plan identifier that identifies a position of the first lighting fixture relative to other objects on a floor plan of the physical location stored in memory based on the position of the autonomous mobile device and the location of the first lighting fixture with respect to the autonomous mobile device;

associate the unique identifier of the first lighting control device with the floor plan identifier of the first lighting fixture;

select a second lighting fixture of the plurality of lighting fixtures based on the determined order;

automatically adjust an orientation of the autonomous mobile device such that the camera of the autonomous mobile device is pointed towards the second lighting fixture;

receive a unique identifier of a second lighting control device associated with the second lighting fixture, wherein the unique identifier of the second lighting control device is configured to identify the second lighting control device in messages transmitted to control an amount of power provided to a lighting load in the second lighting fixture;

determine, based on the image, a location of the second lighting fixture with respect to the autonomous mobile device;

determine a floor plan identifier that identifies a position of the second lighting fixture relative to other objects on the floor plan based on the position of the autonomous mobile device and the location of the second lighting fixture with respect to the autonomous mobile device; and associate the unique identifier of the second lighting control device with the floor plan identifier of the second lighting fixture.

32. The non-transitory computer readable medium of claim 31, wherein determining the floor plan identifier comprises selecting a floor plan identifier from a predefined list.

33. The non-transitory computer readable medium of claim 31, wherein the unique identifier of the lighting control device is received via visible light communication (VLC) signals or via RF signals.

34. The non-transitory computer readable medium of claim 31, wherein determining the floor plan identifier comprises sending a request to the remote device to prompt a user to provide the floor plan identifier.

35. The non-transitory computer readable medium of claim 31, wherein the instructions, when executed by the control circuit, further cause the control circuit to send a digital message comprising control instructions configured to control the lighting control device, and wherein the digital message comprises at least one of the unique identifier or the floor plan identifier.

* * * * *